US012794160B2

(12) United States Patent
Dawson et al.

(10) Patent No.: US 12,794,160 B2
(45) Date of Patent: Nov. 10, 2026

(54) ELECTRICAL CONNECTOR SYSTEM WITH A MALE TERMINAL ASSEMBLY HAVING A COMPRESSION LIMITING MEANS

(71) Applicant: EATON INTELLIGENT POWER LIMITED, Dublin (IE)

(72) Inventors: James Dawson, West Chicago, IL (US); Brantley Natter, Brightom, MI (US); Mohamad Zeidan, Bloomfield Hills, MI (US); Slobodan Pavlovic, Etobicoke (CA); Nathan Hollin, West Chicago, IL (US); Steve Krass, Saint Charles, IL (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 330 days.

(21) Appl. No.: 18/709,857

(22) PCT Filed: Dec. 5, 2022

(86) PCT No.: PCT/IB2022/061786
§ 371 (c)(1),
(2) Date: May 14, 2024

(87) PCT Pub. No.: WO2023/100163
PCT Pub. Date: Jun. 8, 2023

(65) Prior Publication Data

US 2025/0023272 A1 Jan. 16, 2025

Related U.S. Application Data

(60) Provisional application No. 63/286,072, filed on Dec. 5, 2021, provisional application No. 63/286,080, filed on Dec. 5, 2021.

(51) Int. Cl.
*H01R 13/17* (2006.01)

(52) U.S. Cl.
CPC .................................... *H01R 13/17* (2013.01)

(58) Field of Classification Search
CPC .. H01R 13/17; H01R 13/057; H01R 2201/26; H01R 13/428
See application file for complete search history.

(56) References Cited

U.S. PATENT DOCUMENTS

| | | | |
|---|---|---|---|
| 10,693,252 | B2 | 6/2020 | Pavlovic et al. |
| 2021/0344132 | A1 | 11/2021 | Pavlovic |

FOREIGN PATENT DOCUMENTS

| | | | |
|---|---|---|---|
| WO | 2019/164536 | A1 | 8/2019 |
| WO | 2019/236976 | | 12/2019 |

(Continued)

OTHER PUBLICATIONS

EPO Seaching Authority, International Search Report and Written Opinion of the International Search Authority for PCT/IB2022/061786, mailed Feb. 24, 2023, 14 pages.

*Primary Examiner* — Travis S Chambers
(74) *Attorney, Agent, or Firm* — Meunier Carlin & Curfman LLC

(57) ABSTRACT

The present disclosure relates to an electrical connector system having a male connector assembly and a female connector assembly. The male connector assembly includes a male housing assembly and a male terminal assembly having a male terminal, a spring member with at least one contact arm with a significantly bent configuration and an openable jacket that encloses a substantial extent of the male terminal and the spring member. The male terminal assembly also includes a compression limiting means that prevents an external force from overly deforming the contact arm inward. Preventing excessive depression of the contact arm is desirable because it can damage the contact arm and/or the spring member thereby introducing a failure mode to the male connector assembly that can cause the overall connec- (Continued)

tor system to become inoperable and unusable. The female connector assembly includes a female housing assembly and a female terminal assembly. The female housing assembly is designed to receive the female terminal assembly as well as an extent of the male terminal assembly in a connected state during operation of the electrical connector system.

20 Claims, 66 Drawing Sheets

(56) References Cited

FOREIGN PATENT DOCUMENTS

| | | |
|---|---|---|
| WO | 2019/237009 | 12/2019 |
| WO | 2019/237046 | 12/2019 |
| WO | 2020/150399 | 7/2020 |
| WO | 2020/154330 | 7/2020 |
| WO | 2021/050499 | 3/2021 |
| WO | 2021/050609 | 3/2021 |
| WO | 2022/026695 | 2/2022 |
| WO | 2022/026766 | 2/2022 |
| WO | 2022/040636 | 2/2022 |
| WO | 2022/055568 | 3/2022 |
| WO | 2022/098799 | 5/2022 |
| WO | 2023/288138 | 1/2023 |
| WO | 2023/021468 | 2/2023 |

FIG. 57
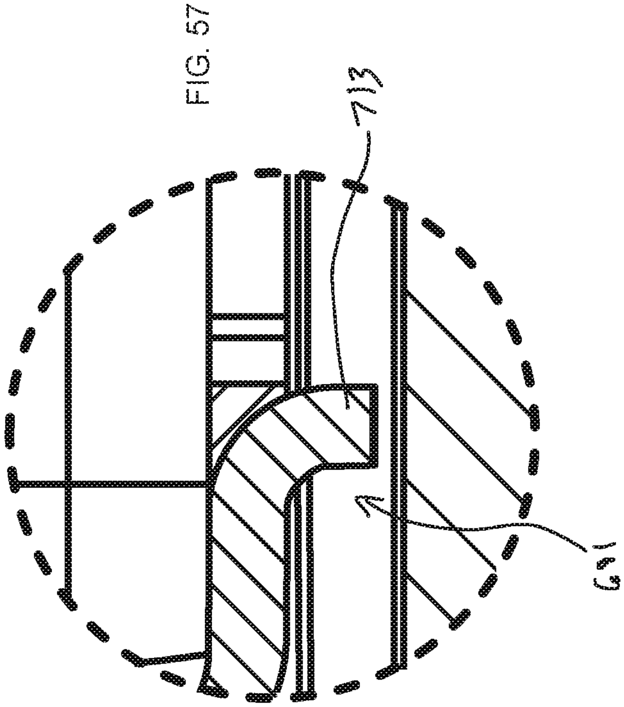
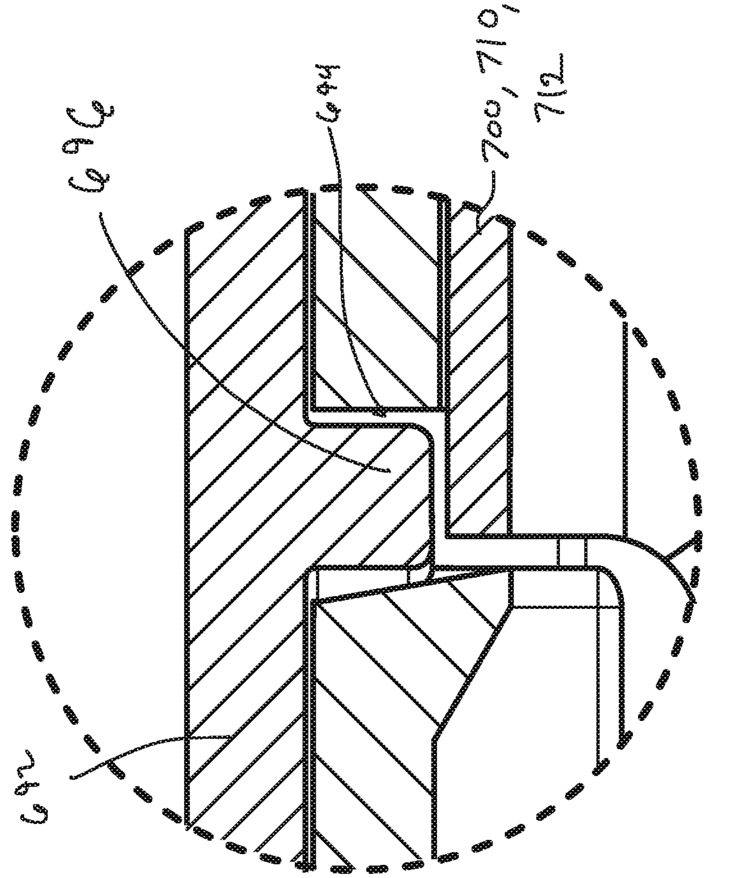
FIG. 56

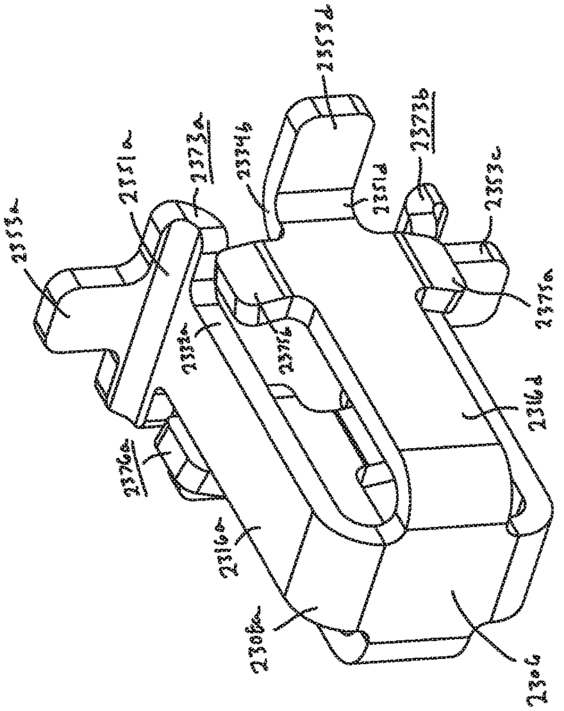
FIG. 70B
FIG. 70A
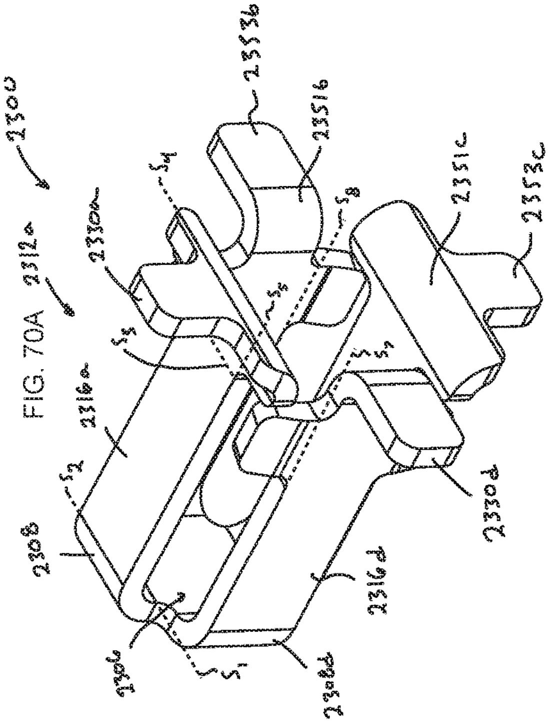
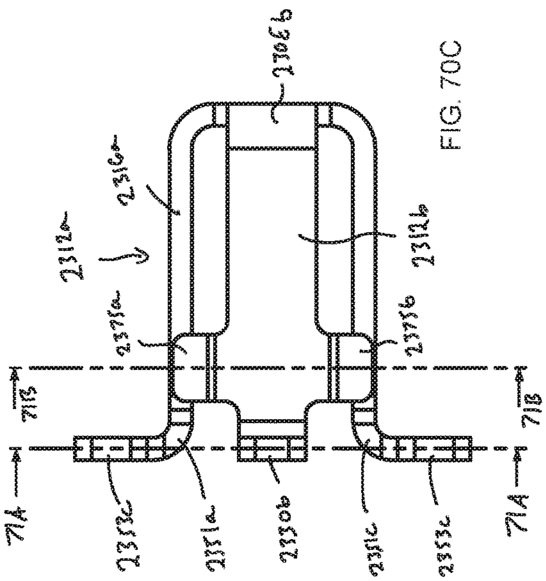
FIG. 70C

2314

ELECTRICAL CONNECTOR SYSTEM WITH A MALE TERMINAL ASSEMBLY HAVING A COMPRESSION LIMITING MEANS

RELATED APPLICATIONS

This application is a national stage application under 35 USC 371 of PCT/IB2022/061786 filed on Dec. 5, 2022, which claims the benefit from U.S. provisional patent application Nos. 63/286,072 and 63/286,080, both of which were filed on Dec. 5, 2021, and are incorporated herein by this reference.

FIELD OF DISCLOSURE

The present disclosure relates to an electrical connector system, more specifically a relatively small connector system having a male connector assembly and a female connector assembly. The male connector assembly includes a male housing assembly and a male terminal assembly having a male terminal, a spring member with at least one contact arm with a bent segment and an openable enclosure jacket. The male terminal assembly also includes a compression limiting means that prevents an external force from overly deforming the contact arm inward. Preventing excessive depression of the contact arm is desirable because it can damage the contact arm and/or the spring member thereby introducing a failure mode to the male connector assembly that can cause the overall connector system to become inoperable and unusable.

BACKGROUND

Over the past several decades, the number of electrical components used in automobiles, and other on-road and off-road vehicles such as pick-up trucks, commercial vans and trucks, semi-trucks, motorcycles, all-terrain vehicles, and sports utility vehicles (collectively “motor vehicles”) has increased dramatically. Electrical components are used in motor vehicles for a variety of reasons, including but not limited to, monitoring, improving and/or controlling vehicle performance, emissions, safety and creates comforts to the occupants of the motor vehicles. Considerable time, resources, and energy have been expended to develop power distribution components that meet the varied needs and complexities of the motor vehicle market; however, conventional power distribution components suffer from a variety of shortcomings.

Motor vehicles are challenging electrical environments for both the electrical components and the connector assemblies due to several conditions, including but not limited to, space constraints that make initial installation difficult, harsh operating conditions, large ambient temperature ranges, prolonged vibration, heat loads, and longevity, all of which can lead to component and/or connector failure. For example, incorrectly installed connectors, which typically occur in the assembly plant, and dislodged connectors, which typically occur in the field, are two significant failure modes for the electrical components and motor vehicles. Each of these failure modes leads to significant repair and warranty costs. For example, the combined annual accrual for warranty by all of the automotive manufacturers and their direct suppliers is estimated to be between $50 billion and $150 billion, worldwide. In light of these challenging electrical environments, considerable time, money, and energy have been expended to find power distribution components that meet the needs of the markets. This disclosure addresses the shortcomings of conventional power distribution components. A full discussion of the features and advantages of the present disclosure is deferred to the following detailed description, which proceeds with reference to the accompanying drawings.

SUMMARY OF THE INVENTION

The present disclosure relates to an electrical connector system having a male connector assembly and a female connector assembly. The male connector assembly includes a male housing assembly and a male terminal assembly having a male terminal, a spring member with at least one contact arm with a significantly bent configuration and an openable jacket that encloses a substantial extent of the male terminal and the spring member. The male terminal assembly also includes a compression limiting means that prevents an external force from overly deforming the contact arm inward. Preventing excessive depression of the contact arm is desirable because it can damage the contact arm and/or the spring member thereby introducing a failure mode to the male connector assembly that can cause the overall connector system to become inoperable and unusable.

According to another aspect, the female connector assembly includes a female housing assembly and a female terminal assembly. The female housing assembly includes a side wall arrangement that is designed to receive the female terminal assembly and thereby facilitate coupling of the male terminal assembly with the female terminal assembly. Also, the female housing assembly minimizes the chance that a foreign object accidentally makes contact with the female terminal assembly and provide a failure mode that can cause the overall connector system to become inoperable and unusable.

Other aspects and advantages of the present disclosure will become apparent upon consideration of the following detailed description and the attached drawings wherein like numerals designate like structures throughout the specification.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 56 is a zoomed in view of a first portion of a female terminal retaining means of FIG. 55;

FIG. 57 is a zoomed in view of a second portion of the female terminal retaining means of FIG. 55;

FIG. 70A is a front perspective view of the spring member of FIG. 66;

FIG. 70B is a rear perspective view of the spring member of FIG. 66;

FIG. 70C is a side view of the spring member of FIG. 66;

FIG. 105 is a perspective view of a seventh embodiment of a male terminal assembly in a fully assembled state, $S_{FA}$;

FIG. 106 is an exploded view of the male terminal assembly of FIG. 105, showing a male terminal, spring member, and a jacket;

FIG. 107 is a perspective view of the spring member shown in FIG. 106;

FIG. 108 is a front view of the spring member of FIG. 107;

FIG. 109 is a side view of the spring member of FIG. 107;

FIG. 110 is a front view of the male terminal assembly of FIG. 105;

FIG. 111 is a cross-sectional view of the male terminal assembly taken along line 111-111 of FIG. 110; and FIG. 112 is a zoomed in view of a frontal portion of the male terminal assembly shown in FIG. 111.

FIG. 113 is a diagram showing a vehicle, an AC charging system, and a DC charging system, wherein the AC charging system and DC charging system have at least one charge coupler and at least one socket;

FIG. 114 is perspective view of the charging system of FIG. 113, where the charge coupler is disconnected from the socket, where each includes at least one male terminal assembly and at least one female terminal assembly;

FIG. 115 is a perspective view of a battery pack having a plurality of the connector systems to electrically connect components of the battery pack;

FIG. 116 is a perspective view of a vehicle skateboard chassis with the battery pack of FIG. 115, as well as wheels and tires;

FIG. 117 is a perspective view of a motor vehicle having the skateboard chassis and battery pack of FIG. 116.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present teachings.

While this disclosure includes several embodiments in many different forms, it should be understood that the present disclosure is to be considered as an exemplification of the principles of the disclosed methods and systems, and is not intended to limit the broad aspects of the disclosed concepts to the embodiments illustrated. As will be realized, the disclosed methods and systems are capable of other and different configurations and several details are capable of being modified without departing from the scope of the disclosed methods and systems. For example, one or more of the following embodiments, in part or whole, may be combined consistently with other disclosed methods and systems. Accordingly, the drawings and detailed descriptions are to be regarded as illustrative in nature, not restrictive or limiting.

Figure 113:
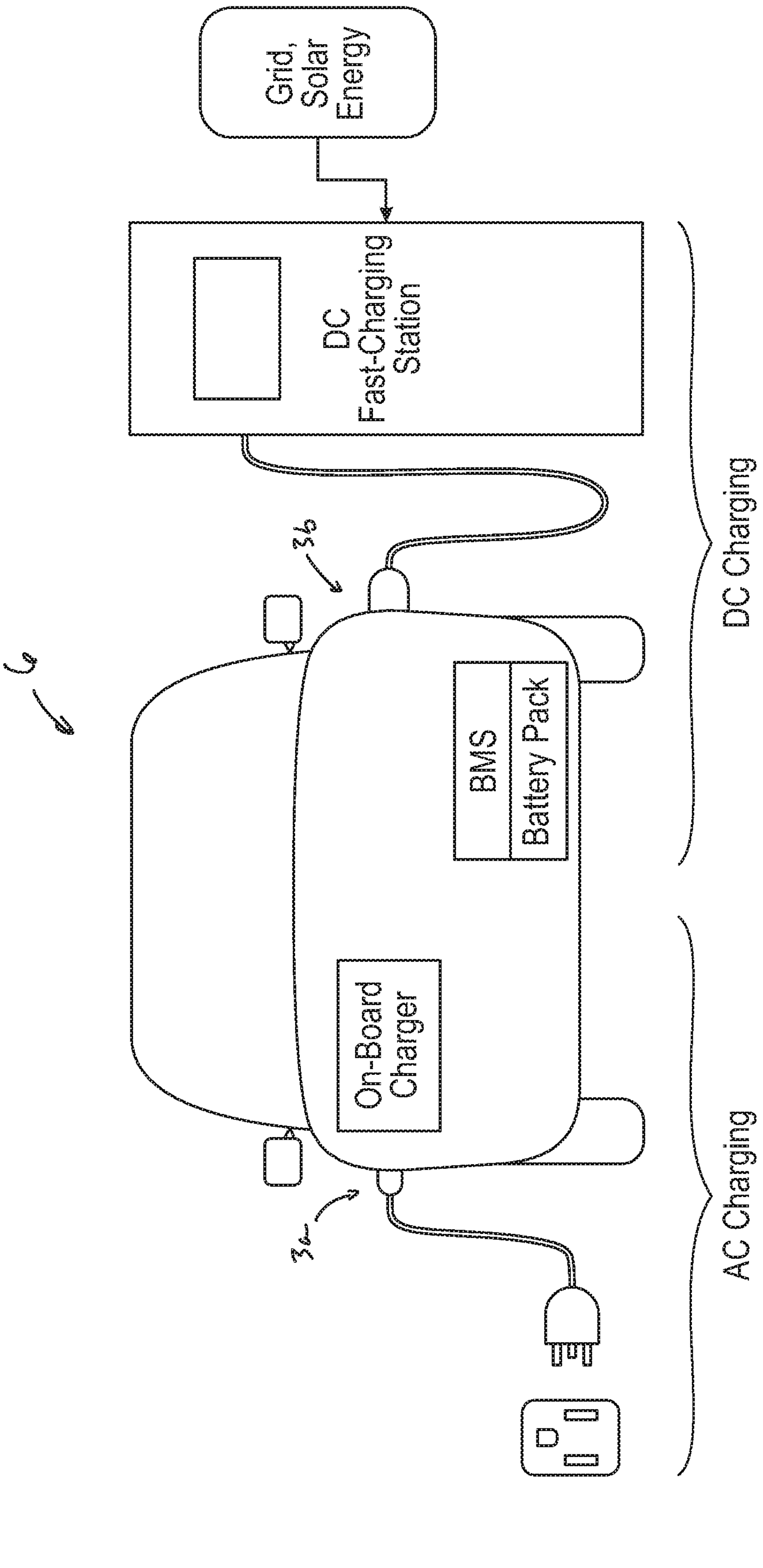
Figure 114:
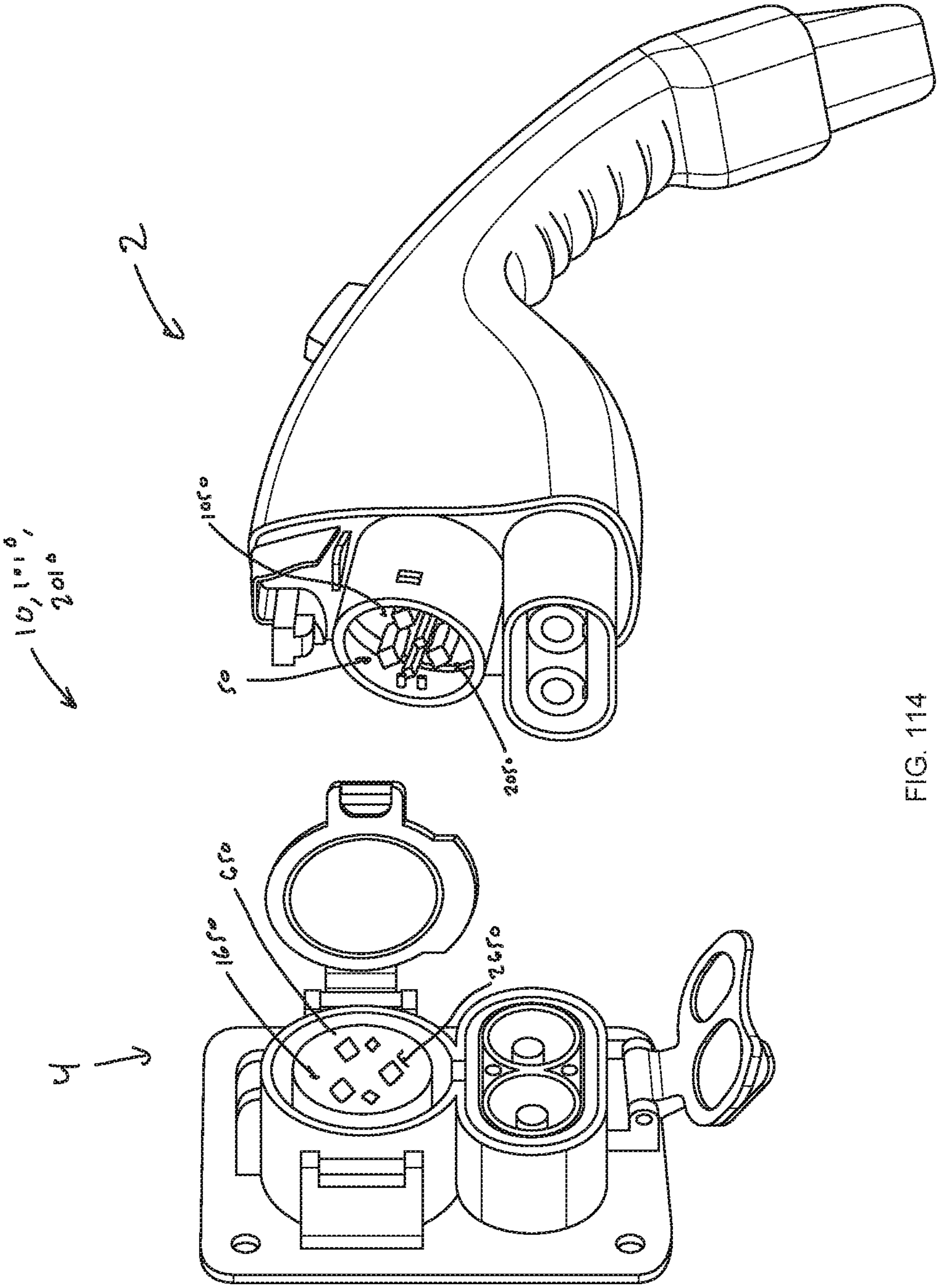
Figure 115:
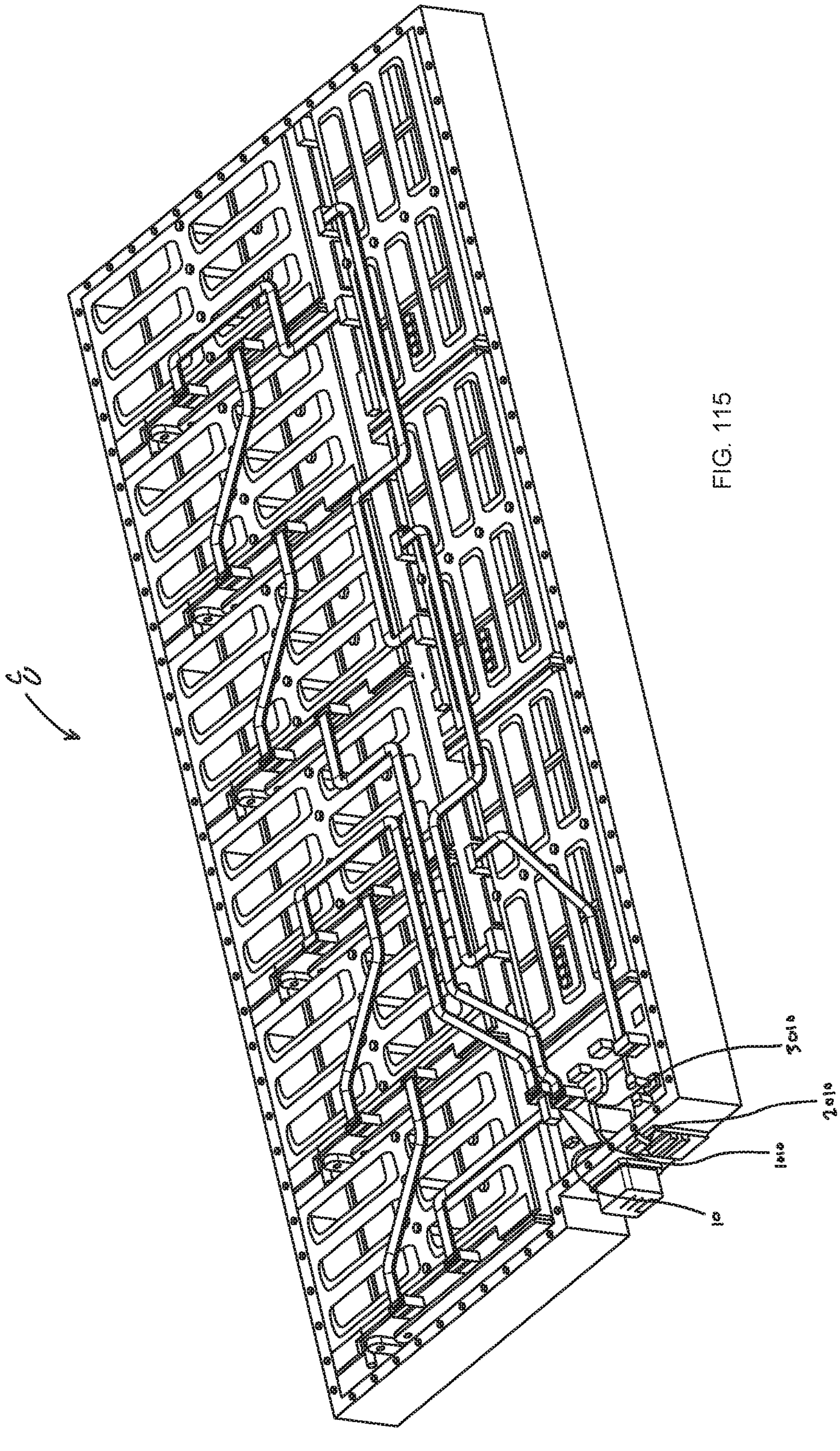
Figure 116:
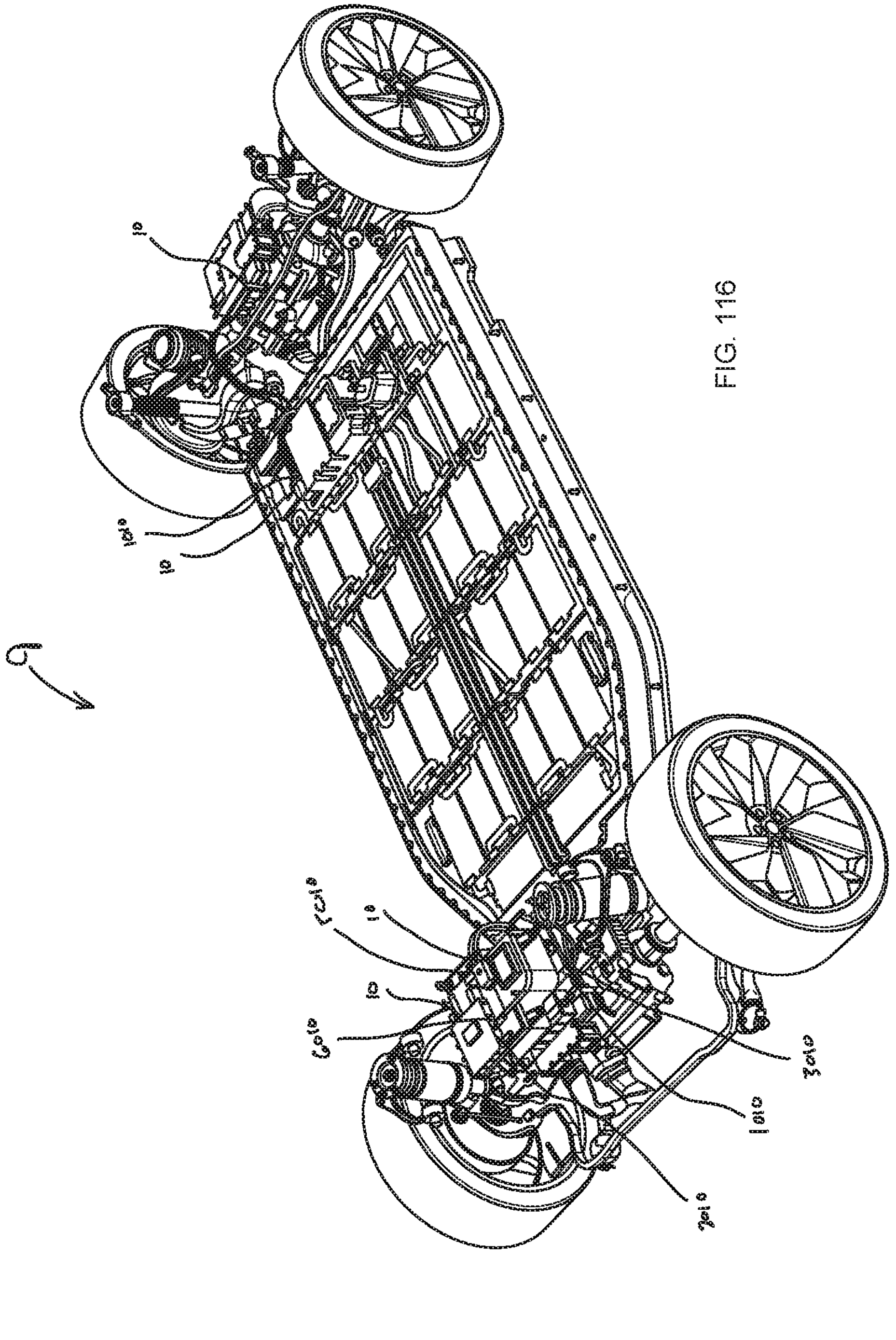
Figure 117:
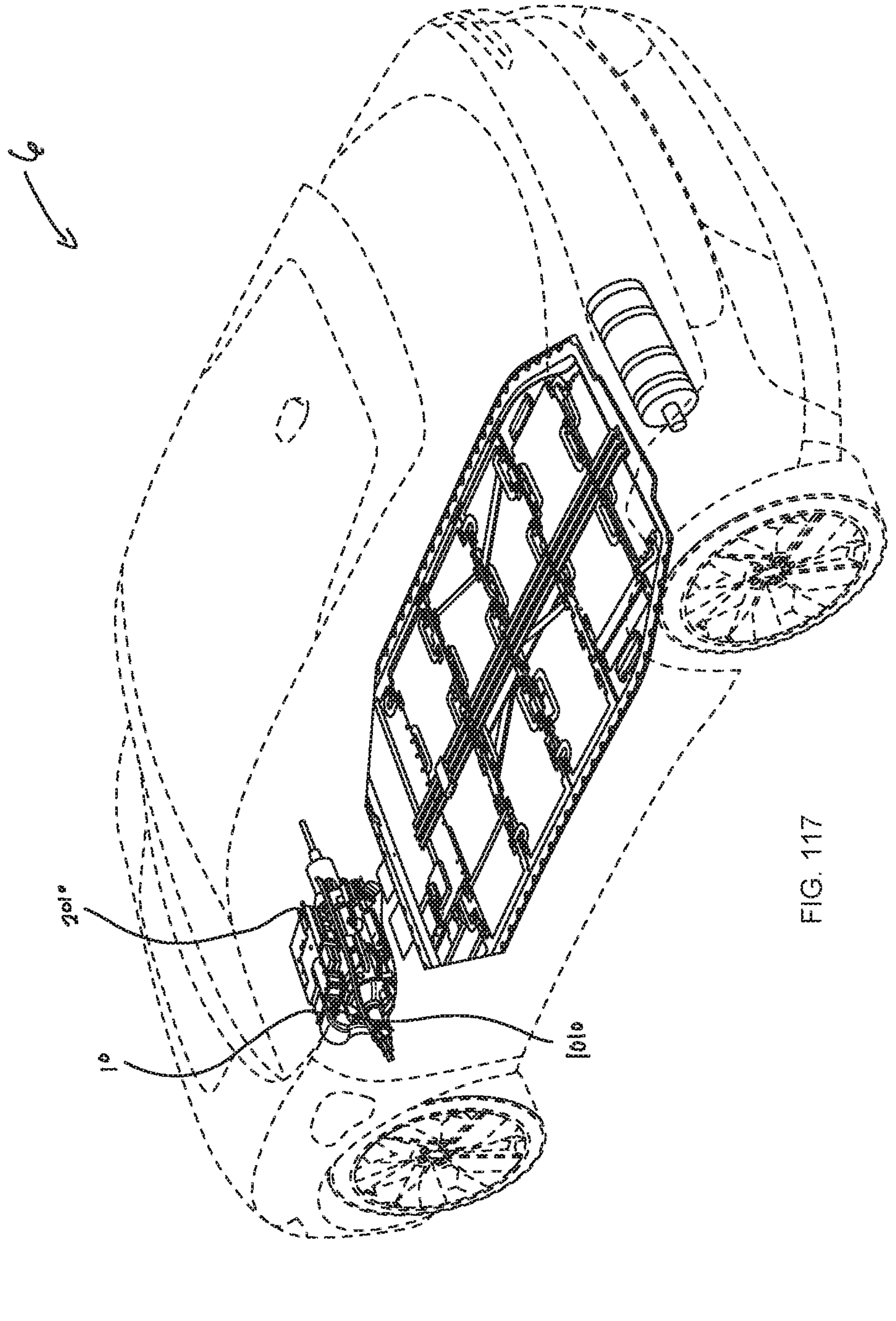

The Figures show seven embodiments of a connector system 10, 1010, 2010, 3010, 4010, 5010, 6010 or components thereof designed to mechanically and electrically couple one device or component to another device or component within a power distribution system or environment. For example, a first device or component can be removable coupled to a second device or component via the connector system 10. The first device or component may be a current supplying device or component—such as charge coupler 2 (see FIGS. 113-114), alternator, battery, or another power source—while the second device or component may be a current drawing device or component—such as socket 4 (see FIGS. 113-114), radiator fan, heated seat, power distribution component, or another current drawing component. In an exemplary embodiment, the FIG. 113 discloses a diagram showing a vehicle 6, an AC charging system 3*a*, and a DC charging system 3*b*, wherein the AC and DC charging systems 3*a*, 3*b* have at least one charge coupler 2 and at least one socket 4. The charge couplers 2 and the sockets 4 are matched to one another such that an extent of the charge coupler 2 can be received by the socket 4. In FIG. 114, the charge coupler 2 may include three male connector assemblies 50. Additionally, the charge coupler 2 may also include two male connector assemblies that are disclosed in PCT/US18/19787, PCT/US19/36010, or PCT/US21/43788. Meanwhile, the socket 4 may include three female connector assemblies 650. Additionally, the socket 4 may also include two female connector assemblies that are disclosed in PCT/US18/19787, PCT/US19/36010, or PCT/US21/43788. When charge coupler 2 is connected to the socket 4: (i) AC power can flow between the male and female connector assemblies 50, 650, and (ii) DC power can flow between the male and female connector assemblies disclosed in PCT/US18/19787, PCT/US19/36010, or PCT/US21/43788. Alternatively, one or more connector systems 10, 1010, 2010, 3010, 4010, 5010, 6010 may be utilized within a single device or component. A power distribution system or environment that includes the connector system 10, 1010, 2010, 3010, 4010, 5010, 6010 may be installed within an airplane, vehicle skateboard 9, motor vehicle 6, a military vehicle (e.g., tank, personnel carrier, heavy-duty truck, and troop transporter), a bus, a locomotive, a tractor, a boat, a submarine, a battery pack 8, a 24-48 volt system, for a high-power application, for a high-current application, for a high-voltage application.

Various aspects of a first embodiment of the connector system 10 are explained in greater detail below. In general terms, the connector system 10 comprises: (i) a male connector assembly 50, and (ii) a female connector assembly 650. FIGS. 1-51 show various views and components of the male connector assembly 50. The first embodiment of the male connector assembly 50 is primarily comprised of: (i) a male housing assembly 70 and (ii) a male terminal assembly 100 having a male terminal 101, a spring member 300, and a jacket 400. FIGS. 52-57 show various views of the first embodiment of the female connector assembly 650, which primarily comprises: (i) a female housing assembly 670 and (ii) a female terminal assembly 700. Finally, FIGS. 58-63 show the positional relationship of and the interactions between the male connector assembly 100 and the female connector assembly 650.

The various seven embodiments of the connector system 10 provide numerous improvements over conventional connectors. With regard to the first embodiment, these improvements include: (i) a male terminal body 104 that includes a base portion 110 and at least one contact arm 180*a*-180*d* with a portion 182*a*-182*d* that is substantially co-planar with said base portion 110, (ii) a male terminal body 104 with an anti-rotation projection 114, which is configured to help prevent the spring member 300 from rotating within the receptacle 105, (iii) the contact arms 180*a*-180*d* have a geometric bent or creased portion 178*a*-178*d* with a free end 190*a*-190*d* that does not abut a planar outer surface of the spring arms 312*a*-312*d*, when the spring member 300 is positioned in the receptacle 105, (iv) the male terminal body 104 and the spring member 300 are configured in a manner that prevents the spring member 300 from being inserted into the receptacle 105 when the contact arms 180*a*-180*d* are in the ready to use position $P_U$ because the bent or creased portion 320*a*-320*d* of the spring member 300 would contact and engage (e.g., get snagged on) the free ends 190*a*-190*d* of the contact arms 180*a*-180*d*, (v) a separate spring member 300 with a geometric bent or creased portion 320*a*-320*d* of the spring arms 312*a*, 312*b*, (vi) a male terminal assembly 100 with means for limiting compression 314 of the contact arms 180*a*-180*d* that could lead to damage of the male terminal assembly 100, (vii) a spring member 300 with two spring arms 312*a*-312*d*, wherein the width of one spring arm 312*a* increases, between two points, such as along its length while the width of the second spring arm 312*b* decreases, between two points, such as along its length, (viii) a jacket 400 that includes spring openings 434*a*,434*b* formed in a frontal jacket segment 430, which are configured to receive an extent of the spring member 300, (ix) the jacket 400 including an arrangement of deflecting projections 418 that are configured to engage the contact arm 180*a-d*, as discussed below. While the foregoing list includes some of the numerous improvements that are included in the first embodiment of the connector system 10, it should be understood that other improvements are disclosed herein and that each and every improvement disclosed herein is not necessary or essential to the configuration, operation, or functionality of the disclosed connector system 10. Other similar embodiments of the connector system 10 are disclosed in FIGS. 64A-74, wherein said other embodiments show alternative configurations of the spring member 1300 and 2300.

Various aspects of a fourth embodiment of the connector system 3010 are disclosed herein and shown in FIGS. 75-100. Specifically, the connector system 3010 comprises: (i) a male connector assembly 3050, and (ii) a female connector assembly 3650. FIGS. 75A-100 show various views and components of the male connector assembly 3050. The fourth embodiment of the male connector assembly 3050 is primarily comprised of: (i) a male housing assembly 3070 with structures and components that are substantially similar to that disclosed above in connection with the first embodiment, and (ii) a male terminal assembly 3100 having a male terminal 3101, a spring member 3300, and a jacket 3400. This fourth embodiment of the male connector assembly 3050 is configured to interact with the female connector assembly 650 disclosed in connection with the first embodiment of the system 10. This fourth embodiment of the connector system 3010 provides numerous improvements over conventional connectors. Some of these improvements include: (i) a male terminal body 3104 that includes a base portion 3110 and at least one contact arm 3180*a*-3180*d* with a portion 3182*a*-3182*d* that is substantially co-planar with said base portion 3110, (ii) said contact arms 3180*a*-3180*d* have a unique bent or creased configuration that creates two contact points 3196*a*-3196*d*, 3198*a*-3198*d* with the spring member 3300, (iii) a male terminal body 3104 with an anti-rotation projection 3114, which is configured to help prevent the spring member 3300 from rotating within the receptacle 3105, (iv) a separate spring member 3300 with a corrugation formed in at least one of the spring arms 3312*a*-3312*d*, (v) a spring member 3300 with means for limiting compression 3314, (vi) a jacket 3400 including deflecting projections 3418. While the foregoing list includes some of the numerous improvements that are included in the fourth embodiment of the connector system 3010, it should be understood that other improvements are disclosed herein and that each and every improvement disclosed herein is not necessary or essential to the configuration, operation, or functionality of the disclosed connector system 3010. Other similar embodiments of the connector system 3010 are disclosed in FIGS. 101-104, wherein said other embodiments show alternative male terminal connection members 4102, 5102.

Various aspects of a seventh embodiment of the connector system 6010 are disclosed herein and shown in FIGS. 105-112. Specifically, the connector system 6010 comprises: (i) a male connector assembly 6050, and (ii) a female connector assembly 6650. FIGS. 105-112 show various views and components of the male connector assembly 6050. The seventh embodiment of the male connector assembly 6050 is primarily comprised of: (i) a male housing assembly 6070 with structures and components that are substantially similar to that disclosed above in connection with the first embodiment, and (ii) a male terminal assembly 6100 having a male terminal 6101, a spring member 6300, and a jacket 6400. This seventh embodiment of the male connector assembly 6050 is configured to interact with the female connector assembly 650 disclosed in connection with the first embodiment of the system 10. This seventh embodiment of the connector system 6010 provides numerous improvements over conventional connectors. Some of these improvements include: (i) a male terminal body 6104 that includes a base portion 6110 and at least one contact arm 6180*a*-6180*d* with a portion 6182*a*-6182*d* that is substantially co-planar with said base portion 6110, (ii) said contact arms 6180*a*-6180*d* have a unique bent or creased configuration that creates two contact points 6196*a*-6196*d*, 6198*a*-6198*d* with the spring member 6300, (iii) a male terminal body 6104 with an anti-rotation projection 6114, which is configured to help prevent the spring member 6300 from rotating within the receptacle 105, (iv) a jacket 6400 including deflecting projections 6418. While the foregoing list includes some of the numerous improvements that are included in the seventh embodiment of the connector system 6010, it should be understood that other improvements are disclosed herein and that each and every improvement disclosed herein is not necessary or essential to the configuration, operation, or functionality of the disclosed connector system 6010.

First Embodiment

1) Male Connector Assembly

The male connector assembly 50 includes multiple components designed to be coupled to a separate device or component (e.g., charge coupler 2, radiator fan, heated seat, power distribution component, or another current drawing component). The male connector assembly 50 is primarily composed of: (i) the male housing assembly 70, and (ii) the male terminal assembly 100 with the male terminal 101, spring member 300, and jacket 400, wherein during operation of the connector system 10 at least a substantial extent of the male terminal assembly 100 resides within the male housing assembly 70.

a. Male Housing Assembly

Referring to FIGS. 1A-2, 36-48, and 60-63, the male housing assembly 70 includes: (i) an internal arrangement of side walls 72, (ii) an external arrangement of side walls 76, (iii) a projection with a retaining wall surface 90, and (iv) a male terminal retaining means 94. The internal arrangement of side walls 72 includes: (i) a plurality of side walls 73*a*-73*d* with contact arm openings 76*a*-76*d*, and (ii) a front wall 74. Said plurality of side walls 73*a*-73*d* and the front wall 74 are integrally formed with one another and are arranged to define a terminal receiver 75. The terminal receiver 75 is configured to receive the male terminal assembly 100 in the fully coupled state, $S_{FC}$. In this fully coupled state, $S_{FC}$: (i) the contact arm openings 76*a*-76*d* receive an extent of the contact arms 180*a*-180*d* to enable a mechanical and electrical connection between said contact arms and the female terminal body 710, and (ii) the frontal segment 430 of the jacket 400 is positioned adjacent to an inner surface of the front wall 74 of the housing 70. In other words, when the connector assembly 50 is in the fully coupled state, $S_{FC}$, an extent of the contact arms 180*a*-180*d* extend through the contact arm openings 76*a*-76*d*.

The external arrangement of side walls 76 includes: (i) two opposed side walls 78*a*, 78*b* with a plurality of projections 80 and recesses 82, (ii) a curvilinear bottom wall 78*c* that extends between the opposed side walls 78*a*, 78*b*, and (iii) a deformable top wall 78*d* with a female receiver opening 84 formed therethrough. Each of the walls 78*a*-78*d* are spaced a housing distance $D_H$ away (shown in FIG. 46) from the external surfaces of the internal arrangement of side walls 72. When the system 10 is in the connected state $S_C$ (shown in FIG. 61): (i) said housing distance $D_H$ is occupied by an extent of the female connector assembly 650 and more specifically an extent of the female housing assembly 670, (ii) the recesses 82 receive projections 697 formed in the side walls 672 of the female housing assembly 670, (iii) the projections 80 are positioned within recesses 698 formed in the side walls 672 of the female housing assembly 670, and (iv) the female receiver opening 84 receives the coupling projection 699.

Rearward of wall plane $P_W$ (shown in FIG. 43), the internal arrangement of side walls 72 and the external arrangement of side walls 80 merger into a single structure, namely-a connector arrangement of side walls 86. Said connector arrangement of side walls 86 is designed to surround a rearward extent of the male terminal assembly 100 and the wire coupled to the male terminal assembly 100. The male terminal retaining means 94 and the retaining wall surfaces 90 are positioned rearward of the wall plane $P_W$ and configured to secure the male terminal assembly 100 within the housing 70. The retaining wall surfaces 90 are formed from projections that extent inward from an inner surface of the connector arrangement of side walls 86. Additionally, the male terminal retaining means 94 includes: (i) a retaining body 96, and (ii) a retaining opening 95 formed in the first extent of the connector arrangement of side walls 86. The retaining body 96 is a U-shaped structure designed to be positioned adjacent to the first extent of the connector arrangement of side walls 86 and includes securing projections 97*a*, 97*b*, and retaining projections 98*a*, 98*b*. The securing projections 97*a*, 97*b* are positioned near the ends of the legs that form the U-shaped structure, while the retaining projections 98*a*, 98*b* extend from the upper crossing member that extends between the legs of the U-shaped structure.

When the connector assembly 50 is in the fully coupled state, $S_{FC}$: (i) the locking tabs 426 of the jacket 400 are positioned forward of the retaining wall surfaces 90, (ii) the retaining body 96 is positioned adjacent a first extent of the connector arrangement of side walls 86, and the securing projections 97*a*, 97*b* are positioned below an opposed second extent of the connector arrangement of side walls 86, and (iii) the retaining projections 98*a*, 98*b* extend into the retaining opening 95, and are positioned rearward of the male terminal body 104. This configuration of structures helps prevent rearward movement of the male terminal assembly 100, while securing the male terminal assembly in the housing 70. In fact, this combination ensures a force that is less than 200 Newtons will not dislodge the male terminal assembly 100 from the housing 70. The combination of the recesses 698, 82, projections 80, 697 forms a system 10 with keyed configuration, wherein the male connector assembly 50 can only mate with the female connector assembly 650 when the male connector assembly 50 is in a specific orientation relative to the female connector assembly 650.

The male housing assembly 70 is formed from a non-conductive plastic and is designed to protect and isolate the conductive male terminal assembly 100 from accidental contact with foreign objects. In other embodiments, the male terminal retaining means 94 may be replaced with any structure that would perform a similar function and is disclosed in any application incorporated herein by reference. Some of these structures may include other types of mechanical/structural members or bodies that generate a biasing force on the male terminal assembly 100, magnets, springs, or other types of retaining means. In further embodiments, the housing 70 may include: (i) a connector position assurance (CPA) assembly that includes a readable or scannable indicia, which meets USCAR Specifications, including USCAR-12, USCAR-25, and USCAR-2, (ii) an EMI shield, (iii) additional layers of non-conductive and/or conductive materials, and/or (iv) a larger footprint (e.g., charge coupler 2) to accept multiple male terminal assemblies 50. Other similar male housing assemblies are disclosed in applications incorporated herein by reference, and features of these housing assemblies may be incorporated into the male housing assembly 70 of the male connector assembly 50 disclosed herein.

b. Male Terminal Assembly

FIGS. 3-51 and 58-63 provide various views of the male terminal assembly 100. Referring to the first embodiment, the male terminal assembly 100 includes the male terminal 101, spring member 300, and jacket 400. In addition to these major structural components 101, 300, 400, the male terminal assembly 100 also includes means for limiting compression 314. As discussed below, said means for limiting compression 314 may be formed from interactions between the major structural components 101, 300, 400 or may be contained within a single component 101, 300, 400.

i. Means for Limiting Compression

Unlike conventional male terminal assemblies, the male terminal assembly 100 disclosed herein includes the means for limiting compression 314. Said means for limiting compression 314 is designed to prevent an external force $F_E$ from excessively deforming or overly depressing the contact arms 180*a*-180*d* and the spring arm 316*a*-316*d* toward the center of the connector 50. Prevention of excessive deformation or depression of the contact arm 180*a*-180*d* and the spring arm 312-312*d* is desirable because said deformation or depression can damage the contact arm 180*a*-180*d*, the spring member 312*a*-312*d*, or a combination of the contact arm 180*a*-180*d* and the spring member 312*a*-312*d* to a point that the terminal assembly 100 becomes damaged, inoperable and/or unusable. Thus, said means for limiting compression 314 reduces this potential failure mode of the terminal assembly 100. While reducing this potential failure mode is beneficial, it should be understood that means for limiting compression 314 should not interfere with normal or operational deformation $D_{NC}$ (see FIG. 63) of the contact arm 180*a*-180*d* and the spring member 312*a*-312*d*. In this embodiment, the means for limiting compression 314 includes two separate combinations of limiting structures 315*a*, 315*b*, wherein the first combination of limiting structures 315*a* protects spring arms 312*a*, 312*c* and contact arms 180*a*, 180*c* and the second combination of limiting structures 315*b* protect spring arms 312*b*, 312*d* and contact arms 180*b*, 180*d*. Each of these limiting structures 315*a*, 315*b* will be discussed in great detail below.

ii. Male Terminal

Figure 1A:
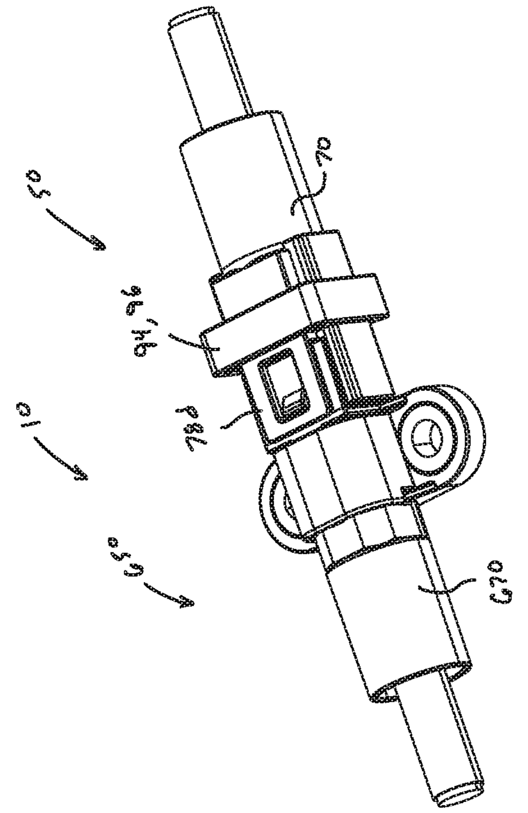
FIG. 1A is a perspective view of a first embodiment of a connector system in a connected state $S_C$, showing a male connector assembly connected to a female connector assembly.
Figure 1B:
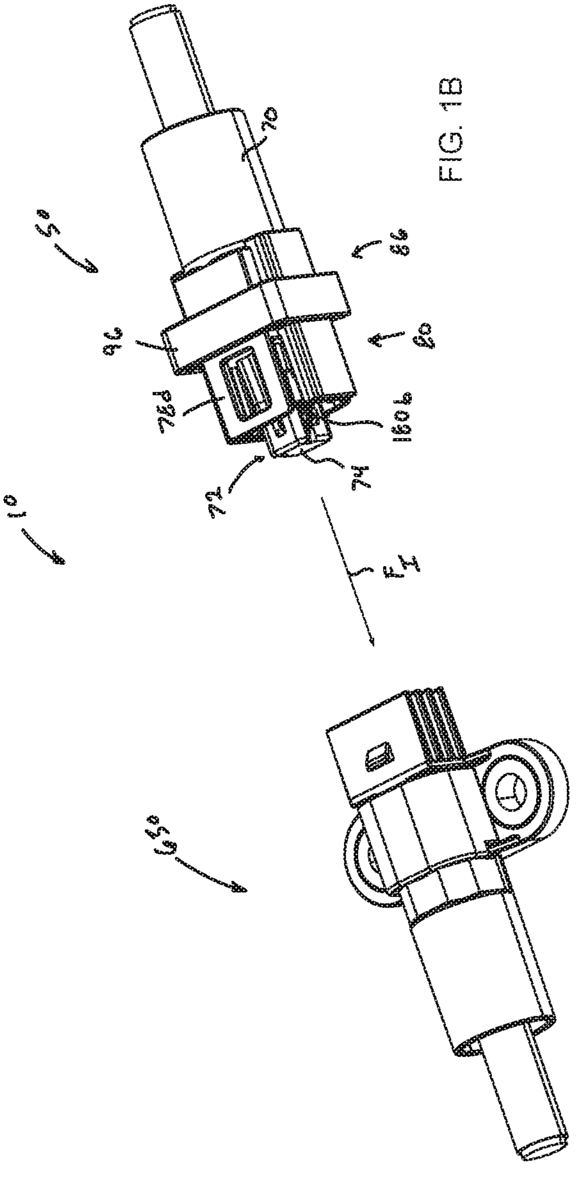
FIG. 1B is a perspective view of the connector system of FIG. 1A in a disconnected state $S_{DC}$, showing the male connector assembly disconnected from the female connector assembly.
Figure 2:
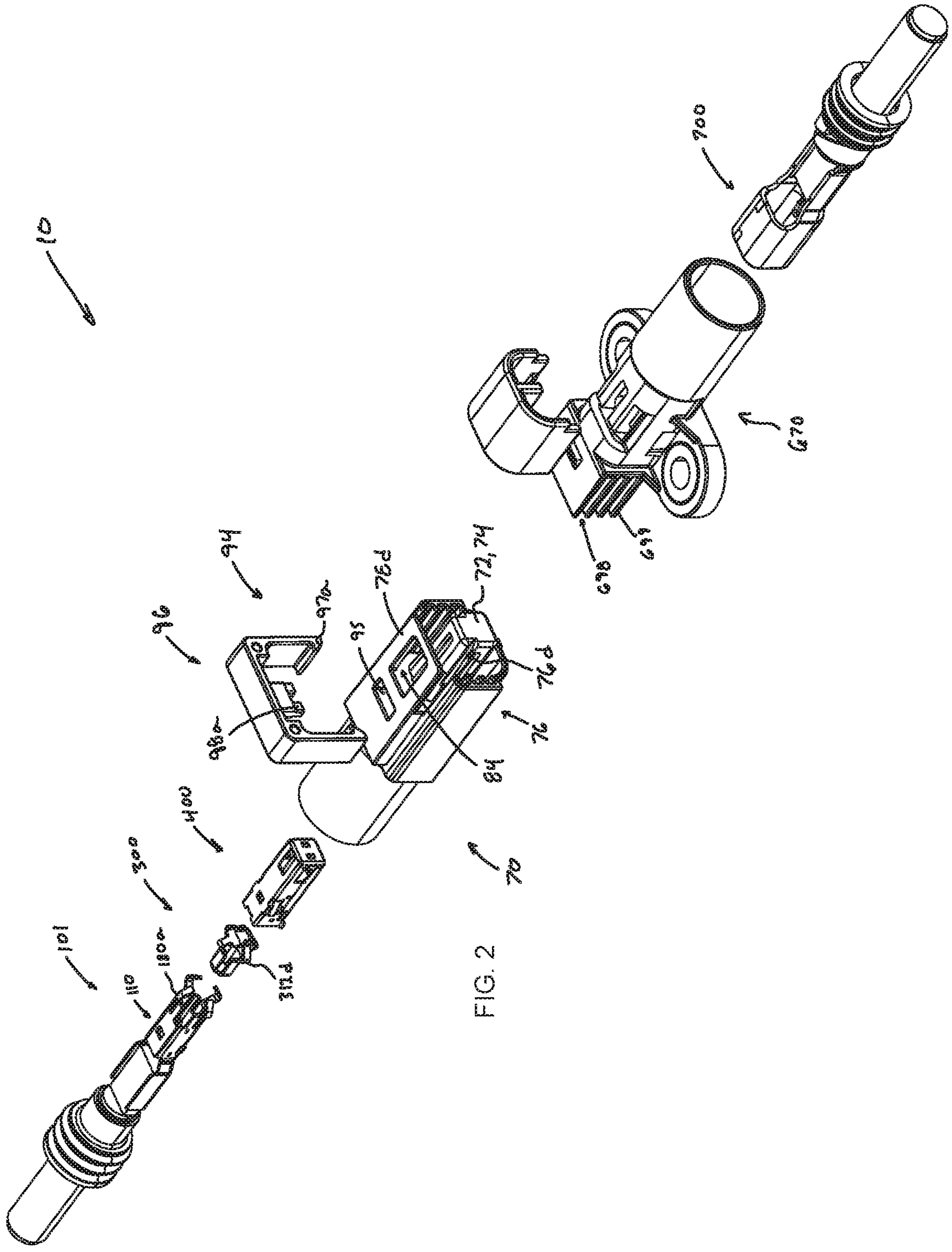
FIG. 2 is an exploded view of the connector system of FIGS. 1A and 1B, showing the male connector assembly with a male terminal assembly and the female connector assembly with a female terminal assembly.
Figure 3:
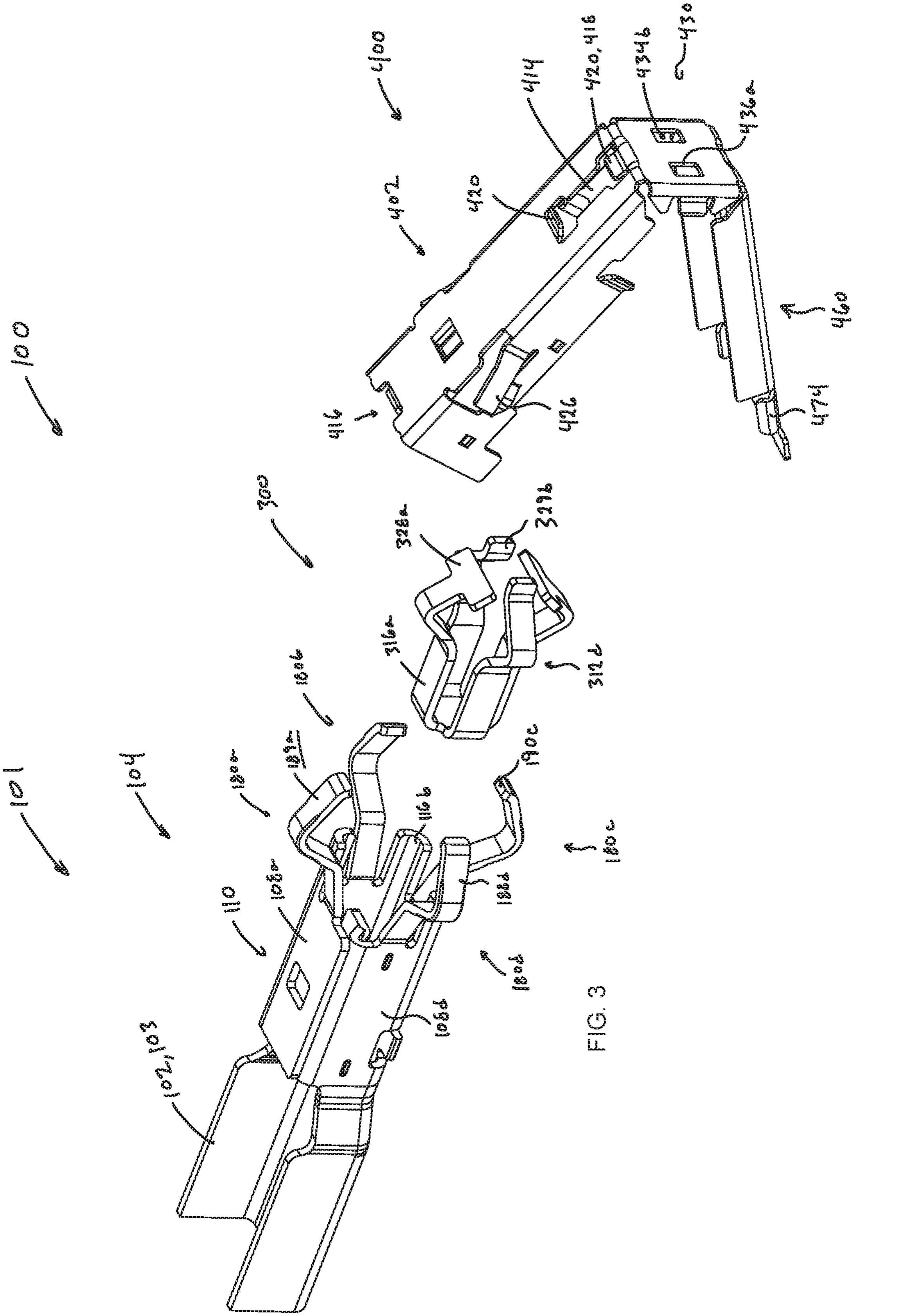
FIG. 3 is an exploded view of the male terminal assembly of FIG. 2, showing a male terminal, a spring member, and a jacket.
Figures 4, 5A, 5B, 5C, 5D:
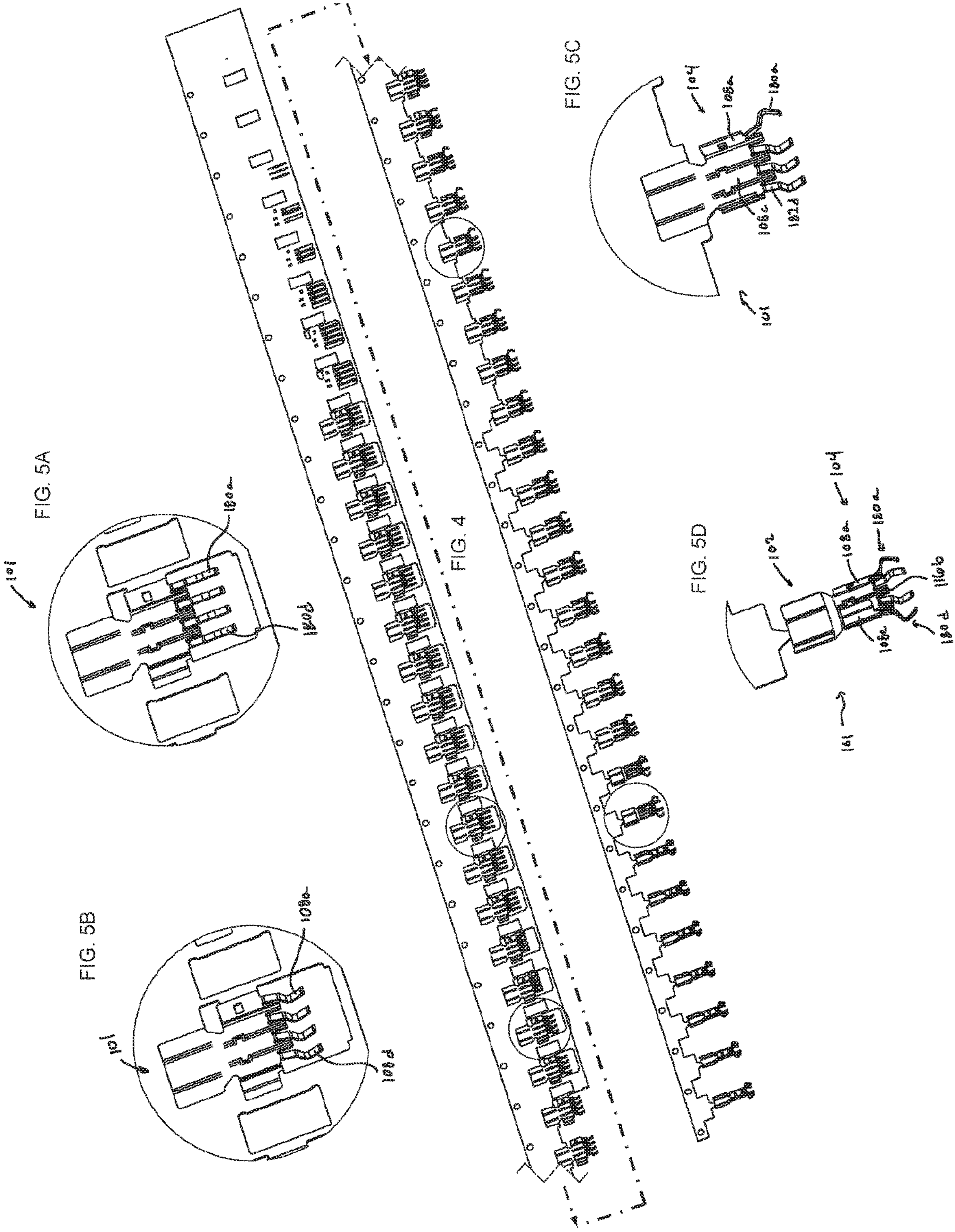
FIG. 4 is a perspective view of the steps in the process of forming the male terminal of FIG. 3 from a blank.
FIGS. 5A-5D are zoomed-in views of steps shon in FIG. 4.
Figures 16, 17, 18:
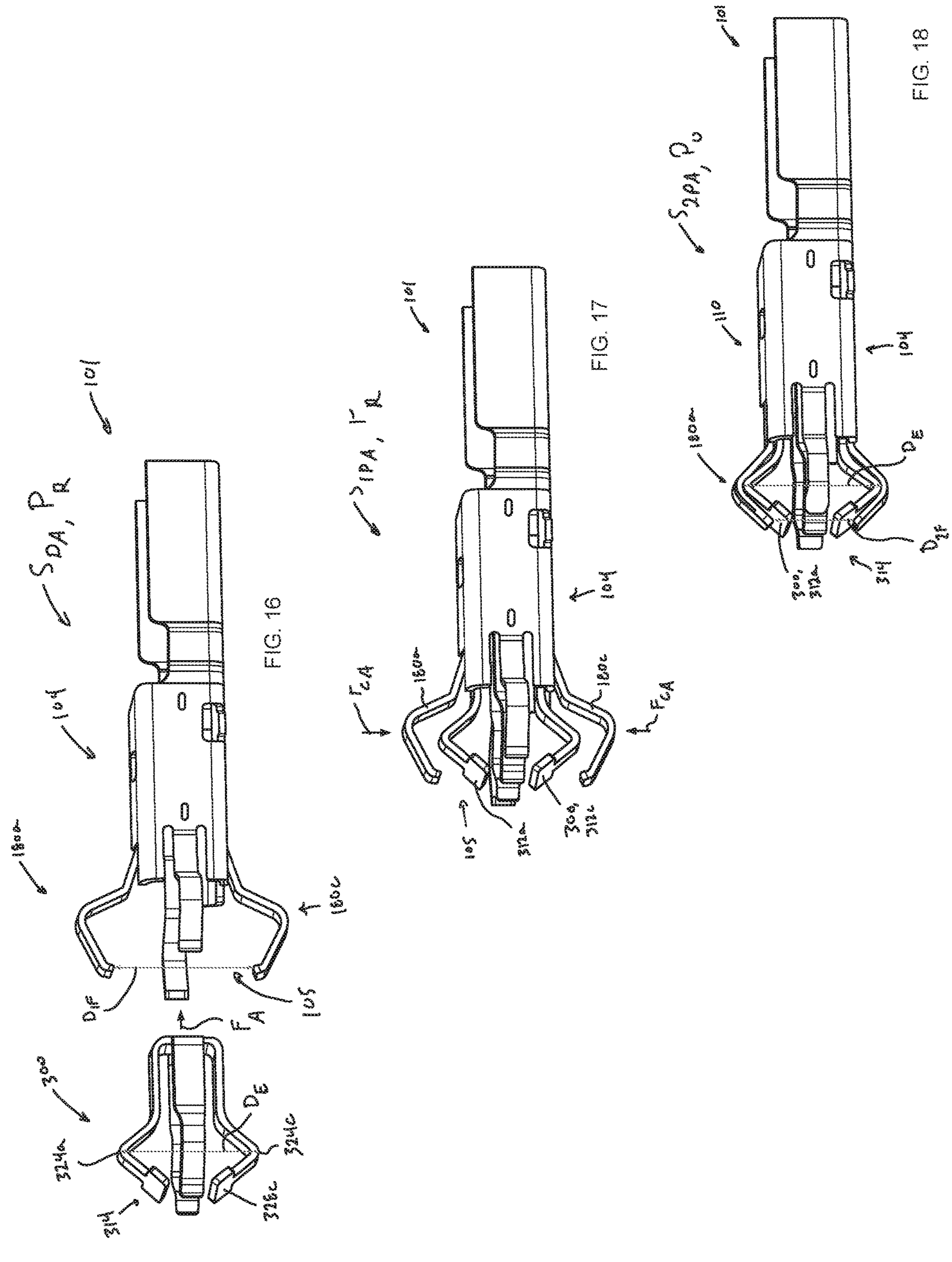
FIG. 16 is a perspective view of the spring member and the male terminal of FIG. 3 in a disassembled state, $S_{DA}$.
FIG. 17 is a perspective view of the spring member and the male terminal of FIG. 3 in a first partially assembled state, $S_{1PA}$.
FIG. 18 is a perspective view of the spring member and the male terminal of FIG. 3 in a second partially assembled state, $S_{2PA}$.

In particular, FIGS. 6A-10, 25-51, and 58-63 show the male terminal 101 in a ready to use position $P_U$, while FIGS. 3 and 16-17 show the male terminal in the ready to receive position $P_R$. FIGS. 4 and 5A-5D illustrate the steps that may be undertaken to form the male terminal 101 from a blank piece of metal (e.g., copper). In particular, this process may include a plurality (e.g., 53) steps of cutting and/or bending the metal blank. Once these steps have been performed, the male terminal 101 will be formed to include the below-described structures. These structures include a male terminal connection member 102 and a male terminal body 104. Specifically, the male terminal connection member 102 is coupled to the male terminal body 104. In this embodiment, the male terminal connection member 102 is a wire receiver 103, wherein said wire receiver 103 has a U-shaped receptacle that is configured to receive an extent of an external structure (e.g., lead or wire) that connects the male terminal assembly 100 to a device (e.g., an alternator) external to the connector system 10. A wire is typically welded to the wire receiver 103; however, other methods (e.g., forming the wire as a part of the wire receiver 103) of connecting the wire to the wire receiver 103 are contemplated by this disclosure. In other embodiments, the male terminal connection member 102 may be a blade, a crimp, a circuit board connector (see FIG. 104), or any other type of connection member 102 that mechanically and electrically couples the male terminal body 104 to an external device, part, or extent.

FIGS. 3-10 show that the male terminal body 104 includes a wall arrangement 106. Said side wall arrangement 106 is comprised of the following integrally formed walls that include: (i) a top wall 108*a* that extends between $S_1$ and $S_2$, (ii) a first side wall 108*b* that extends between $S_2$ and $S_3$, (iii) a bottom wall 108*c* that extends between $S_3$ and $S_4$, (iii) a second side wall 108*d* that extends between $S_4$ and $S_5$ and (iv) an interior spring wall 108*e* that extends between $S_5$ and $S_6$ (see FIG. 7A). The combination of the side walls 108*b*, 108*d*, top wall 108*a*, and bottom wall 108*c* form a cuboidal shaped base or intermediate portion 110 that extends between a first base plane $P_{B1}$ and a second base plane $P_{B2}$, which is preferably has a rectanguloid configuration. As best shown in FIG. 7A, base or intermediate portion 110 does not have a continuous perimeter. In other words, the top wall 108*a* is not directly connected to either the second side wall 108*d* or the interior spring wall 108*e*. Additionally, the interior spring wall 108*e* is not directly connected to another wall 108*a*-108*c*. But for the inclusion of the jacket 400, the male terminal 101 configuration could allow the male terminal 101 to expand during operation or use of the system 10. Nevertheless, said possible expansion of the male terminal 101 may be mitigated in other embodiments by forming the base or intermediate portion 101 with a continuous perimeter, by directly connecting the top wall 108*a* to either the second side wall 108*d* or the interior spring wall 108*e*, or directly connecting the interior spring wall 108*e* to another wall 108*a*-108*c*.

Figure 31:
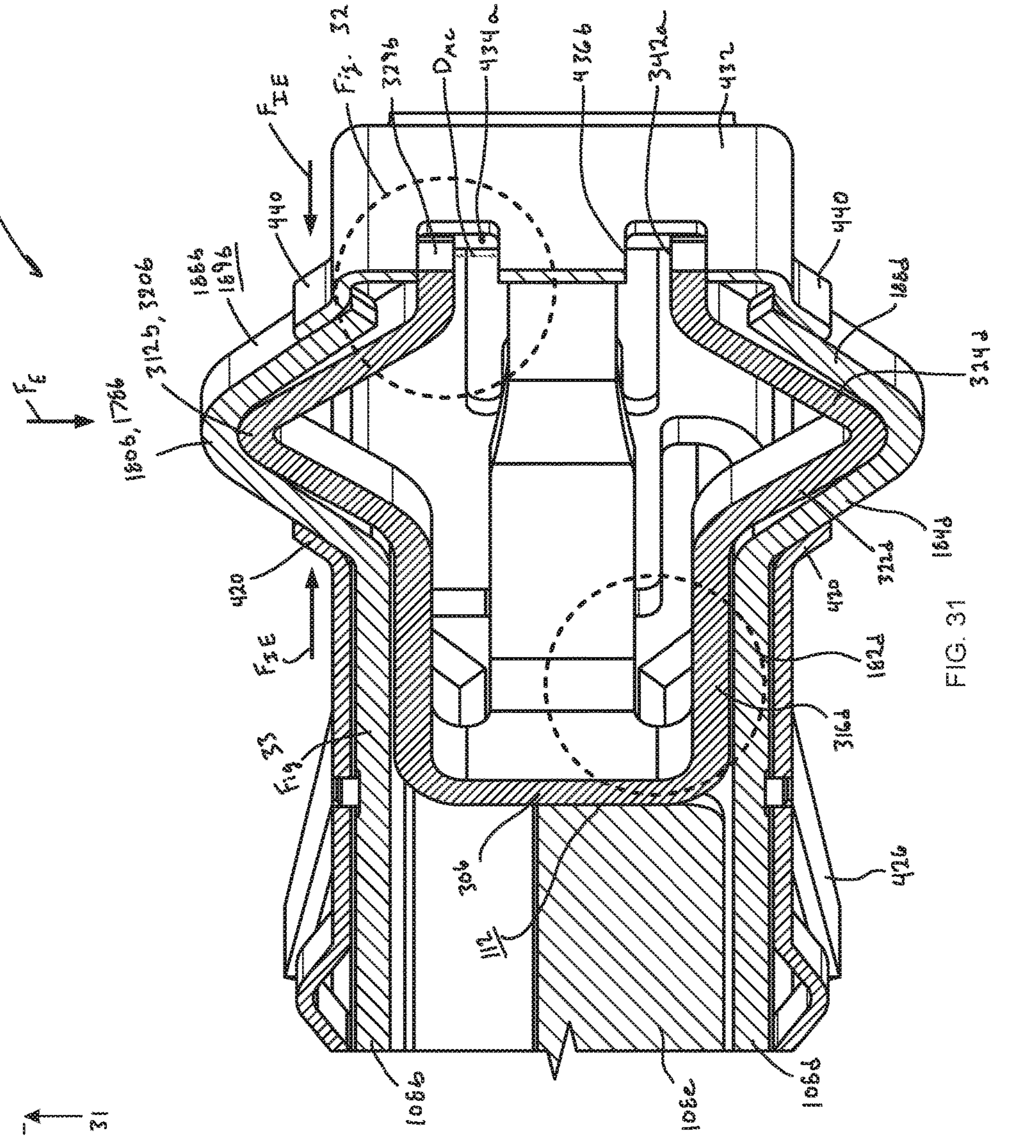
FIG. 31 is a perspective cross-sectional view of the male terminal assembly taken along line 31-31 of FIG. 30.
Figure 30:
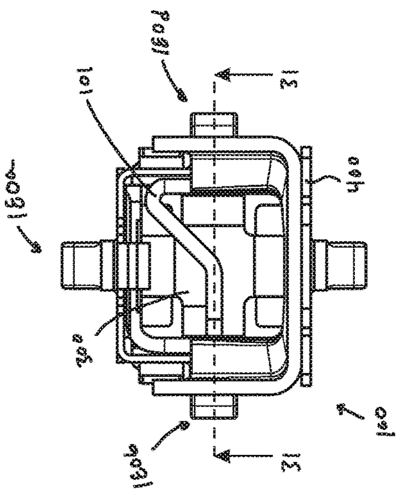
FIG. 30 is a rear view of the male terminal assembly in the fully assembled state $S_{FA}$ of FIG. 27.
Figure 32:
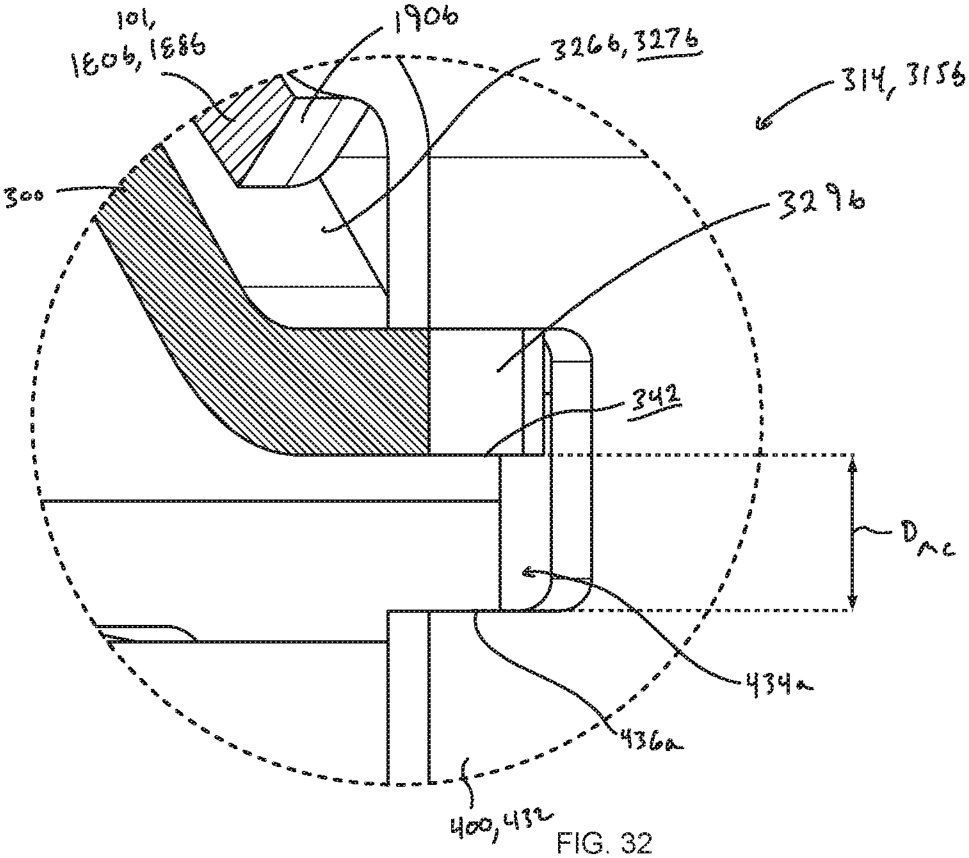
FIG. 32 is a zoomed in view of a frontal portion of the male terminal assembly shown in FIG. 31.
Figure 33:
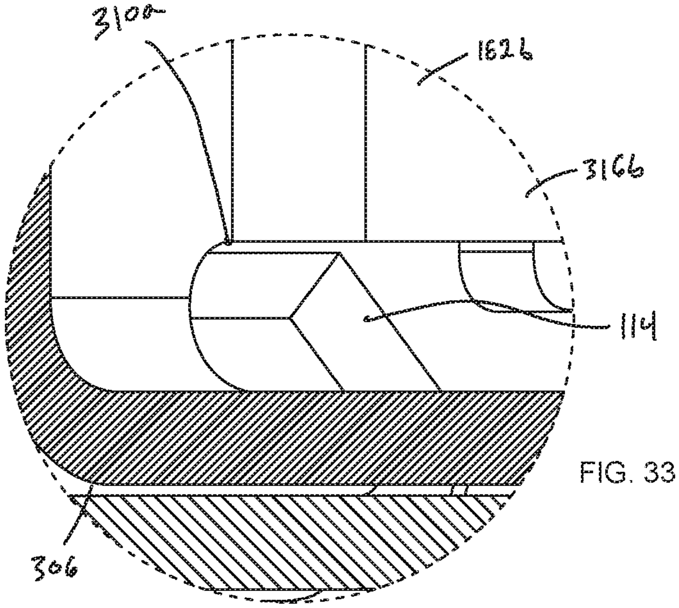
FIG. 33 is a zoomed in view of a rear portion of the male terminal assembly shown in FIG. 31.
Figure 35:
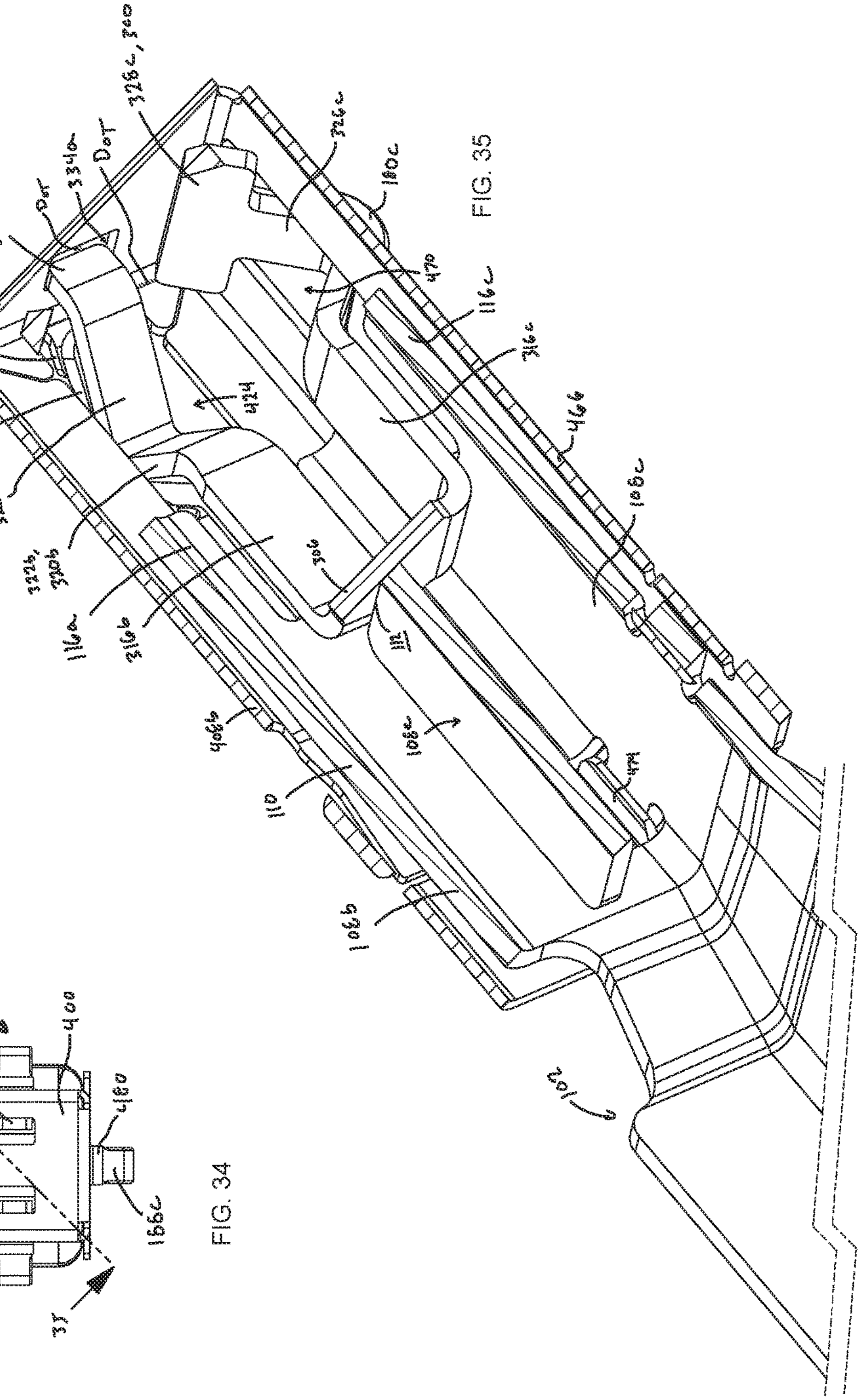
FIG. 35 is a cross-sectional view of the male terminal assembly taken along line 35-35 of FIG. 34.
Figure 34:
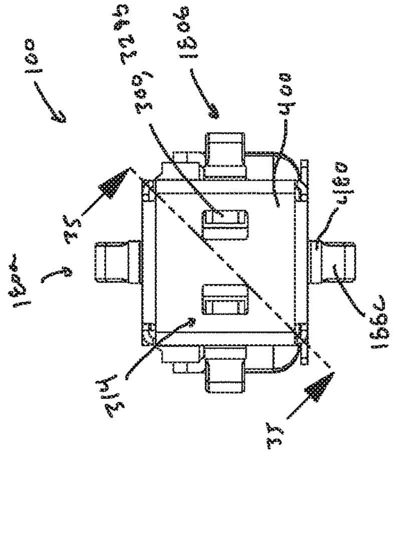
FIG. 34 is a front view of the male terminal assembly in the fully assembled state $S_{FA}$ of FIG. 27.
Figure 37:
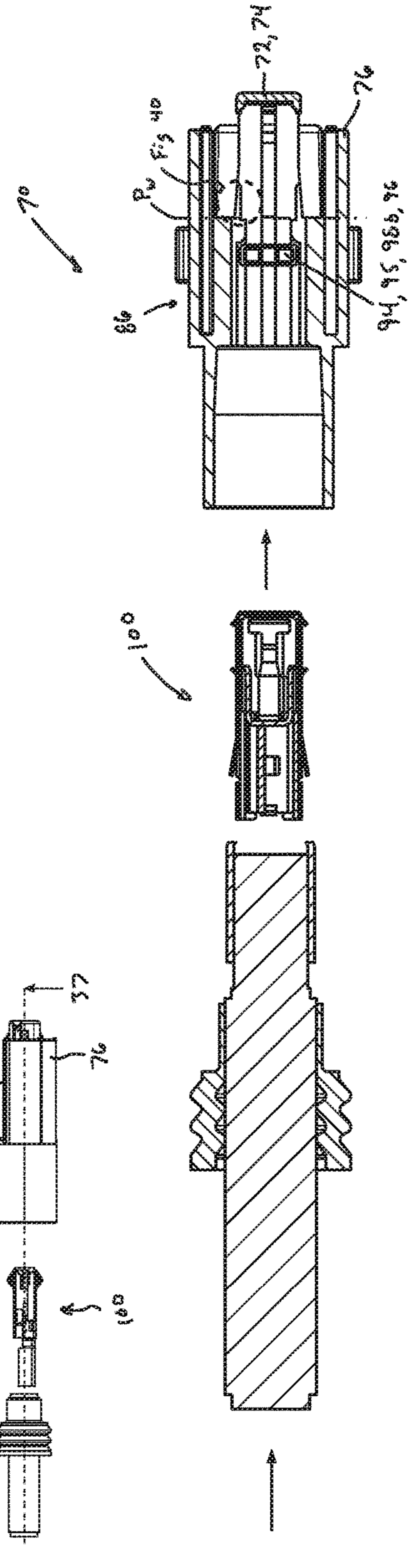
FIG. 37 is a cross-sectional view of the male connector assembly taken along line 37-37 of FIG. 36.
Figure 39:
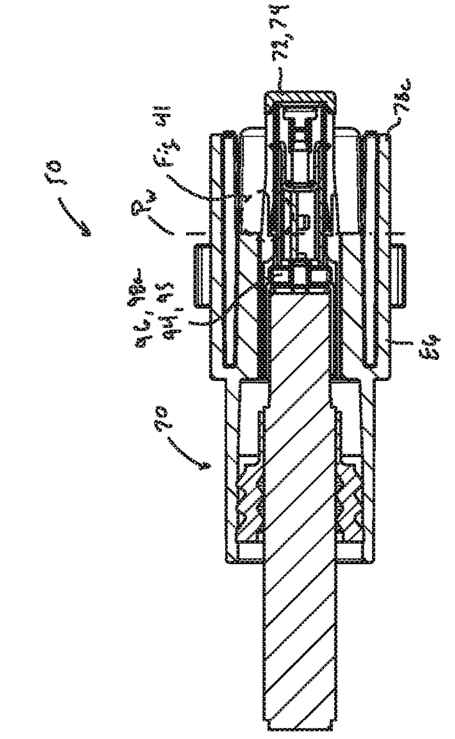
FIG. 39 is a cross-sectional view of the male connector assembly taken along line 39-39 of FIG. 38.

The above described interior spring wall 108*e* is positioned within said base or intermediate portion 110 and includes a frontal surface 112 configured to be positioned adjacent to a rear surface of the spring member 300 (when the spring member is positioned within the male terminal body 104). The frontal surface 112 of the interior spring wall 108*e* is not co-planar but has a staggered configuration. In other words, the interior spring wall 108*e* includes a recess that forms an anti-rotation projection 114. As best shown in FIGS. 31, 33, said anti-rotation projection 114 is configured to be positioned within an anti-rotation recess or spring arm gap 310*a* formed in the spring member 300, when the spring member 300 is positioned in the male terminal body 104 (which occurs when the spring member 300 is positioned in the male terminal 101 are in at least the first partially assembled state, $S_{1PA}$). It should be understood that the combination of the anti-rotation projection 114 and the anti-rotation recess 310*a* may be replaced with a different structure or combination of structures designed to prevent the spring member 300 from rotating within the male terminal 101 or these structures may be omitted in their entirety. It should also be understood that the interior spring wall 108*e* may be replaced with a different structure or combination of structures that are designed to ensure that the spring member 300 is properly placed (e.g., not forced rearward) within the male terminal 101 or this structure may be omitted in its entirety.

The side walls 108*b*, 108*d*, top wall 108*a*, and bottom wall 108*c* each include the following structure/anti-structures that extend forward from the second base plane $P_{B2}$: (i) at least one contact arm 180*a*-180*d* with two primary portions 182*a*-182*d* and 178*a*-178*d*, and preferably a plurality of contact arms 180*a*-180*d*, (ii) supporting ribs 116*a*-116*c*, and (iii) contact arm gaps or voids 120*a*-120*g* that are positioned between either the contact arms 180*a*-180*d* and the adjacent supporting rib 116*a*-116*c* or adjacent contact arms 180*a*, 180*d*, wherein the supporting ribs 116*a*-*c* have an overall length that is less than an overall length of the contact arms 180*a*-*d*. This configuration creates multiple structure/anti-structures within the side walls 108*b*, 108*d*, top wall 108*a*, and bottom wall 108*c*, wherein said structure/anti-structures may include seven distinct structure/anti-structures integrally formed (i.e., not separate) with one another. For example, the bottom wall 108*c* includes: (i) a geometric bent or creased portion 178*c*, (ii) a first, rear, or linear extent 182*c* of a contact arm 180*c*, (iii) a portion of a second supporting rib 116*b*, (iv) a portion of a third supporting rib 116*c*, (v) a fourth contact arm gap or void 120*d*, (vi) a fifth contact arm gap or void 120*e*, and (vii) an extent of the base or intermediate portion 110.

The contact arm voids 120*a*-120*g* are formed in the walls 108*a*-108*d* and delineate the contact arms 180*a*-180*d* and the supporting ribs 116*a*-116*c*. For example, the second contact arm void 120*b* is positioned between the first supporting rib 116*a* and the second contact arm 180*b*, while the third contact arm void 120*c* is positioned between the second contact arm 180*b* and the second supporting rib 116*b*. The male terminal body 104 only includes three supporting ribs 116-116*c*. In other words, the male terminal body 104 lacks a supporting rib positioned adjacent to the top wall 108*a* and the second side wall 108*d*. Said body 104 lacks this supporting rib due to the configuration/formation of the interior spring wall 108*e*. The supporting ribs 116*a*-116*c* include three segments, which include a first linear segment, a curvilinear segment, and a second linear segment. The first and second linear segments are substantially co-planar with the associated wall 108*a*-108*d*. This configuration allows the supporting ribs 116*a*-116*c* to be extend around the corners of the male terminal body 104.

Said supporting ribs 116*a*-116*c* extend from base portion 100 (second base plane $P_{B2}$), along the first or rear extent 182*a*-182*d* of a contact arm 180*a*-180*d*, but do not extend along the geometric bent or creased portion 178*c* of the contact arms 180*a*-180*d*. In other words, the distal ends 118*a*-118*c* of the supporting ribs 116*a*-116*c* are not positioned forward of a bend plane $P_B$ corresponding to the bend portion 178*c*. As shown in the Figures, the distal ends 118*a*-118*c* of the supporting ribs 116*a*-116*c* are not connected to one another or any other structures. Accordingly, the length of said supporting ribs 116*a*-116*c* has been determined by balancing: (i) too long they will not provide adequate support to the contact arms 180*a*-180*d* and/or jacket 400 at or near the distal ends 118*a*-118*c* of the supporting ribs 116*a*-116*c*, and (ii) too short they will not provide adequate support to the contact arms 180*a*-180*d* and/or jacket 400. Nevertheless, in other embodiment, the supporting ribs 116*a*-116*c* may be lengthened to extend along the entire contact arm 180*a*-180*d*, shortened to only extend along a portion of the first or rear extent 182*a*-182*d* of a contact arm 180*a*-180*d*, an additional supporting rib may be added between contact arms 180*c* and 180*d*, or omitted in their entirety.

As best shown in FIGS. 6A-10, the contact arms 180*a*-180*d* are formed in the peripheral walls 108*a*-108*d* and extend from the base or intermediate portion 110 of the male terminal body 104. As shown in the figures, multiple contact arms 180*a*-180*d* are not formed in a single wall 108*a*-108*d*. In other words, there is a one-to-one relationship between the number of peripheral walls 108*a*-108*d* and the number of contact arms 180*a*-180*d*. This one-to-one spacing allows the contact arms 180*a*-180*d* to be spaced apart from one another along the perimeter of said base portion 110 to help ensure that other structures of the male terminal assembly 100 do not interfere with one another during the use or operation of the system 10. Nevertheless, in other embodiments, each of the walls 108*a*-108*d* may include multiple (e.g., 2 to 50) contact arms 180*a*-180*d*. As discussed above, supporting ribs 116*a*-116*c* are positioned in the spaces between a majority of the contact arms 180*a*-180*c*. The combination of the supporting ribs 116*a*-116*c* and the contact arms 180*a*-180*c* form a spring receiver 105, which is configured to receive the spring member 300 in at least the first partially assembled state, $S_{1PA}$.

Figure 6B:
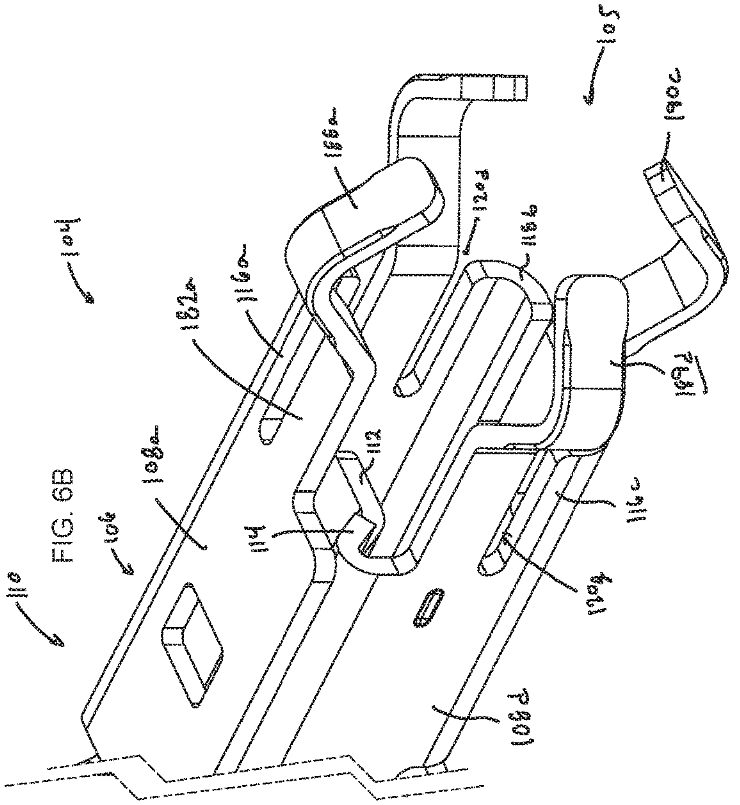
FIG. 6B is a prospective view of the male terminal of FIG. 3.
Figure 6A:
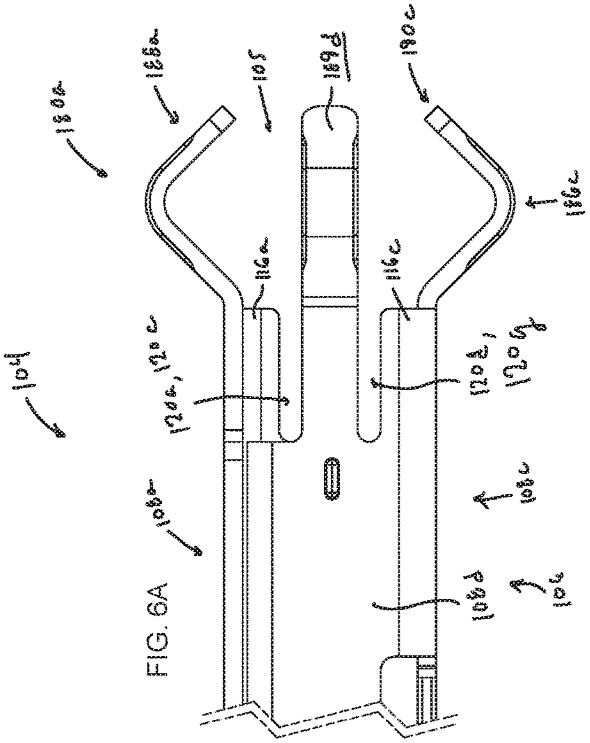
FIG. 6A is a side view of the male terminal of FIG. 3.
Figure 8:
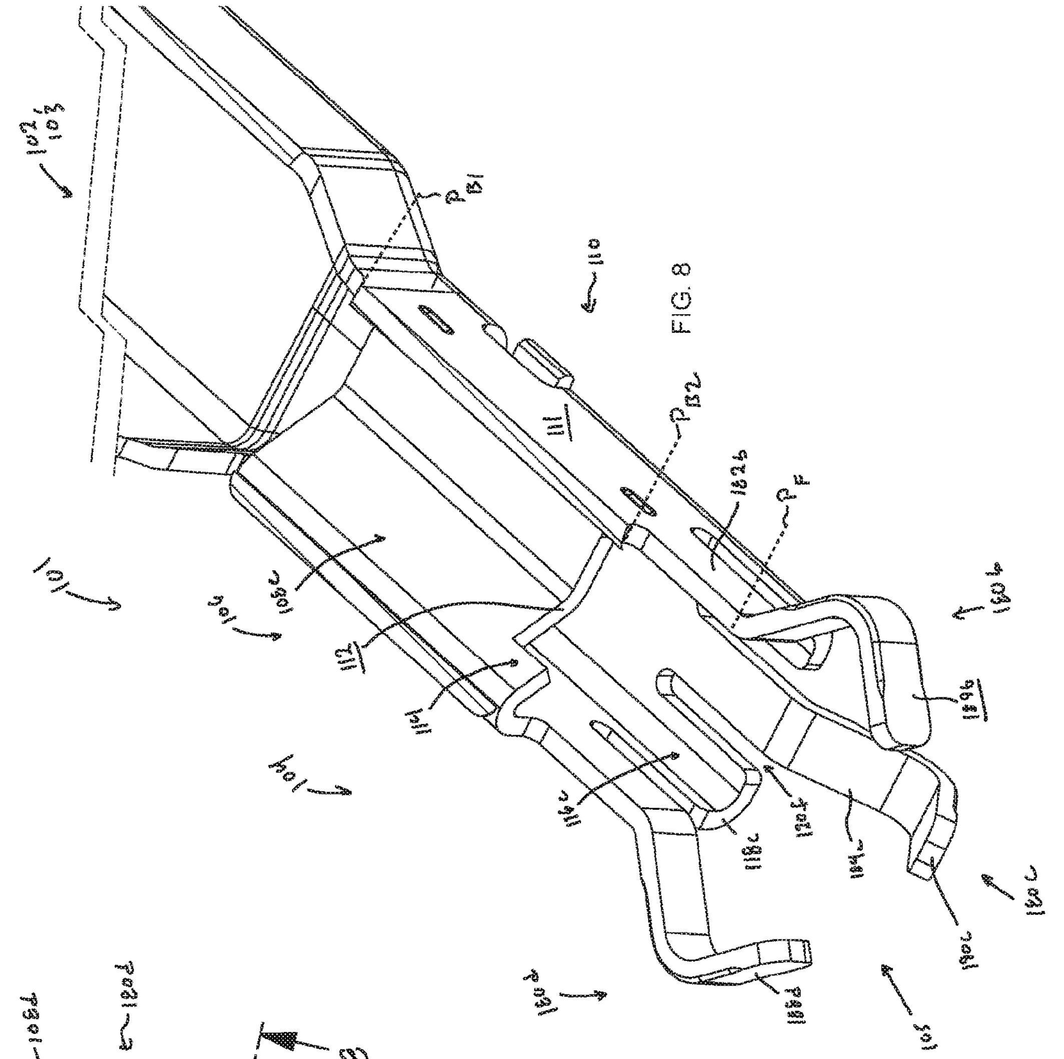
FIG. 8 is a cross-sectional view of the male terminal taken along line 8-8 of FIG. 7A.
Figure 7A:
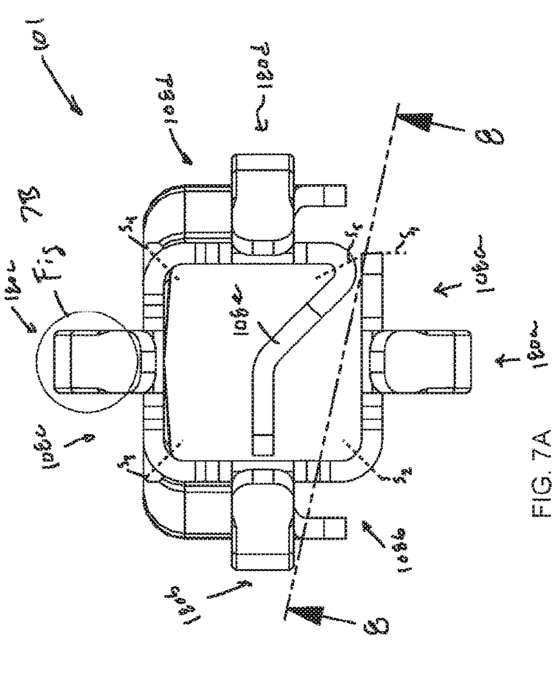
FIG. 7A is a front view of the male terminal of FIG. 3, showing a male terminal body with a plurality of contact arms.
Figure 9:
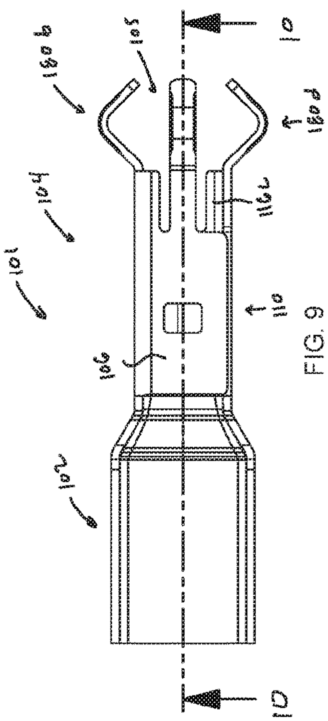
FIG. 9 is a top view of the male terminal of FIG. 6A.
Figure 10:
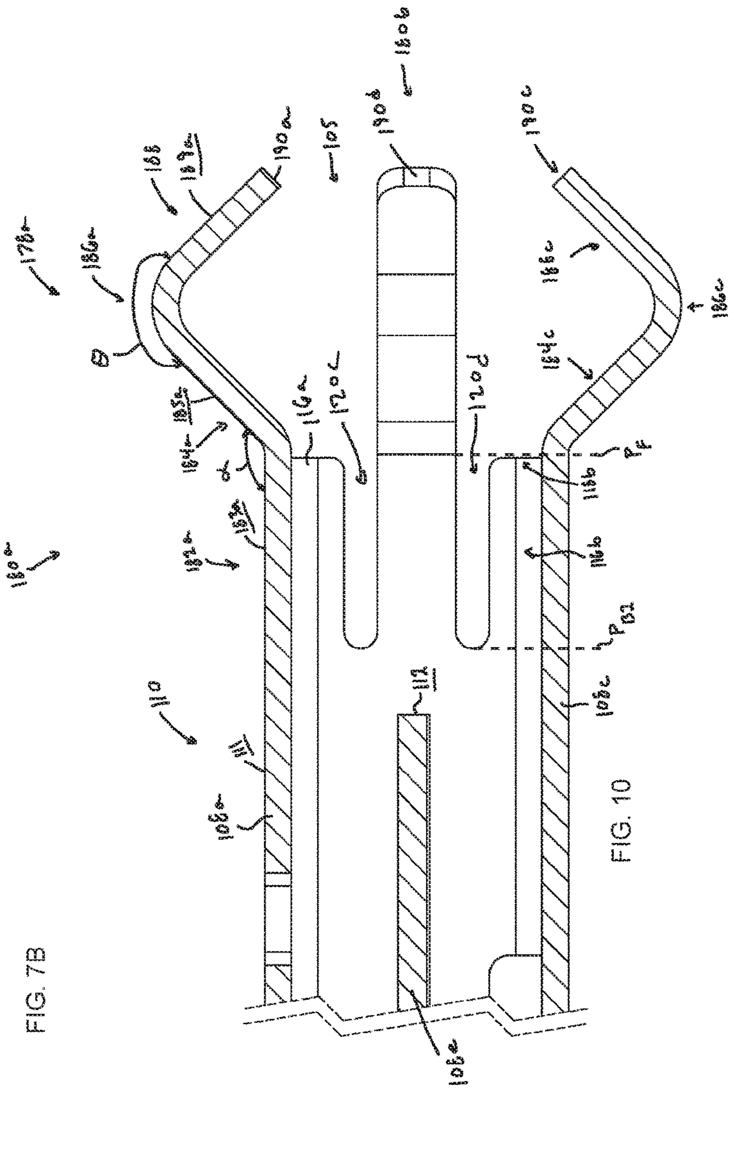
FIG. 10 is a cross-sectional view of the male terminal taken along line 10-10 of FIG. 9.

Referring specifically FIGS. 6A, 8 and 10, the contact arms 180*a*-180*d* have an initial or rear extent 182*a*-182*d* that extends from the base or intermediate portion 110 (line $C_1$) and a geometric bent or creased portion 178*a*-178*d*. Said geometric bent or creased portion 178*a*-178*d* includes: (i) a second or upwardly sloping extent 184*a*-184*d* that extends between the initial extent 182*a*-182*d* (line $C_2$) and an external contact arm apex 186*a*-186*d* of the contact arm 180*a*-180*d* (line $C_3$), and (ii) a third or downwardly sloping extent 188*a*-188*d* that extends downward from the external apex 186*a*-186*d* (line $C_3$) to a forward-most extent that provides a free end 190*a*-190*d*. The geometric bent or creased portion 178*a*-178*d* of the contact arms 180*a*-180*d* is beneficial over contact arm designs shown in FIGS. 69-96 of PCT/US2019/036010 because its design helps reduce: (i) insertion forces due to the ramped contact arm design (in contrast to the circular contact arm design), and (ii) potential bending or stubbing of contact arms 180*a*-180*d*, when the insertion of the male terminal assembly 100 is not directly in line with the female terminal assembly 700.

Unlike conventional connectors, the disclosed contact arms 180*a*-180*d* have an elongated first or rear extent 182*a*-182*d* that does not extend away from the base portion 110 at a uniform outward sloping angle or substantially uniform outward sloping angle. In other words and as best shown in FIGS. 6A and 10, an outer surface 183*a*-183*d* of the first or rear extent 182*a*-182*d* of each contact arm 180*a*-180*d* are: (i) substantially parallel with one another, and (ii) substantially aligned with the outer surface 111 of the corresponding extent of the base portion 110. Compared to conventional connectors that lack this elongated first or rear extent 182*a*-182*d*, less force is required to deform or displace the contact arm 180*a*-180*d* inward or toward the center of the male terminal 101. This reduced force allows for an increase in the force required to inwardly displace an extent of the spring member 300. Shifting the structure that resists the inward displacement from the contact arm 180*a*-180*d* to the spring arm 312*a*-312*d* is beneficial because changes to the insertion force $F_1$ can be easily made by changing the design and/or material composition of the spring member 300 and not redesigning the terminal body 104. For example, the designer can insert a stiffer spring member 300 to maintain/maximize the current carrying capacity of the system 10. Or if there are specific customer requirements setting forth a target insertion force $F_1$, the designer can select a spring member 300 that meets these requirements without having to undertake a costly and time-consuming redesign of the male terminal body 104. This modularity and flexibility of the connector system 10 is a substantial improvement over the prior art, as reduces the number of product SKUs, increases the ability to meet customer requirements without retooling or redesigning the connector, and/or limits testing and other steps that would be required to utilize new/different connectors. It should be understood that the length of the first or rear extent 182*a*-182*d* will substantially alter the insertion force $F_1$ required to insert the male terminal assembly 100 into the female terminal assembly 700. Also, in other embodiments, the contact arms 180*a*-180*d* may extend away from the base 110 at a uniform inwardly angle or substantially uniform inwardly sloping angle. Said inwardly sloping angle allows the male terminal assembly 100 to have an inwardly tapered design or configuration. In this alternative embodiment, the inwardly tapered design or configuration may be configured such that the outer diameter at line $C_2$ may be between 0.01% and 5% less than the outer diameter at line $C_1$.

As shown in FIG. 10, the second or upwardly sloping extent 184*a*-184*d* is positioned at an outward angle alpha a from the lateral first or rear extent 182*a*-182*d*, wherein said angle alpha a extends between an outer surface 183*a*-183*d* of the first or rear extent 182*a*-182*d* of the contact arm 180*a*-180*d* and an outer surface 185*a*-185*d* of the second or upwardly sloping extent 184*a*-184*d* of the contact arm 180*a*-180*d*. The outward angle alpha a is between 115 and 170 degrees, and preferably between 125 and 145 degrees. Forward of the second or upwardly sloping extent 184*a*-184*d*, the contact arm 180*a*-180*d* has a third or downwardly sloping extent 188*a*-188*d* that extends downward from the exterior apex 186*a*-186*d* to the free end 190*a*-190*d*. An exterior angle theta θ is defined between the outer surface 185*a*-185*d* of the second or upwardly sloping extent 184*a*-184*d* and the outer or contact surface 189*a*-189*d* of the third or downwardly sloping extent 188*a*-188*d*. The exterior angle theta θ is between 240 and 300 degrees, and preferably between 255 and 285 degrees. Similar to the prior discussion, the other terminals, whose disclosure is incorporated herein, lack this configuration of the sharp upwardly angled segment and the sharp downwardly angled segment.

As discussed in greater detail below, the third or downwardly sloping extent 188*a*-188*d*, and specifically the contact surface 189*a*-189*d*, is configured to contact an extent of the female connector assembly 650 when the male terminal assembly 100 is inserted into the female terminal assembly 700. This interaction between these components causes the contact arms 180*a*-180*d* to be deflected or displaced inward and towards the center of the male terminal assembly 100 and the spring member 700. This inward deflection of the contact arms 180*a*-180*d* causes the spring member 700 to act as a wedge to help ensure that a proper mechanical and electrical connection is created between the contact arms 180*a*-180*d* and the female receptacle 702.

Figure 7B:
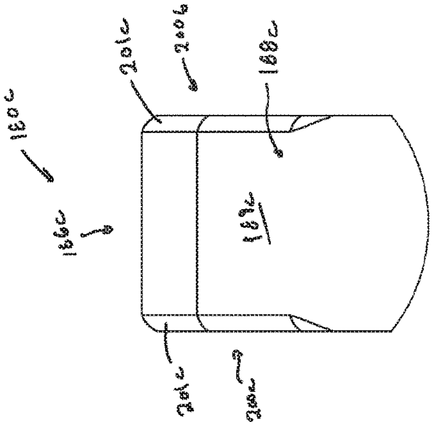
FIG. 7B is a zoomed-in view of one contact arm shown in FIG. 7A.

As shown in FIGS. 7B, at least a portion of the outer edges or shoulder regions 200*a*, 200*b* of the contact arms 180*a*-180*d* are coined, beveled, or rounded 201*a*, 201*b*. The coined, beveled or rounded section 201*a*, 201*b* of the outer edges 200*a*-200*b* may: (i) extend along the entire length of the contact arm 180*a*-180*d*, (ii) extend along the entire length of the second and third extends 184*a*-184*d*, 188*a*-188*d* of the contact arms 180*a*-180*d*, (iii) extend along a portion (e.g., half of the length) of the second extent 184*a*-184*d* of the contact arms 180*a*-180*d* and a portion (e.g., half of the length) of the third extent 188*a*-188*d* of the contact arms 180*a*-180*d*. Without forming the coining, beveling, or rounding section 201*a*, 201*b*, the edges 200*a*, 200*b* of the contact arms 180*a*-180*d* may make contact with the inner surface 704 of the female terminal assembly 700 and could prevent the center of the contact arm 180*a*-180*d* from making sufficient contact with said female terminal assembly 700 due to the linear vs. curvilinear configurations of the contact arms 180*a*-180*d* and female terminal assembly 700. Preventing the center of the contact arm 180*a*-180*d* from making proper contact with said female terminal assembly 700 will likely reduce the current carrying capacity of the system 10. Additionally, omission of the coining, beveling, or rounding section 201*a*, 201*b* could leave sharp edges on the contact arms 180*a*-180*d*, which may cause the contact arms 180*a*-180*d* to score or mark the inner surface 704 of the female terminal assembly 700. Said scoring can reduce the number of mating cycles the system 10 can achieve without failure because the scoring can scrape off or damage the internal plating and/or surface 704 of the female terminal assembly 700. In other embodiments, the outer edges or shoulder regions 200*a*, 200*b* of the contact arms 180*a*-180*d* may not be coined, beveled, or rounded; instead, the contact arms 180*a*-180*d* may be bent or material may be deposited on said contact arms 180*a*-180*d* to allow the outer surface of said contact arms 180*a*-180*d* to substantially match the curvature of the inner surface 704 of the female terminal assembly 700.

As shown in FIGS. 6A-10, the contact arms 180*a*-180*d* are only connected to the base portion 110 of the male terminal body 104. This free-end configuration of the contact arms 180*a*-180*d* allows for omnidirectional expansion of said contact arms 180*a*-180*d*. Because there is a contact arm opening or void 120*a*-120*g* interspersed between each pair of contact arms 180*a*-180*d*, no supporting wall surrounds the entirety of the contact arms 180*a*-180*d*. This configuration of the male terminal assembly 100 is substantially different than the configuration disclosed in connection with the male terminal assembly of PCT/US2019/36010. As discussed in PCT/US2019/36010, the removal of the side wall arrangement that surrounds the contact arms 180*a*-180*d* could increase the failure rate of the male terminal assembly 100 because the side wall arrangement protects said contact arms 180*a*-180*d*. However, this increased failure rate is mitigated by the inclusion of the jacket 400.

The male terminal 101 is typically formed from a single piece of material (e.g., metal); thus, the male terminal 101 is a one-piece male terminal 101 and has integrally formed features. To integrally form these features, the male terminal 101 is typically formed using a die-cutting process. However, it should be understood that other types of forming the male terminal 101 may be utilized, such as casting or using an additive manufacturing process (e.g., 3D printing). In other embodiments, the features of the male terminal 101 may not be formed from a one-piece or be integrally formed, but instead formed from separate pieces that are welded together. In forming the male terminal 101, it should be understood that any number (e.g., between 1 and 100) of contact arms 180*a*-180*d* may be formed within the male terminal 101. The male terminal 101, male terminal body 104, the contact arms 180*a*-180*d*, or an extent of the contact arms 180*a*-180*d* may be plated or coated with a secondary material (e.g., nickel) to help reduce corrosion, reduce insertion forces, or improve conductivity. Additionally, the contact arms 180*a*-180*d* or a portion of the contact arms 180*a*-180*d* may have rounded or beveled edges.

iii. Spring Member

Figure 11:
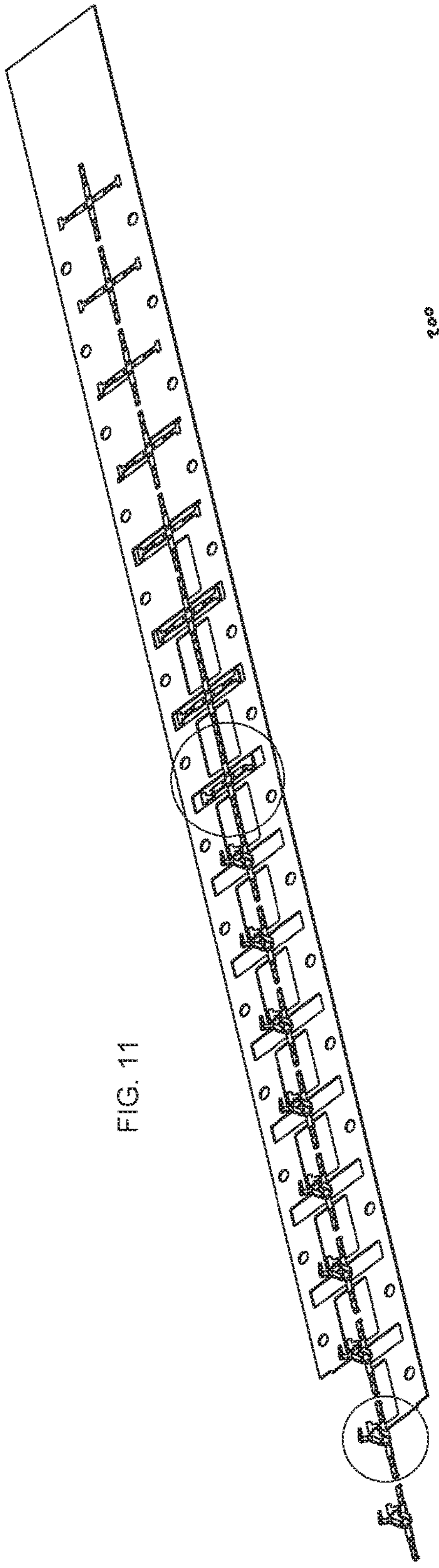
FIG. 11 is a perspective view of the steps in the process of forming the spring member of FIG. 3 from a blank.
Figure 12A:
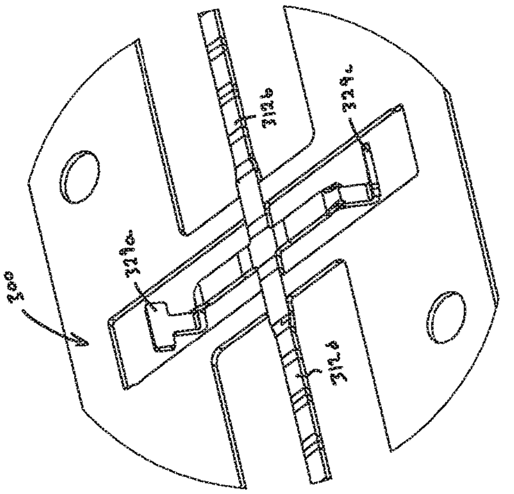
FIGS. 12A-12B are zoomed-in views of steps in the forming process shown in FIG. 11.
Figure 12B:
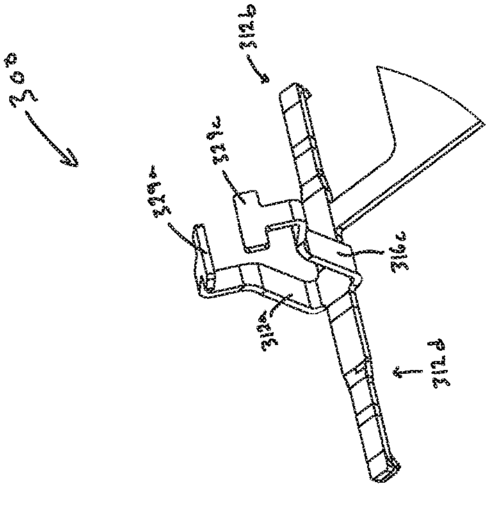
Figure 13B:
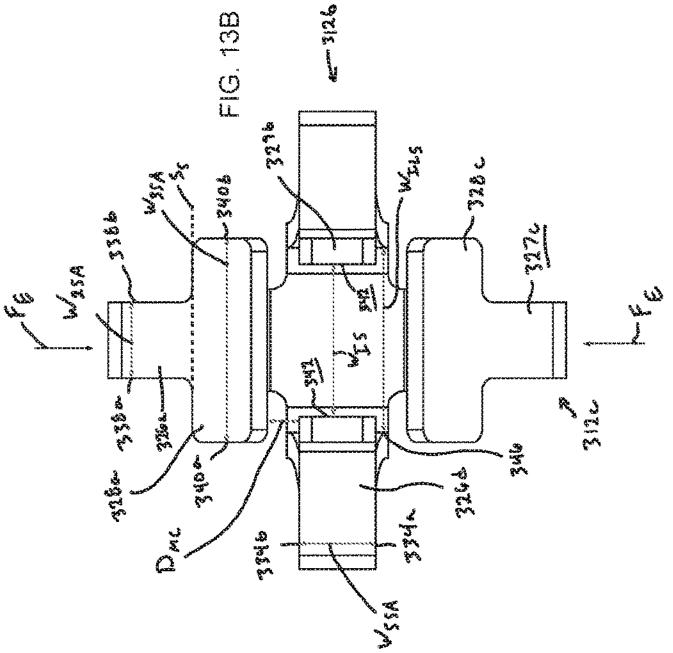
FIG. 13B is a front view of the spring member of FIG. 3.
Figure 13A:
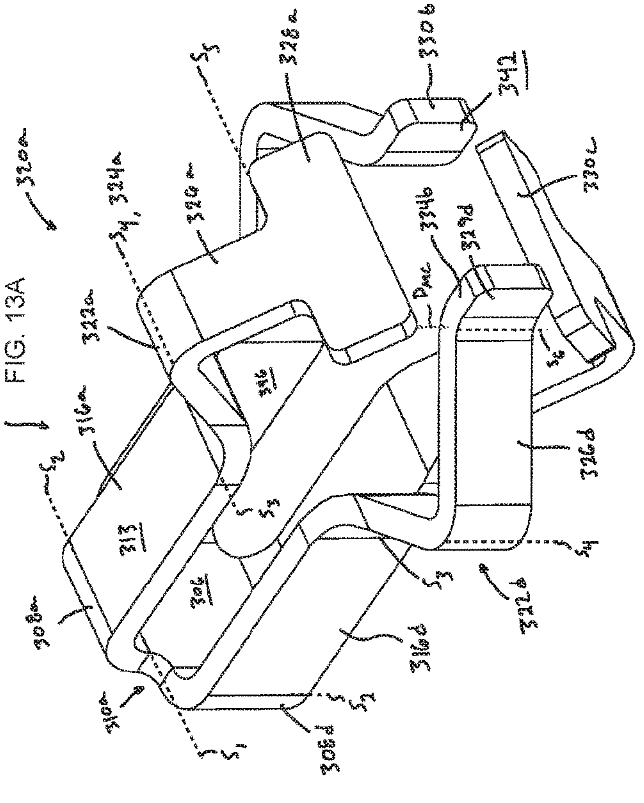
FIG. 13A is a perspective view of the spring member of FIG. 3.

FIGS. 11 and 12A-12B illustrate the steps that may be undertaken to form the spring member 300 from a blank piece of metal (e.g., spring steel, stainless steel). In particular, this process may include a plurality of (e.g., 17) steps of cutting and/or bending of the metal blank. Once these steps have been performed, the spring member 300 will be formed to include an arrangement of spring member side walls 304*a*-304*d* and a rear spring wall 306. Each spring member side wall 304*a*-304*d* is comprised of: (i) a first or curvilinear spring section 308*a*-308*d* that extends from the rear wall 306 (line $S_1$) to an initial or linear base extent 316*a*-316*d* (line $S_2$), and (ii) a spring arm 312*a*-312*d* that extends forward from the first or curvilinear spring section 308*a*-308*d* (line $S_2$) to free ends 330*a*-330*d*. The spring arms 312*a*-312*d* extend from the first or curvilinear spring section 308*a*-308*d* of the spring member 300, away from the rear spring wall 306, and terminate at a frontal end or free-end 330*a*-330*d*. The spring arms 312*a*-312*d* are not connected to one another and are separated by spring arm gaps 310*a*-310*d*. As such, the spring arm gaps 310*a*-310*d* are interspersed between the spring arms 312*a*-312*d*. The spring arm gaps 310*a*-310*d* aid in omnidirectional expansion or contraction of the spring arms 312*a*-312*d*, which facilitates the mechanical coupling between the male terminal 101 and the female terminal assembly 700.

Unlike conventional spring members, the spring member 300 disclosed herein includes a spring arm 312*a*-312*d* with a geometry that substantially matches the geometry of the associated contact arm 180*a*-180*d*. In other words, the spring arms 312*a*-312*d* include a geometric bent or creased portions 320*a*-320*d* that substantially matches the geometric bent or creased portions 178*a*-178*d* of the contact arms 180*a*-180*d*. In addition to the geometric bent or creased portions 320*a*-320*d*, the spring member 300 is unique due to its inclusion of: (i) a first pair or primary pair of spring arms, which include the top, primary, or first spring arm 312*a* and the bottom or third spring arm 312*c*, (ii) a second pair or secondary pair of spring arms, which include the first side spring arm, secondary spring arm, or second spring arm 312*b* and a second side spring arm or fourth spring arm 312*d*. The geometry of the top and bottom spring arms 312*a*, 312*c* substantially mirror one another, and the geometry of the first side and second side spring arms 312*b*, 312*d* substantially mirror one another. Additionally, the geometry of the spring arms contained in the first pair of spring arms (top and bottom spring arms 312*a*, 312*c*) does not match the geometry of the spring arms contained in the second pair of spring arms (side spring arms 312*b*, 312*d*).

The top and bottom spring arms 312*a*, 312*c* include: (i) the initial or linear base extent 316*a*, 316*c* that extends from the first or curvilinear spring section 308*a*, 308*c* (line $S_2$) to a second or upwardly sloping extent 322*a*, 322*c* (line $S_3$), and (ii) a geometric bent or creased portion 320*a*, 320*c* extends forward from the initial or linear extent 316*a*, 316*c* (line $S_3$). Said geometric bent or creased portion 320*a*, 320*c* includes: (i) the second or upwardly sloping extent 322*a*, 322*c* that extends between the initial extent 316*a*, 316*c* (line $S_3$) and an exterior apex 324*a*, 324*c* (line $S_4$) of the spring arm 312*a*, 312*c*, (ii) a third or downwardly sloping extent 326*a*, 326*c* that extends downward from an external apex 324*a*, 324*c* (line $S_4$) to an over-compression extent 328*a*, 328*c* (line $S_5$), and (iii) the over-compression extent 328*a*, 328*c* extending between the third or downwardly sloping extent 326*a*, 326*c* (line $S_5$) and a forward-most extent that provides a frontal end 330*a*, 330*c*. The geometric bent or creased portion 320*a*, 320*c* of the spring arms 312*a*, 312*c* is configured to complement the geometric bent or creased portion 178*a*, 178*c* of the contact arm 180*a*, 180*c*.

As shown in FIGS. 13A-15, the top and bottom spring arms 312*a*, 312*c* have: (i) a first spring arm width $W_{1SA}$ that extends between linear extent edges 336*a*, 336*b*, (ii) a transition spring arm width, (iii) a second spring arm width $W_{2SA}$ that extends between contact surface edges 338*a*, 338*b*, and (iv) an over-compression or third spring arm width $W_{3SA}$ that extends between over-compression edges 340*a*, 340*b*. The curvilinear spring sections 308*a*, 308*c* and linear extents 316*a*, 316*c* of the spring member 300 have the first spring arm width $W_{1SA}$, the downwardly sloping extents 326*a*, 326*c* of the spring member 300 have the second spring arm width $W_{2SA}$, and the over-compression extents 328*a*, 328*c* have the third spring arm width $W_{3SA}$. The upwardly sloping extents 322*a*, 322*c* of the spring member 300 have a transition width, which changes from the first spring arm width $W_{1SA}$ to the second spring arm width $W_{2SA}$ when moving from line $S_3$ to line $S_4$.

This configuration allows a majority of creased portion 320*a*, 320*c* to have a width that substantially match the width of the creased portion 178*a*, 178*c*. Matching the widths of the spring arm 312*a*, 312*c* and contact arms 180*a*, 180*c* at the point the male terminal assembly 100 is configured to contact the female terminal assembly 700 is beneficial because it limits the width required for contact arm openings 414, 470 that are formed in the jacket 400 and male terminal housing 70. Additionally, including additional material to the spring member 300 in a location that is substantially rearward of the creased portion 178*a*, 178*c* of the contact arms 180*a*, 180*c* allows the designer to increase the force required to deform the spring arms 312*a*, 312*c* in comparison to a spring member that lacked this additional material. Nevertheless, it should be understood that in other embodiments, the width of the spring arms 312*a*, 312*c* may be constant along the entire length of the arm 312*a*, 312*c*, have only two different widths, or may have more than the disclosed number of widths.

The side spring arms 312*b*, 312*d* include: (i) the initial or linear extent 316*b* 316*d* that extends from the first or curvilinear spring section 308*b*, 308*d* (line $S_2$) to a second or upwardly sloping extent 322*b*, 322*d* (line $S_3$), and (ii) a geometric bent or creased portion 320*b*, 320*d* extends forward from the initial or linear extent 316*b*, 316*d* (line $S_3$). Said geometric bent or creased portion 320*b*, 320*d* includes: (i) the second or upwardly sloping extent 322*b*, 322*d* that extends between the initial extent 316*b*, 316*d* (line $S_3$) and an exterior apex 324*b*, 324*d* (line $S_4$) of the spring arm 312*b*, 312*d*, (ii) a third or downwardly sloping extent 326*b*, 326*d* that extends downward from an external apex 324*b*, 324*d* (line $S_4$) to a fourth extent, jacket extent, or jacket projection extent 329*b*, 329*d* (line $S_6$), and (iii) the jacket extent 329*b*, 329*d* extending forward from the third or downwardly sloping extent 326*b*, 326*d* (line $S_6$) to a free-end 330*b*, 330*d*. The geometric bent or creased portion 320*b*, 320*d* of the spring arms 312*b*, 312*d* is configured to complement the geometric bent or creased portion 178*b*, 178*d* of the contact arm 180*b*, 180*d*.

As shown in FIGS. 13A-15, the side spring arms 312*b*, 312*d* have: (i) a fourth spring arm width $W_{4SA}$ that extends between linear extent edges 332*a*, 322*b*, (ii) a transition spring arm width, and (iii) a fifth spring arm width $W_{5SA}$ that extends between forward spring arm edges 334*a*, 324*b*. The curvilinear spring sections 308*b*, 308*d* and linear extents 316*b*, 316*d* of the spring member 300 have the fourth spring arm width $W_{4SA}$, while the downwardly sloping extents 326*b*, 326*d* and jacket extents 329*b*, 329*d* of the spring member 300 have the fifth spring arm width $W_{5SA}$. The upwardly sloping extents 322*b*, 322*d* of the spring member 300 have a transition width, which changes from the fourth spring arm width $W_{4SA}$ to the fifth spring arm width $W_{5SA}$ when moving from line $S_3$ to line $S_4$. This configuration is beneficial for the same reasons discussed above in connection with the top and bottom spring arms 312*a*, 312*c*.

Unlike conventional spring, the disclosed spring member includes spring arms 312*a*-312*d* with three unique or different widths. In this embodiment, the spring member 300 includes two spring arms 312*a*, 312*b*, wherein the width of one spring arm 312*a* increases, between two points (e.g., 336*a*-336*b*, 340*a*-340*b*), along its length and the width of the second spring arm 312*b* decreases, between two points (e.g., 332*a*-332*b*, 334*a*-334*b*), along its length. Additionally, the spring member 300 has: (i) the first and fourth spring arm widths $W_{1SA}$. $W_{4SA}$ are equal, (ii) second and fifth spring arm widths $W_{2SA}$, $W_{5SA}$ are equal, (iii) the first and fourth spring arm widths $W_{1SA}$, $W_{4SA}$ are larger than the second and fifth spring arm widths $W_{2SA}$, $W_{5SA}$, and (iii) the third spring arm width $W_{3SA}$ is larger than the first, second, fourth, and fifth spring arm widths $W_{1SA}$, $W_{2SA}$, $W_{4SA}$, $W_{5SA}$. In other words, the widths of the curvilinear spring sections 308*a*-308*d* and linear extents 316*a*-316*d* of the spring member 300 are substantially equal, the widths of the downwardly sloping extents 326*a*-326*d* are substantially equal, and the widths of the over-compression extents 328*a*, 328*c* is not equal (i.e., greater than) to the jacket extents 329*b*, 329*d*.

Unlike conventional spring members, the spring member 300 includes a first portion of the means for limiting compression 314. Said first portion of the means for limiting compression 314 is the first combination of limiting structures 315*a*, which include: (i) the over-compression extent 328*a*, 328*c*, and (ii) edges of the adjacent side spring arms 312*b*, 312*d*. The over-compression extent 328*a*, 328*c* has opposed flanges that extend outwardly and transversely from the downwardly sloping extent 326*a*, 326*c* and that define an over-compression spring arm width $W_{3SA}$ that is larger than other spring arms widths (e.g., first, second, fourth, and fifth). In fact, the over-compression width $W_{3SA}$ is larger than the inner surface width $W_{1S}$ that extends between inner surfaces 342*a* of the jacket extends 329*b*, 329*d* of the side spring arms 312*b*, 312*d*. As such, the outer edge 340*a*, 340*b* the over-compression extent 328*a*, 328*c* are positioned outside or beyond the inner surfaces 342*a* of the side spring arms 312*b*, 312*d*. Additionally, the outer edge 340*a*, 340*b* of the over-compression extents 328*a*, 328*c* are positioned outside or beyond the inner surfaces 346 of the linear extent 316*b*, 316*d* of the side spring arms 312*b*, 312*d*. The application of an external force $F_E$ on the contact arms 180*a*, 180*c* can only deform the contact arms 180*a*, 180*c*, to the max compression distance $D_{MC}$ because the frontal end 330*a*, 330*c* contacts the forward spring arm edges 334*a*, 334*b* of the side spring arms 312*b*, 312*d*. In this embodiment the max compression distance $D_{MC}$ is less than 1.25 mm, preferably less than 1.0 mm, and most preferably 0.5 mm. Limiting the extent the contact arms 180*a*, 180*c* can be deformed or depressed to the max compression distance $D_{MC}$ prevents the contact arms 180*a*, 180*c*, spring arms 312*a*, 312*c*, and a combination thereof helps prevent said arms 180*a*, 180*c* from being overly deformed or depressed (e.g., a distance that is greater than the max compression distance $D_{MC}$) toward the center of the connector 50. While said first combination of limiting structures 315*a* provides this beneficial features, it should be understood that structures 315*a* are configured in a manner to ensure they do not interfere with normal or operational deformation (see FIG. 63) of the contact arm 312*a*, 312*c* and the spring member 312*a*, 312*c*. Specifically, the normal or operational deformation distance $D_{NC}$ (see FIG. 63) is at least 5% and preferably 20% less than the max compression distance $D_{MC}$. As such, said normal or operational deformation distance $D_{NC}$ is less than 1.20 mm, preferably less than 0.95 mm, and most preferably 0.4 mm. In other words, the compression distance that the system 10 fails at a larger distance than the max compression distance $D_{MC}$, which is larger than the normal or operational deformation distance $D_{NC}$ the system 10 experiences when the system 10 is in the connected state $S_{CN}$.

Figure 15:
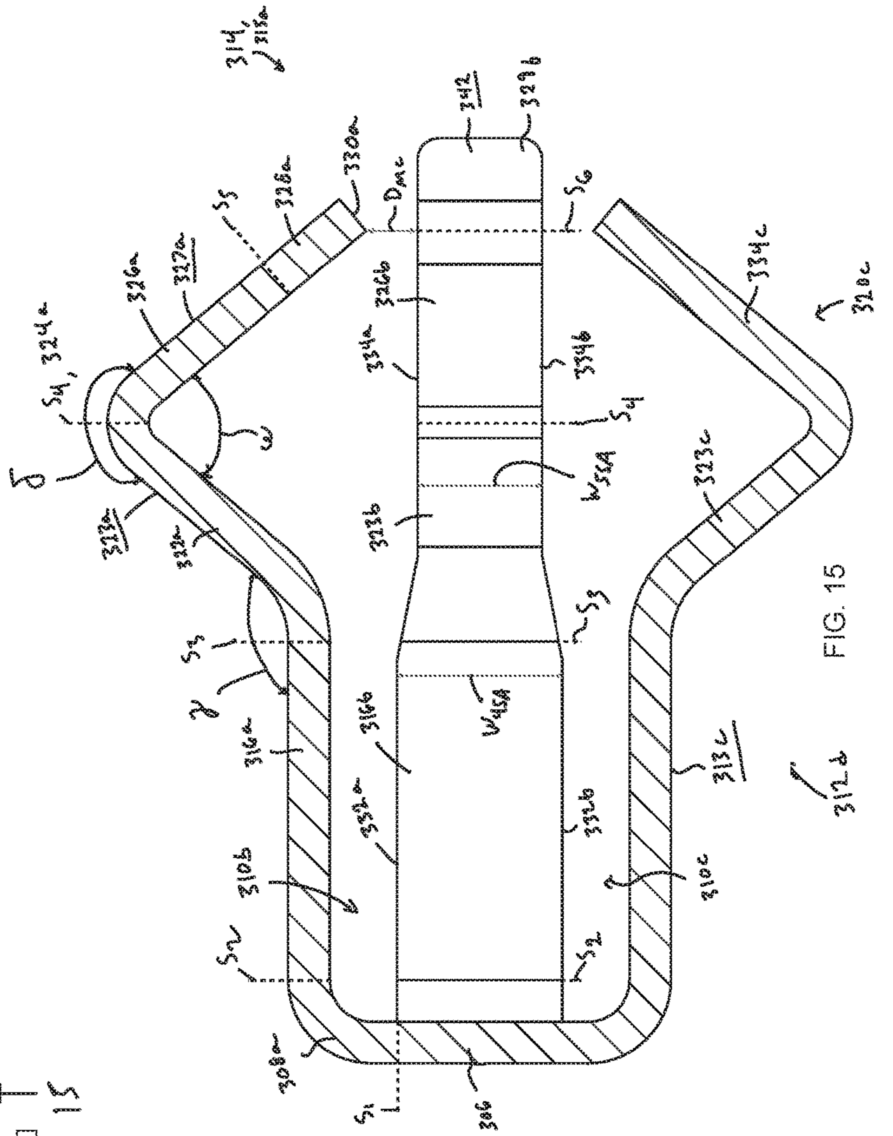
FIG. 15 is a cross-sectional view of the spring member taken along line 15-15 of FIG. 14.
Figure 14:
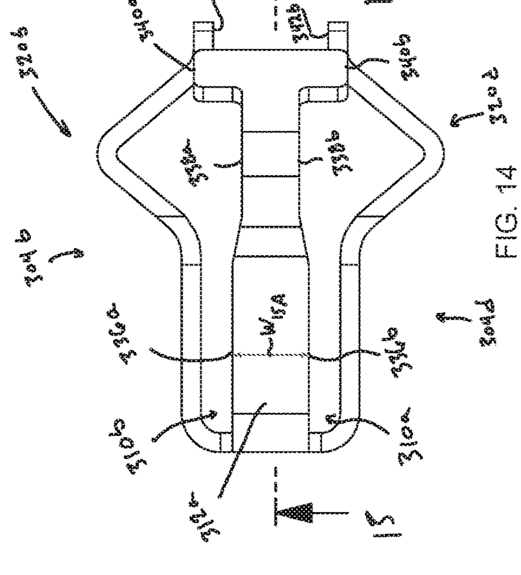
FIG. 14 is a top view of the spring member of FIG. 3.

As shown in FIG. 15, the bent spring arm portion 320*a* includes the second or upwardly sloping extent 322*a*-322*d* that extends at an outward angle gamma γ from the lateral first or rear extent 316$a$-316$d$, wherein said angle gamma γ specifically extends between an outer surface 313$a$-313$d$ of the first or rear extent 316$a$-316$d$ of the spring arm 312$a$-312$d$ and an outer surface 323$a$-323$d$ of the second or upwardly sloping extent 322$a$-322$d$ of the spring arm 312$a$-312$d$. The outward angle gamma γ is an obtuse angle, which is between 115 and 170 degrees, and preferably between 125 and 145 degrees. An exterior angle delta δ is defined between the outer surface 323$a$-323$d$ of the second or upwardly sloping extent 322$a$-322$d$ of the spring arm 312$a$-312$d$ and the outer surface 327$a$-327$d$ of the third or downwardly sloping extent 326$a$-326$d$ of the spring arm 312$a$-312$d$. The exterior angle delta δ is a reflex angle, which is between 240 and 300 degrees, and preferably between 255 and 285 degrees. The interior angle omega ω, which complements the exterior angle delta δ, is defined between the inner surface of the second or upwardly sloping extent 322$a$-322$d$ of the spring arm 312$a$-312$d$ and the inner surface of the third or downwardly sloping extent 326$a$-326$d$ of the spring arm 312$a$-312$d$. The interior angle omega ω is between between 60 and 120 degrees, preferably between 75 and 105 degrees, and most preferably 80 degrees. In other words, the interior angle omega w is a “significant acute angle,” which means that the angle is greater than 70 degrees, but less than 90 degrees. Similar to the prior discussions of conventional connectors, including those with conventional terminals and/or conventional spring members, whose disclosure is incorporated herein, lack this configuration of the sharp upwardly angled segment and the sharp downwardly angled segment and the resulting apex that corresponds to both the exterior angle delta δ and the interior angle omega ω. Additionally, unlike conventional spring members, the side spring arms 312$b$, 312$d$ include the protruding jacket extents 329$b$, 329$d$ of the spring member 300 that have an inner surface 342$b$ that is positioned: (i) outward of the outer perimeter of the rear wall 306, and (ii) inward of the inner surface 346 of the linear extents 316$b$, 316$d$ of the spring arms 312$b$, 312$d$. As shown in the figures, the inner surface of the upwardly sloping extent 322$b$, 322$d$ and downwardly sloping extent 326$b$, 326$d$, are positioned outside of the inner surface 346 of the linear extents 316$b$, 316$d$ and, as such, the inner surface 342$b$ of the protruding jacket extents 329$b$, 329$d$ is positioned in positioned inward of these inner surfaces.

The spring member 300 is typically formed from a single piece of material (e.g., metal); thus, the spring member 300 has a one-piece construction with integrally formed components. In particular, the following features are integrally formed: (i) the curvilinear spring section 308$a$-308$d$, and (ii) the spring arm 312$a$-312$d$. To integrally form these features, the spring member 300 is typically fabricated using a die forming process. that mechanically forces the spring member 300 into shape. As discussed in greater detail below and in PCT/US2019/036010, when the spring member 300 is formed from a flat sheet of metal (as shown in FIGS. 11-12B), installed within the male terminal 101 (as shown in FIGS. 16-18), and subjected to elevated temperatures, the spring member 300 applies an outwardly directed spring thermal force $F_{ST}$ on the contact arms 180$a$-180$d$ of the male terminal 101 due in part to the fact that the spring member 300 attempts to return to a flat sheet. However, it should be understood that other methods of forming the spring member 300 may be utilized, such as casting or using an additive manufacturing process (e.g., 3D printing). In other embodiments, the features of the spring member 300 may not be formed from a one-piece or be integrally formed, but instead formed from separate pieces that are welded together.

1. Disassembled State to a Partially Assembled State

Positioning the spring member 300 within the male terminal 101 occurs across multiple steps or stages (see FIGS. 16-18). FIG. 16 shows the spring member 300 separated from the male terminal 101, where the spring member 300 and male terminal 101 are in the disassembled state, $S_{DA}$. In this disassembled state, $S_{DA}$, the contact arms 180$a$-180$d$ are in a ready to receive position $P_R$. In this receive position $P_R$, the receiver 105 has a first frontal dimension $D_{1F}$ that extends between opposed free ends 190$a$, 190$c$ of the contact arms 180$a$, 180$c$, and the outer angle formed between the outer surface 111 of the male terminal body 104 and the linear extents 182$a$-182$d$ of the contact arms 180$a$-180$d$ is between 90 degrees and 181 degrees (preferably, between 150 degrees and 170 degrees). An assembler applies a rearwardly assembling force $F_A$ on the spring member 300 to position said member 300 within the receptacle 105 of the male terminal body 104. When positioning the spring member 300 in the receptacle 105, the assembler must align the spring 300 with the body 104 such that the anti-rotation projection 114 can be inserted into a spring arm gap 310$a$, as shown in FIG. 33. Once the assembler has applied enough force $F_A$ on the spring 300 to positioned the rear wall 306 of the spring 300 adjacent to the interior spring wall 108$e$, the spring member 300 and male terminal 101 have moved from the disassembled state, $S_{DA}$ to the first partially assembled state, $S_{1PA}$.

The first partially assembled state, $S_{1PA}$ is shown in FIG. 17, where the spring member 300 is positioned in receptacle 105 of the male terminal 101, but the contact arms 180$a$-180$d$ are not positioned adjacent to the spring arms 312$a$-312$d$. To move to the next assembly stage, the assembler applied a downwardly directed contact arm force $F_{CA}$ on all of the contact arms 180$a$-180$d$ in order to position said arms 180$a$-180$d$ adjacent to the spring arms 312$a$-312$d$. The application of this contact arm force $F_{CA}$ causes the contact arms 180$a$-180$d$ to move from the ready to receive position $P_R$ to the ready to use position $P_U$. In this ready to use position $P_U$, the receiver 105 has a second frontal dimension $D_{2F}$ that extends between opposed free ends 190$a$, 190$c$ of the contact arms 180$a$, 180$c$, and said second frontal dimension $D_{2F}$ is less than the first frontal dimension $D_{1F}$. In addition, in the ready to use position $P_U$ the outer angle formed between the outer surface 111 of the male terminal body 104 and the linear extents 182$a$-182$d$ of the contact arms 180$a$-180$d$ is approximately 170-190 degrees, and preferably 180 degrees. The position of the spring member 300 and the movement of the contact arms 180$a$-180$d$ to this ready to use position $P_U$ allows the spring member 300 and male terminal 101 to move from the first partially assembled state, $S_{1PA}$ to second partially assembled state, $S_{2PA}$. In this second partially assembled state, $S_{2PA}$, the spring member 300 is positioned and retained in the receptacle 105 and is ready for the next stage of assembly. It should be understood that when the spring member 300 should not be inserted into the receptacle 105 when the contact arms 180$a$-180$d$ are in the ready to use position $P_U$ because said geometric bent or creased portion 320$a$-320$d$ of the spring member 300 would contact and engage the free ends 190$a$-190$d$ of the contact arms 180$a$-180$d$. In other words, the spring member 300 has an exterior dimension $D_E$ that extends between opposed spring arm exterior apex 324$a$-324$d$, and wherein the exterior dimension $D_E$ of the spring member 300 is greater than the second frontal dimension $D_{2F}$, whereby preventing the insertion of the spring member 300 within the receptacle 105 without causing outwardly deformation of the contact arms 180$a$-180$d$. As such, the assembler should only attempt to insert the spring member 300 into the receptacle 105 of the male terminal body 104 when the contact arms 180*a*-180*d* are in the ready to receive position $P_R$.

Other unique features of this system 10 can be seen once the male terminal 101 and the spring member 300 are in the second partially assembled state, $S_{2PA}$. For example, the free ends 190*a*-190*d* of the contact arms 180*a*-180*d* do not abut a planar outer surface 313*a*-313*d* of the spring arms 312*a*-312*d*. Instead, the entirety of the contact arms 180*a*-180*d* are supported by the spring arms 312*a*-312*d*, such that the system 10 lacks a substantial gap formed between the outer surface 313*a*-313*d* of the spring arms 312*a*-312*d* and the inner surface of the contact arms 180*a*-180*d*. Omitting the gap between these structures and positioning the spring arm 312*a*-312*d* in this manner allows a majority of the outer surface 2313*a*-2313*d* of the spring arm 312*a*-312*d* to underlie and abut an inner surface of the contact arm 180*a*-180*d*. It should be understood that a minor/insubstantial gap may be formed between the outer surface 313*a*-313*d* of the spring arms 312*a*-312*d* and the inner surface of the contact arms 180*a*-180*d* due to manufacturing capabilities and restraints due to the movement of the male terminal body 104 from the ready to receive position $P_R$ and ready to use position $P_U$. This positional arrangement causes the disclosed system 10 to apply the spring biasing force $F_{SB}$ in a different manner than how the spring biasing force $F_{SB}$ is applied in fourth, fifth, sixth, and seventh embodiments of the systems 3010, 4010, 5010, and 6010 disclosed here. Specifically, the spring members 3300, 4300, 5300, 6300 in these other embodiments of the systems 3010, 4010, 5010, and 6010 apply the spring biasing force $F_{SB}$ on one (or possible two) locations and in a direction that is substantially perpendicular to a majority of an outer surface of the spring member 300. In contrast, the disclosed spring member 300 does not: (i) apply the spring biasing force $F_{SB}$ one (or possible two) locations, nor (ii) apply the spring biasing force $F_{SB}$ in a direction that is substantially perpendicular to a majority of an outer surface of the spring member 300.

iv. Jacket

Figure 19:
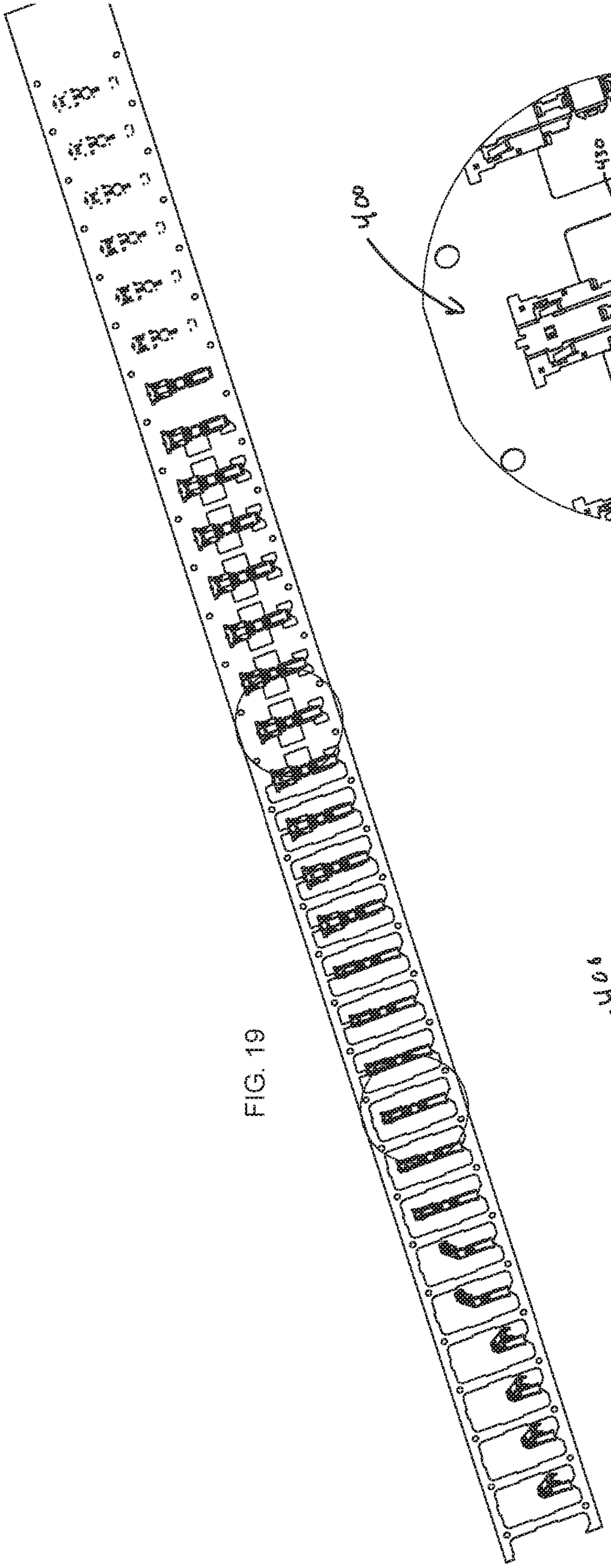
FIG. 19 is a perspective view of the steps in the process of forming the jacket of FIG. 3.
Figure 20A:
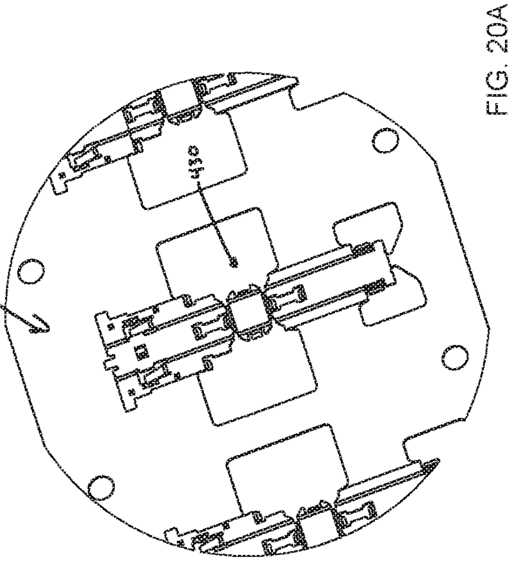
FIGS. 20A-20B are zoomed-in views of steps in the forming process shown in FIG. 19.
Figure 20B:
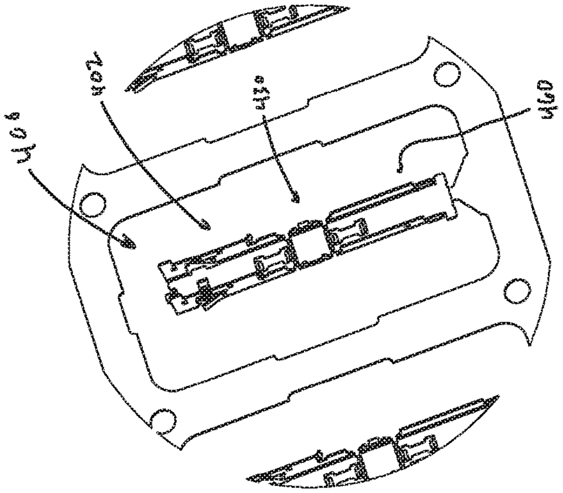
Figure 22:
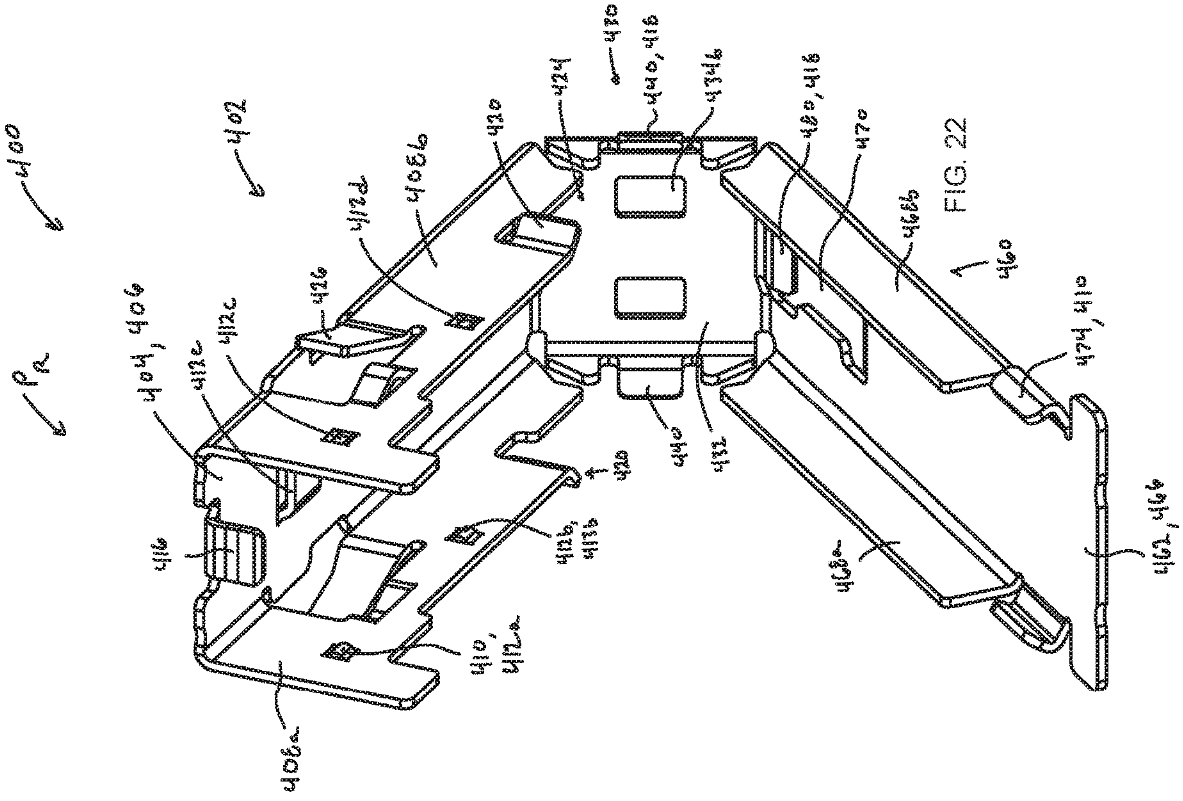
FIG. 22 is a rear perspective view of the jacket of FIG. 3.
Figure 21:
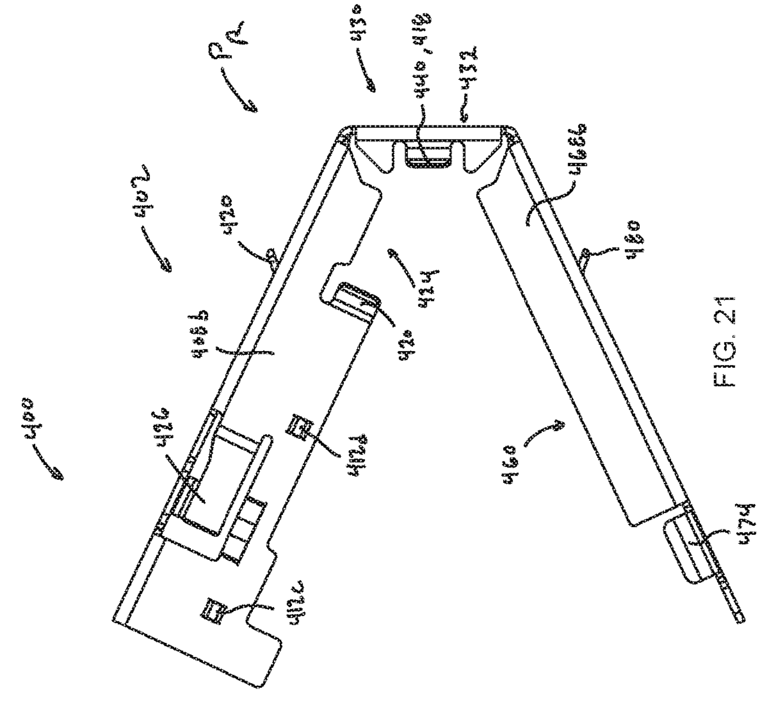
FIG. 21 is a side view of the jacket of FIG. 3 shown in an open position $P_O$.
Figure 24:
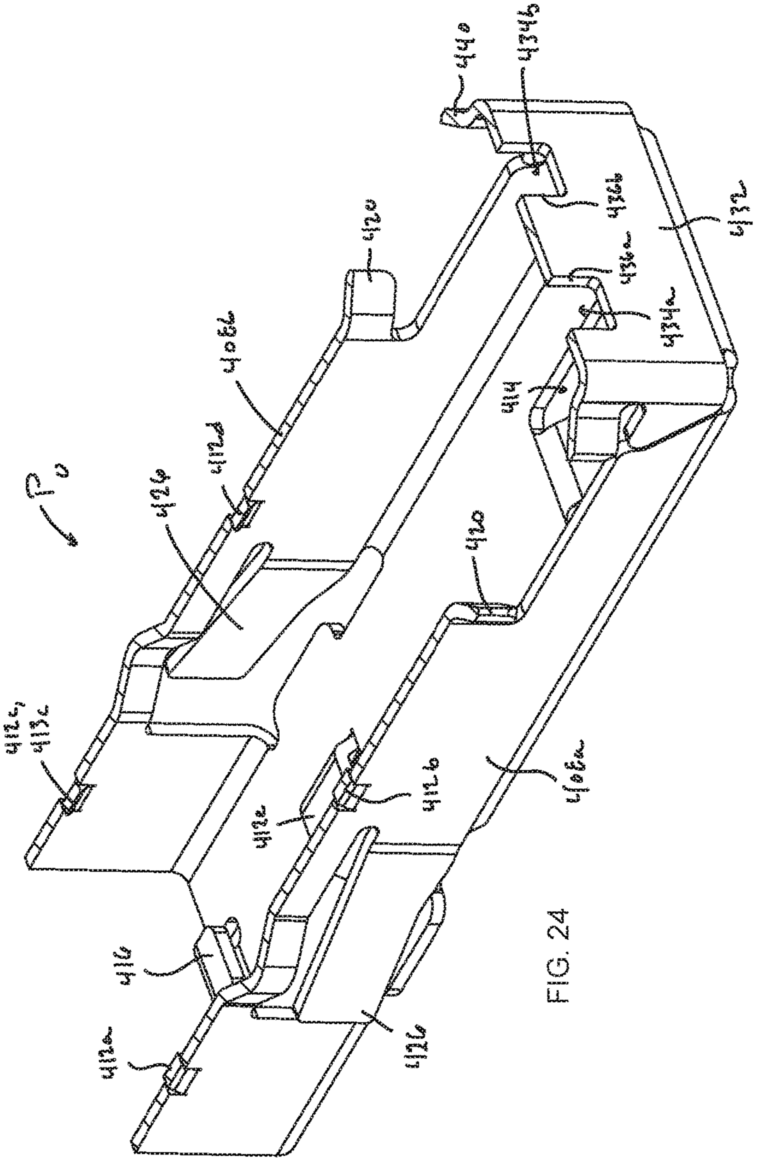
FIG. 24 is a cross-sectional view of the jacket taken along line 24-24 of FIG. 23.
Figure 23:
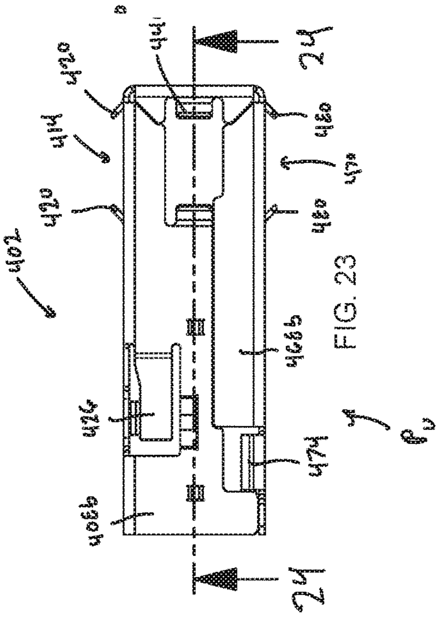
FIG. 23 is a side view of the jacket of FIG. 3 shown in a closed position $P_C$.

FIGS. 19 and 20A-20B illustrate the steps that may be undertaken to form the jacket 400 from a blank piece of metal (e.g., spring steel, stainless steel). In particular, this process may include a plurality (e.g., 30) steps of cutting and/or bending of said metal blank. Once these steps have been performed, the jacket 400 will be formed to have a clamshell configuration, which is designed to: (i) retain the spring member 300 in the receiver 105, and (ii) increase the durability of the terminal assembly 100. The clamshell configuration of the jacket 400 is provided by a frontal segment 430 connected, via hinges, to an upper segment 402 and a lower segment 460. Said hinges allow for the jacket 400 to be formed in a ready to receive position $P_R$ and then later deformed into the ready to use position $P_U$, as discussed below.

The jacket 400 is configured to surround a majority of the male terminal body 104 and provide an arrangement of contact arm deflecting projections 418. The upper and lower segments 402, 460 of the jacket 400, each include a wall arrangement 404, 462 having a U-shaped configuration. In particular, the wall arrangement 404 of the upper segment 402 includes: (i) a top wall 406, and (ii) opposed side walls 408*a*, 408*b*. The opposed side walls 408*a*, 408*b* include: (i) a number of securement features 410 that are designed to secure the jacket 400 to the male terminal body 102, (ii) at least one contact arm deflecting projection 420 that is configured to protect front and/or rear extents of the contact arms 180*a*, 180*b*, 180*d*, (iii) contact arm recess 424, and (iv) opposed locking tabs 426. In this embodiment, said securement features 410 include a plurality of depressions 412*a*-412*d* with internal apexes 413*a*-413*d* that are configured to make contact with the side walls of the male terminal body 104. Said contact between the upper segment 402 and the side walls of the male terminal body 104 ensure the formation of a proper electrical connection between the jacket 400 and the male terminal body 104, whereby preventing possible arcing due to intermediate connections. In other embodiments, the plurality of depressions 412*a*-412*d* may be replaced with another means designed to secure the jacket 400 to the body 104 and prevent possible arcing. Said means may include welding or forming the jacket as a part of the male terminal body 102. The locking tabs 426 are formed from an extent of the side walls 408*a*, 408*b* and are a part of the male terminal retaining means 94. As discussed above, the locking tabs 426 are configured to be positioned in front of the retaining wall surfaces 90 of the male housing assembly 70, when the male connector assembly 50 is in the coupled state $S_C$. The contact arm recess 424 extends upward from a lower edge of the opposed side walls 408*a*, 408*b* and is designed to ensure that the jacket 400 does not interfere with the operation or assembly of the male terminal 100. Adjacent to the contact arm recess 424 is a deflecting projection 420, wherein said projection 420 is positioned between recess 424 and a rear extent of the male terminal 101.

The top wall 406 extends between the opposed side walls 408*a*, 408*b* and includes: (i) securement features 410, (ii) a contact arm opening 414, and (iii) a plurality of deflecting projections 420. The contact arm opening 414 is configured to receive an extent of the contact arm 180*a*-180*d*, when the male terminal assembly is in the assembled state $S_A$. The front and back of the contact arm opening 414 are flanked by deflecting projections 420. Said deflecting projections 420 extend at an outward angle from the jacket 400 (more particularity, the top wall 406) and have an upper edge that is positioned below the apex 186*a*-186*d* of the associated contact arm 180*a*-180*d*. The deflecting projections 420 are designed to: (i) help protect the contact arm 180*a*-180*d* from external impact forces FIE that may damage said contact arm 180*a*, 180*b*, 180*d*, and (ii) ensure that they do not interfere with the movement of the contact arms 180*a*-180*d* during operation of the connector system 10. This embodiment includes: (i) a first deflecting projection 420 positioned: (a) adjacent to the contact arm opening 414, and (b) between a frontal edge of the contact arm opening 414 and the frontal segment 430 of the jacket 400, and (ii) a second deflecting projections 420 positioned: (i) adjacent to the contact arm opening 414, and (ii) between a rear edge of the contact arm opening 414 and the rear extent of the jacket 400. The angle between the outer surface of the top wall 406 of the jacket 400 and the outer surface of the first deflecting projections 420 is approximately equal to the angle formed between a plane that is parallel with the top wall 108*a* of the male terminal body 104 and the third or downwardly sloping extent 188*a*-188*d* of the contact arms 180*a*-180*d*. The angle between the outer surface of the top wall 406 of the jacket 400 and the outer surface of the second deflecting projections 420 is approximately equal to the angle formed between a plane that is parallel with the top wall 108*a* of the male terminal body 104 and the second or upwardly sloping extent 184*a*-184*d* of the contact arms 180*a*-180*d*. It should be understood that in other embodiments, the deflecting projections 420 may be formed in the male terminal housing 70, may be omitted, there length may be increased or decreased, or may include peripheral supports designed to support the outer edges of the deflecting projections 420. In addition to these features, the securement features 410 formed in the top wall 106 include: (i) an additional or top wall depression 412*e*, and (ii) a rear retaining tab 416 designed to wrap around an extent of the male terminal body 104 to secure said jacket 400 to said body 104 (see FIG. 28, 29A).

The jacket's 400 frontal segment 430 includes: (i) a frontal wall 432 with spring arm openings 434*a*, 434*b* formed there through, and (ii) contact arm deflecting projections 440 configured to protect a front extent of the contact arms 180*b*, 180*d*. As will be described in greater detail below, the spring arm openings 434*a*, 434*b* are configured to receive an extent of the spring member 400 (i.e., jacket extent 329*b*, 329*d*) in order to help prevent over-compression of the contact arms 180*b*, 180*d*. Like the upper and lower segments 402 and 462, said deflecting projections 440 extend at an outward angle from the jacket 400 (more particularity, an extent of the frontal wall 432) and are designed to help protect the contact arm 180*a*-180*d* from the external impact forces FIE that may damage said contact arm 180*a*-180*d*.

The jacket's 400 wall arrangement 462 of the lower segment 460 includes: (i) a bottom wall 466, and (ii) opposed side walls 468*a*, 468*b*. The bottom wall 466 extends between the opposed side walls 468*a*, 468*b* and includes: (i) contact arm opening 470, (ii) contact arm deflecting projections 480 that are configured to protect front and rear extents of the contact arms 180*c*, and (iii) securement features 410. The contact arm opening 470 is configured to receive an extent of the contact arm 180*a*-180*d*, when the male terminal assembly is in the assembled state $S_A$. The front and back of the contact arm opening 470 are flanked by deflecting projections 480. Said deflecting projections 480 extend at an outward angle from the jacket 400 (more particularity, the bottom wall 466) and are designed to help protect the contact arm 180*a*-180*d* from the external impact forces FIE that may damage said contact arm 180*a*-180*d*. In this embodiment: (i) a first deflecting projections 480 is positioned: (a) adjacent to the contact arm opening 470, and (b) between a frontal edge of the contact arm opening 470 and the frontal segment 430 of the jacket 400, and (ii) a second deflecting projections 480 is positioned: (i) adjacent to the contact arm opening 470, and (ii) between a rear edge of the contact arm opening 470 and the rear extent of the jacket 400. The angle between the outer surface of the bottom wall 466 of the jacket 400 and the outer surface of the first deflecting projections 480 is approximately equal to the angle formed between a plane that is parallel with the top wall 108*c* of the male terminal body 104 and the third or downwardly sloping extent 188*a*-188*d* of the contact arms 180*a*-180*d*. The angle between the outer surface of the bottom wall 466 of the jacket 400 and the outer surface of the second deflecting projections 480 is approximately equal to the angle formed between a plane that is parallel with the bottom wall 108*c* of the male terminal body 104 and the second or upwardly sloping extent 184*a*-184*d* of the contact arms 180*a*-180*d*. In addition to these deflecting projections 480, the securement features 410 formed in the bottom wall 106 include a plurality of peripheral retaining tabs 474, which are designed to wrap around an extent of the male terminal body 104 to secure said jacket 400 to said body 104 (see FIGS. 27 and 29C).

1. Partially Assembled State to Fully Coupled State

Figure 25:
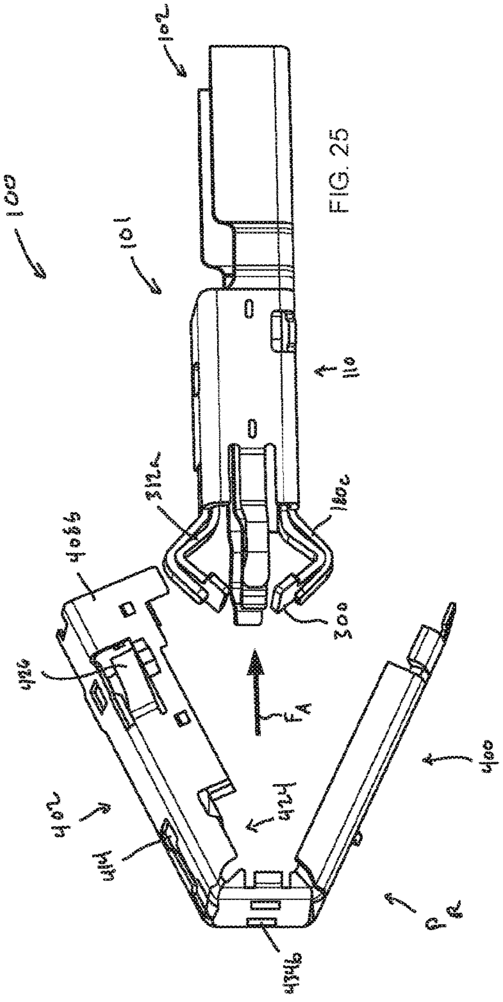
FIG. 25 is a perspective view of the male terminal assembly of FIG. 3 in a third partially assembled state, $S_{3PA}$.

Moving the male terminal assembly from the third partially assembled state, $S_{3PA}$ to the fully coupled state, $S_{FC}$ occurs across multiple steps or stages. First, the male terminal assembly must move from the third partially assembled state, $S_{3PA}$ to an assembled state before the assembler can move the connector to the coupled state $S_C$. FIG. 25 shows the jacket 400 separated from the male terminal 101, where the male terminal assembly 100 is in the third partially assembled state, $S_{3PA}$. In this third partially assembled state, $S_{3PA}$, the jacket 400 is in a ready to receive position $P_R$. An assembler applies a rearwardly assembling force $F_A$ on the jacket 400 to position said jacket 400 over the male terminal body 104 and the spring member 300. When positioning the jacket 400 over the male terminal body 104 and the spring member 300, the assembler must align the spring arm openings 434*a*, 434*b* formed in the jacket 400 with the jacket extent 329*b*, 329*d* of the spring member 300. Once the assembler has applied enough force $F_A$ on the jacket 400 to position: (i) jacket extent 329*b*, 329*d* of the spring member 300 is positioned in the spring arm openings 434*a*, 434*b*, and (ii) deflecting projections 440 are positioned adjacent to third or downwardly sloping extent 188*b*, 188*d* of the contact arms 180*b*, 180*d*, the male terminal assembly 100 has moved from the third partially assembled state, $S_{3PA}$ to the fourth partially assembled state, $S_{4PA}$.

Figure 26:
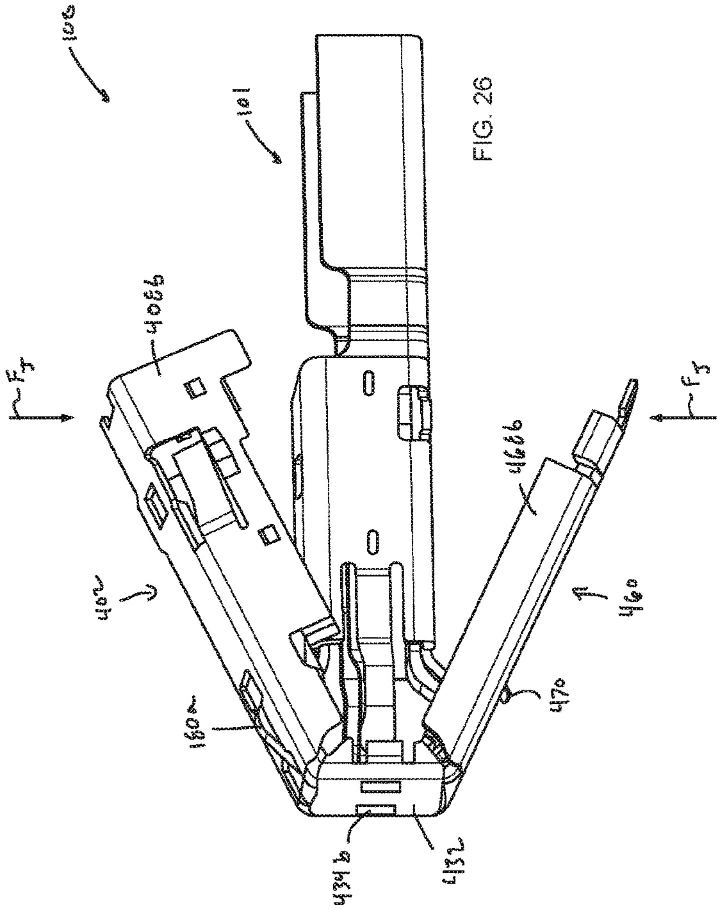
FIG. 26 is a perspective view of the male terminal assembly of FIG. 3 in a fourth partially assembled state, $S_{4PA}$.
Figure 28:
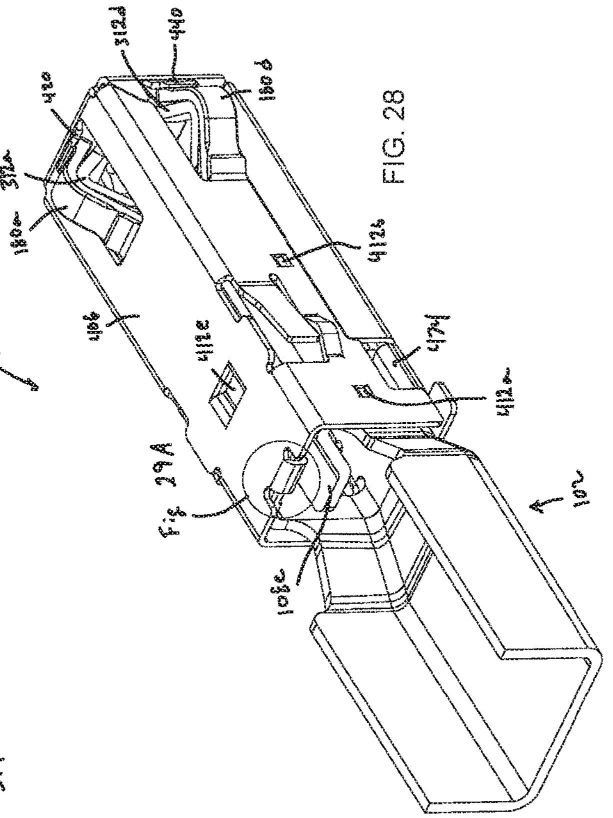
FIG. 28 is a rear perspective view of the male terminal assembly of FIG. 27.
Figure 27:
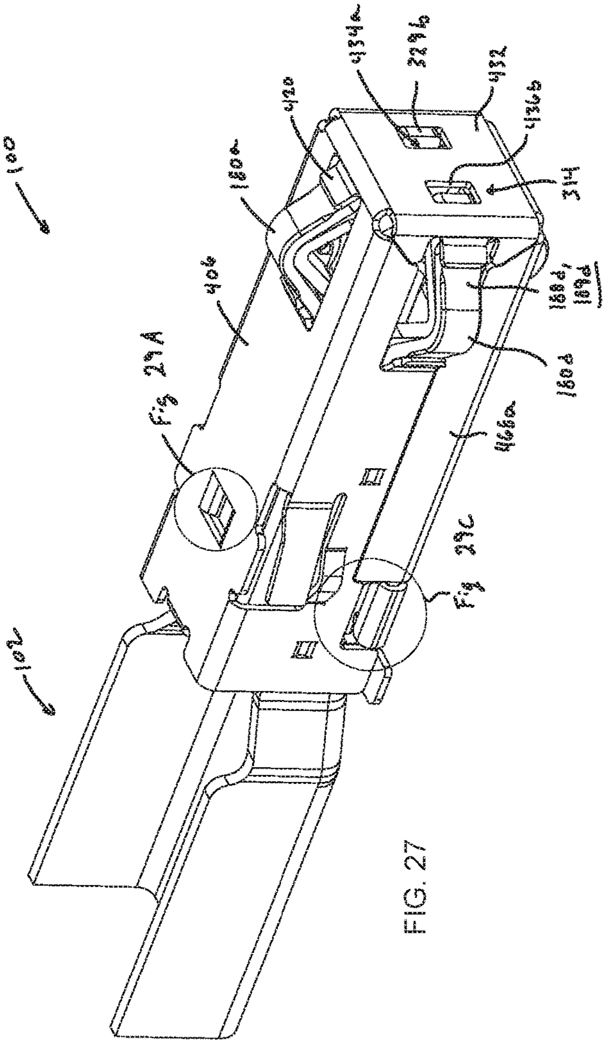
FIG. 27 is a front perspective view of the male terminal assembly of FIG. 3 in a fully assembled state, $S_{FA}$.
Figure 29A:
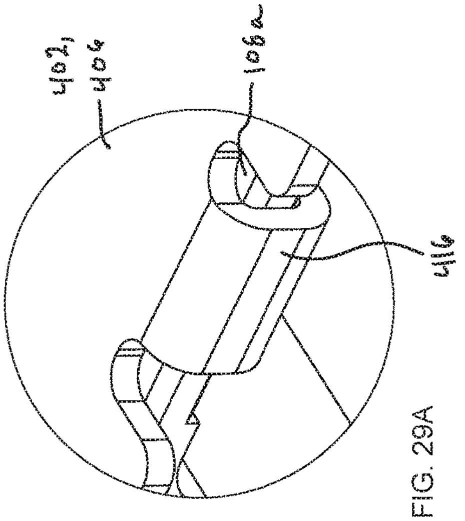
FIG. 29A is a zoomed in view of a first portion of a jacket coupling means shown in the fully assembled state $S_{FA}$ of FIG. 27.
Figure 29B:
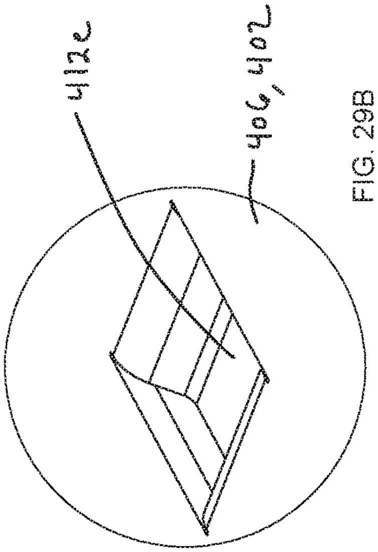
FIG. 29B is a zoomed in view of a second portion of the jacket coupling means shown in the fully assembled state $S_{FA}$ of FIG. 27.
Figure 29C:
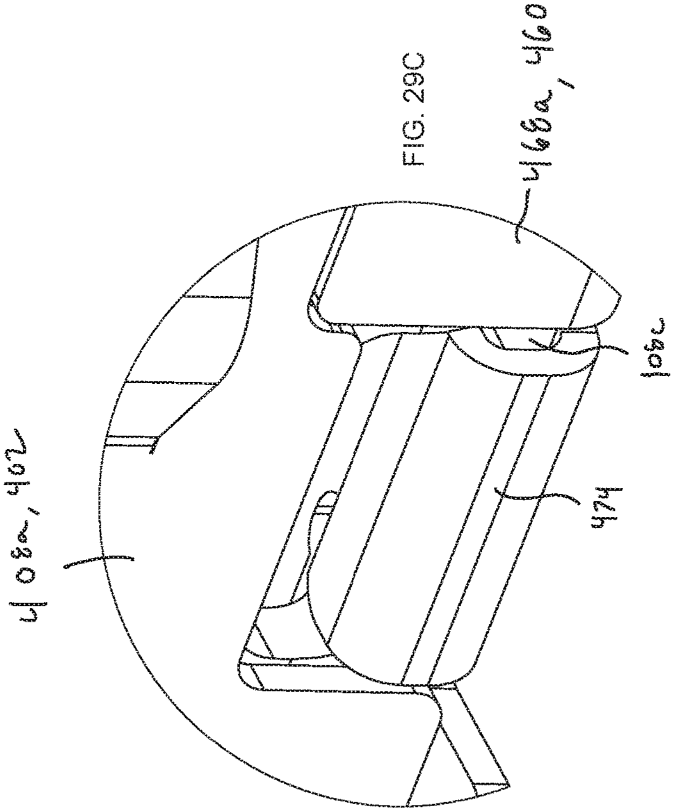
FIG. 29C is a zoomed in view of a third portion of the jacket coupling means shown in the fully assembled state $S_{FA}$ of FIG. 28.

Next, as shown in FIG. 26, the assembler applies a downwardly directed joining force Fj on the upper and lower segments 402, 460 of the jacket 400 to position the top and bottom walls 406, 466 adjacent to the top and bottom walls 108*a*, 108*c* of the male terminal body 104. After said walls 108*a*, 108*c*, 406, 466 are positioned adjacent to one another, the assembler must bend the retaining tabs 416, 474 around extents of the male terminal body 104. Once this has been accomplished, the male terminal assembly 100 is in the assembled state $S_A$ (see FIGS. 27-35). In this assembled state $S_A$, the formation of the second combination of limiting structures 315*b* is complete.

Unlike conventional connector assemblies, the disclosed male terminal assembly 100 includes the means for limiting compression 314. Said means for limiting compression 314 is further comprised of the second combination of limiting structures 315*b*, which is formed from the interaction between structures contained in two separate components (i.e., spring member 300 and jacket 400). In other words, positing the jacket extent 329*b*, 329*d* of the spring member 300 in the spring arm openings 434*a*, 434*b* formed in the jacket 400 will provide said second combination of limiting structures 315*a* (see FIGS. 31-32). Here, the application of an external force $F_E$ on the contact arms 180*b*, 180*d* can only deform the contact arms 180*b*, 180*d* to the max compression distance $D_{MC}$ because the inner surface 342*a* jacket extent 329*b*, 329*d* contacts the inner edges or inner compression edges 436*a*, 436*b* of the spring arm openings 434*a*, 434*b*. Limiting the extent the contact arms be deforming or depressing to the max compression distance $D_{MC}$ prevents the contact arms 180*b*, 180*d*, spring arms 312*b*, 312*d*, and a combination thereof from being overly deformed or depressed (e.g., a distance that is greater than the max compression distance $D_{MC}$) toward the center of the connector 50.

Finally, as shown in FIGS. 36-42, the assembler applies a coupling force Fc on the male terminal assembly 100 in order to position the male terminal assembly 100 in the male housing assembly 70. The assembler will apply said coupling force Fc on the male terminal assembly 100 until the frontal wall 432 of the jacket 400 is positioned adjacent to the front wall 74 of the male housing assembly 70. Once the connector assembly 50 reaches this stage, the contact arms 180*a*-180*d* are positioned within the contact arm openings 76*a*-76*d* of the male housing assembly 70, and the locking tabs 426 of the jacket 400 are positioned forward of the retaining wall surfaces 90. Once the male terminal assembly 100 is in this position, the assembler aligns the retaining body 96 with the retaining opening 95 and applies a downwardly directed force on the retaining body 96 in order to position: (i) the retaining projections 98*a*, 98*b* within the retaining opening 95, and (ii) the securing projections 97*a*, 97*b* below an extent of the connector arrangement of side walls 86. In this state, the male connector assembly 50 is in the fully connected state $S_{FC}$ and is ready for engagement with the female connector assembly 650.

2) Female Connector Assembly

The female connector assembly 650 is comprised of: (i) the female housing assembly 670 and (ii) the female terminal assembly 700.

a. Female Housing Assembly

The female housing assembly 670 is designed to: (i) receive the female terminal assembly 700, (ii) facilitate the coupling of the male terminal assembly 100 with the female terminal assembly 700, (iii) minimize the chance that a foreign object accidentally makes contact with the female terminal assembly 700, and (iv) meet industry standards, such as USCAR specifications. The female housing assembly 670 includes a sidewall 672 having a configuration that substantially matches the configuration of the female terminal assembly 700. In the embodiment shown in the figures, the female terminal assembly 700 has a cuboidal configuration, and preferably a rectanguloid configuration to match the rectanguloid of the male terminal assembly 100. The sidewall 672 of the female housing assembly 670 also includes a plurality of projections 697 configured to be received by the recesses 82, and the projections 80 are configured to be received by the recesses 698. Finally, the female housing assembly 670 includes coupling projection 699, which is design to interact with the female receiver opening 84 of the male housing assembly 70. The female housing assembly 670 also includes a female terminal retaining means 690 that includes: (i) a retaining body 692, (ii) retaining openings 694 formed in the sidewall 672 of the female housing assembly 670, and (iii) terminal body projection receiver 961. The retaining body 692 is a U-shaped structure that includes retaining projections 696 that extend downward from the upper crossing member that extends between the legs of the U-shaped structure. When the assembly 650 is in the fully coupled state, $S_{FC}$: (i) the retaining body 692 is positioned adjacent an extent of the sidewall 672, (ii) the retaining projection 696 extend into the retaining opening 694, and are positioned rearward of the male terminal body 104, and (iii) the terminal body projection 713 is positioned in the terminal body projection receiver 691.

The sidewall 672 of the female housing assembly 670 extends past the upper most surface of the female terminal assembly 700 to allow for the formation of a male compression means 674 in an extent of the sidewall 672. As shown in the Figures, the male compression means 674 is a sloped or ramped surface 676 that extends from an outermost edge 673 of the sidewall 672 to the upper most edge 700*a* of the female terminal assembly 700. In the disclosed embodiment, the sloped or ramped surface 676 extends from each of the outermost edge 673 and has a substantially linear configuration. However, it should be understood that the sloped or ramped surface 676 may only extend from a portion of the outermost edge 673. The male compression means 674, shown as the sloped or ramped surface 676, is designed to compress the contact arms 180*a*-180*d* as the male terminal assembly 100 moves from being separated from the female terminal assembly 700 in a disconnected state $S_{DC}$ to being positioned within an extent of the female terminal assembly 700 in a connected state $S_C$ (see FIGS. 1 and 58-63). As such, the distance between opposed points on the outermost edge 673 is equal to a sidewall distance $D_S$, wherein the sidewall distance $D_S$ is greater than the rearmost edge distance $D_{RE}$ that extends between opposed points on the rearmost edge 678 of the sloped or ramped surface 676. And wherein the rearmost edge distance $D_{RE}$ is greater than or equal to a receiver distance $D_R$ that extends between opposed points on the inner surface 704 of the receptacle 702 of the female terminal assembly 700. In particular, the sidewall distance $D_S$ is between 0.1% and 15% larger than the receiver distance $D_R$, and where the rearmost edge distance $D_{RE}$ is equal to or greater 0.1% and 3% larger than the receiver distance $D_R$. In other words, the sloped or ramped surface 676 is angled relative to the outer surface of the sidewall 672 and/or the inner surface 704 of the receptacle 702 of the female terminal assembly 700. In particular, the interior angle chi $\chi$ that extends between the inner surface of the sloped or ramped surface 676 and the outer surface of the sidewall 672 is between 0.1 degrees and 10 degrees.

This sloped or ramped surface 676 is made from a polymer or plastic material and, as such has a coefficient of friction that is lower than a coefficient of friction associated with a metal surface. In other words, a first friction value is formed when the extent (e.g., a contact arm 180*a*-180*d*) of the male terminal assembly 100 engages with a male terminal compression means 674 formed from a non-metallic material (e.g., plastic). In an alternative embodiment, a second friction value would be formed if the extent (e.g., a contact arm 180*a*-180*d*) of the male terminal assembly 100 was to engage with a male terminal compression means formed from a metallic material (e.g., copper). Comparing the friction value from the disclosed embodiment to the friction value alternative embodiment, it should be understood that the first or friction value from the disclosed embodiment is less than the second or friction value alternative embodiment.

The lower coefficient of friction reduces the force that is required to insert the male terminal assembly 100 into the female terminal assembly 700. This is beneficial because: (i) industry specifications, including USCAR 25, has requirements that the insertion force $F_1$ cannot be greater than 45 Newtons for a class 2 connector and 75 Newtons for a class 3 connector and (ii) the use of a greater spring biasing force $F_{SB}$, which thereby increases the insertion force $F_1$, is desirable to help ensure that the contact arms of the male terminal assembly remain in contact with the inner surface 704 of the receptacle 702 of the female terminal assembly 700. Further, this lower coefficient of friction is beneficial because the connector system 10 can move from the disconnected state $S_{PC}$ to a connected state $S_C$ while meeting class 2/class 3 USCAR specifications without requiring a lever assist. Eliminating the lever assist reduces the size, weight, and cost of manufacturing the connector system 10. It should be understood that to further reduce the coefficient of friction, the sloped or ramped surface 676 may be coated with a substance that reduces this coefficient or the sloped or ramped surface 676 may be made from a material that has an even lower coefficient of friction.

Due to the configuration of the male and female connectors 50, 650, different levels of force are required as the connector system 10 moves from the disconnected state $S_{DC}$ to the connected state $S_C$. For example, a first force $F_{11}$ is required to move the male terminal assembly 100 when an extent (e.g., a contact arm 180*a*-180*d*) of the male terminal assembly 100 is in sliding engagement with the male terminal compression means 674 and a second force $F_{12}$ is required to move the male terminal assembly 100 when the extent (e.g., a contact arm 180*a*-180*d*) male terminal assembly 100 is positioned in the female terminal receiver 702. Comparing the forces, it should be understood that the second force $F_{12}$ is less than the first force $F_{11}$. This is beneficial because it provides the user with a tactical feedback to inform the user that the male terminal assembly 100 is properly seated within the female terminal assembly 700. In fact, this tactical feedback fells to the user like the male terminal assembly 100 is being pulled into the female terminal assembly 700.

To minimize the chance that the male connector assembly 50 can be accidently disconnected from the female connector assembly 650, the female connector assembly 650 may include an optional non-deformable female CPA structure that is designed and configured to interact with the male CPA structures, when the connector assemblies 50, 650 are coupled to one another. Said non-deformable female CPA structure is integrally formed with the sidewall 672 of the female housing assembly 670. Additional details about the structure and/or function of the female CPA structure are disclosed in PCTUS2019/036070, PCTUS2020/049870, PCTUS2021/033446, all of which are incorporated herein by reference.

b. Female Terminal

The female terminal assembly 700 of the female connector assembly 650 is comprised of: (i) a female terminal connection member 701, and (ii) the female terminal body 710. Specifically, the female terminal connection member 701 is coupled to the female terminal body 710. In this embodiment, the female terminal connection member 701 is a wire receiver, wherein said wire receiver has a blade shaped structure that is configured to receive an extent of a structure (e.g., lead or wire) that connects the female terminal assembly 700 to a device (e.g., an alternator) outside of the connector system 10. A wire is typically welded to the wire receiver; however, other methods (e.g., forming the wire as a part of the wire receiver) of connecting the wire to the wire receiver are contemplated by this disclosure. In other embodiments, the female terminal connection member 701 may be a crimping connection, a circuit board connector, have a U-shaped configuration, or any other type of connection member 102 that mechanically and electrically couples the female terminal body 710 to an external device, part, or extent.

The female terminal body 710 of the female connector assembly 650 includes a sidewall 712 having an inner surface 704 that forms cylindrical terminal receptacle 702 with a receiver distance $D_R$ that extends between opposed points on the inner surface 704 of the sidewall 712. As discussed above, the receiver distance $D_R$ is: (i) less than the sidewall distance $D_S$ and (ii) equal to or greater than the rearmost edge distance $D_{RE}$. Additionally, the receiver distance is between 0.1% and 15% smaller than a male terminal assembly distance that extends between the outermost extents of opposed contact arms 180*a*-180*d*. Forming a terminal receptacle 702 with a receiver distance that is less than the male terminal assembly distance ensures that the contact arms 180*a*-180*d* are compressed when the male terminal assembly 100 is inserted into the female terminal assembly 700. This compression of the male terminal assembly 100 compresses the spring member 300. As such, the spring member 300 exerts an outwardly directed biasing force $F_{SB}$ on the contact arms 180*a*-180*d* to help ensure that they remain in contact with the inner surface 704 of the terminal receptacle 702 to facilitate the electrical and mechanical coupling of the male terminal assembly 100 with the female terminal assembly 700.

The female terminal assembly 700 is typically formed from metal and preferably a highly conductive metal, such as copper. The female terminal assembly 700 may be plated or clad with Ni—Ag. In other embodiments, the sidewall 712 may be made from a different material, and/or the female terminal assembly 700 may not be plated or clad with Ni—Ag. Once the female terminal assembly 700 is fabricated, it can be coupled to the wire, part, component, or device via the female terminal connection member 701.

3) Connecting the Connector System

The connector system 10 can move from a disconnected state $S_{DC}$ to a partially connected state $S_{PC}$, where the contact arms 180*a*-180*d* of the male connector assembly 50 in contact with the ramped or sloped surface 676 of the female connector assembly 650. This ramped or sloped surface 676 gently and smoothly compresses the contact arms 180*a*-180*d* until they can easily slide into and make contact with the inner surface 704 of the female receptacle 702. This process is described in greater detail within PCT/US2019/36070 and is incorporated herein. Once the male connector assembly 50 is connected to the female connector assembly 650, the connector system 10 has moved from the partially connected state $S_{PC}$ to the connected state $S_C$. If present, a force is applied to the CPA that causes it to interact with an extent of the external component and the installer can scan an extent of the CPA that is visible through the opening within the housing, as described within PCT/US2020/049870.

4) Terminal Properties and Functionality

Figure 61:
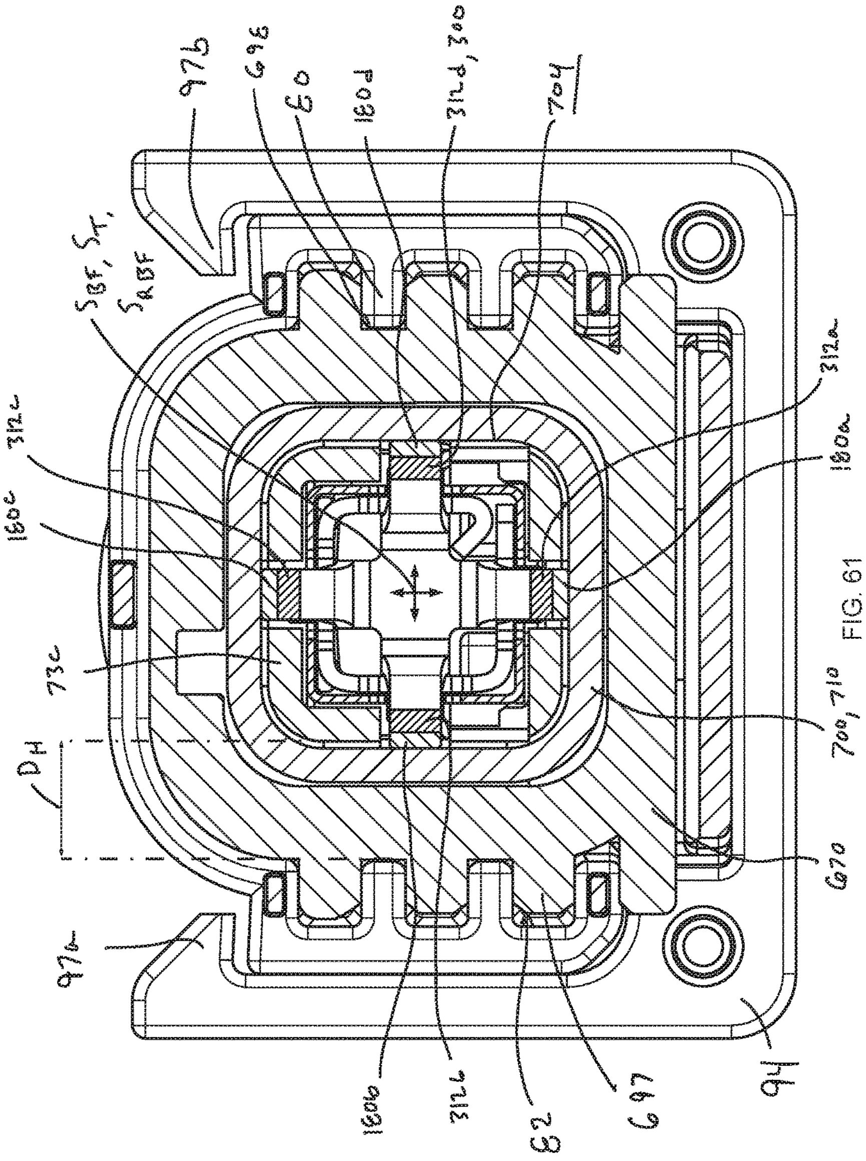
FIG. 61 is a cross-sectional view of the connector system taken along line 61-61 of FIG. 60.
Figure 63:
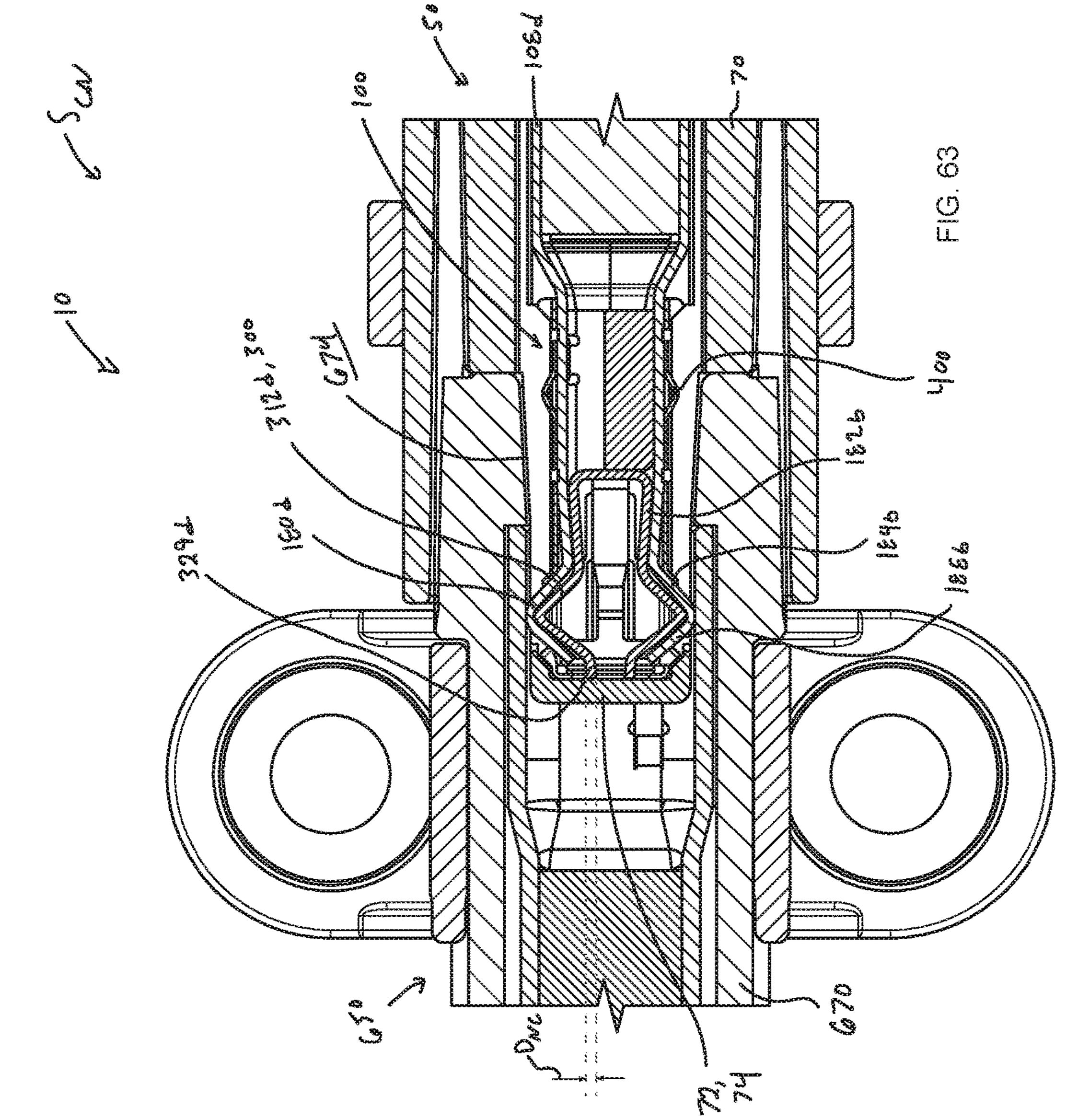
FIG. 63 is a cross-sectional view of the connector system taken along line 63-63 of FIG. 62.
Figure 62:
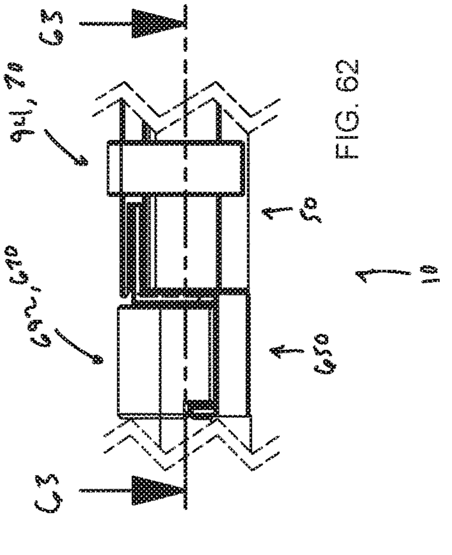
FIG. 62 is a side view of the connector system of FIGS. 1A and 1B shown in the connected state $S_C$.
Figure 64B:
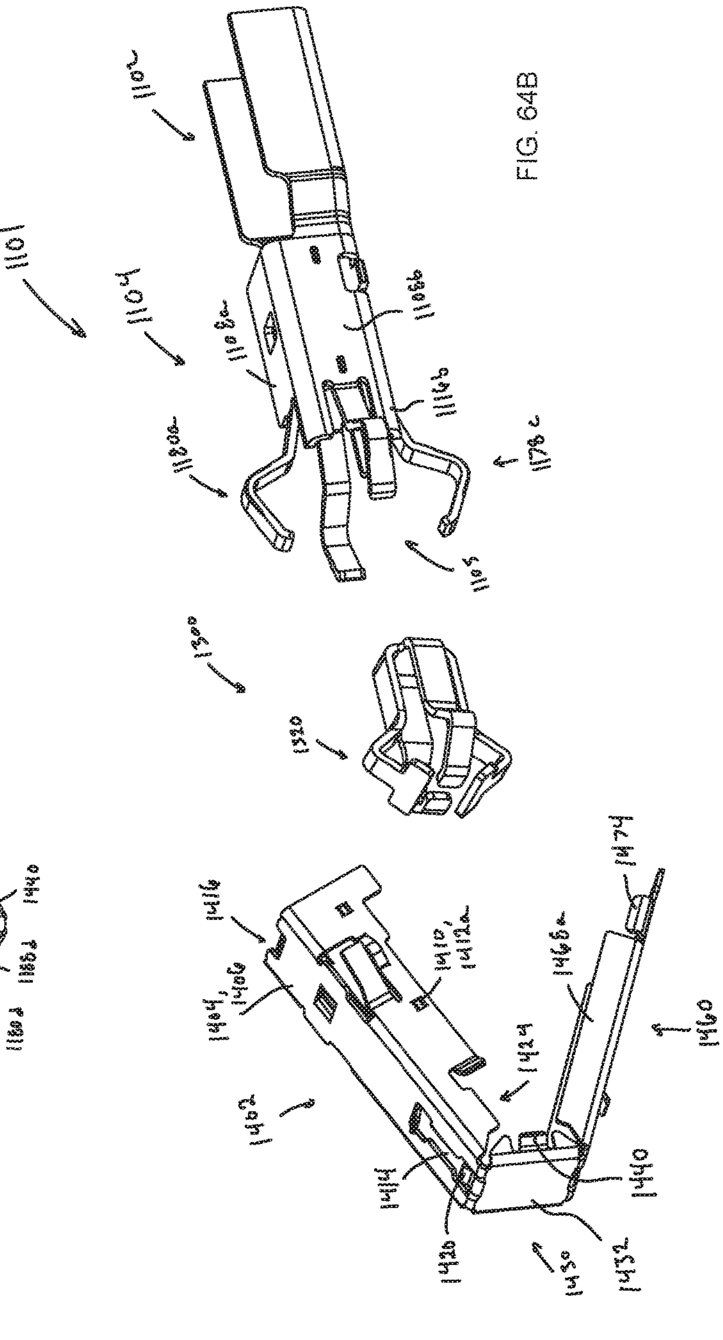
FIG. 64B is an exploded view of the male terminal assembly of FIG. 64A.
Figure 64A:
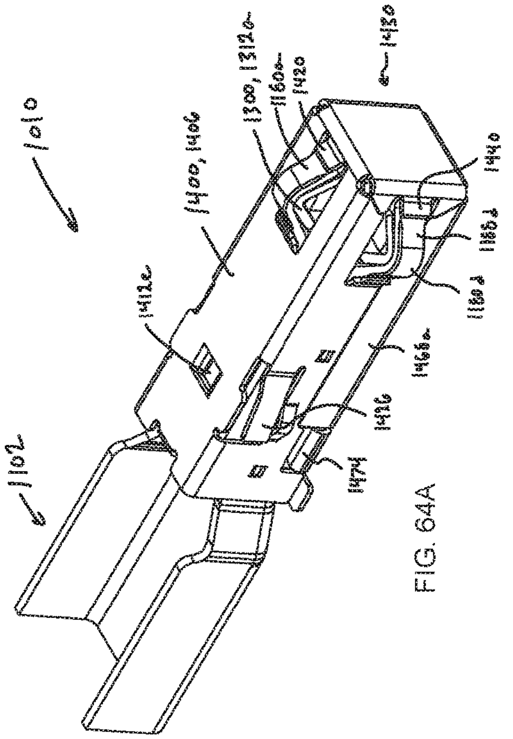
FIG. 64A is a perspective view of a second embodiment of a male terminal assembly, showing a male terminal, spring member, and a jacket in a fully assembled state, $S_{FA}$.
Figure 65B:
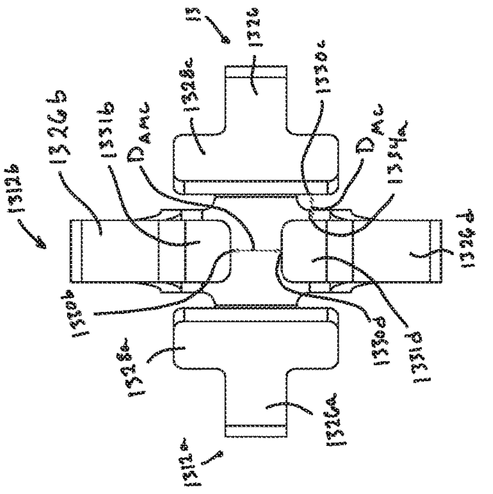
FIG. 65B is a front view of the spring member of FIG. 65A.
Figure 65C:
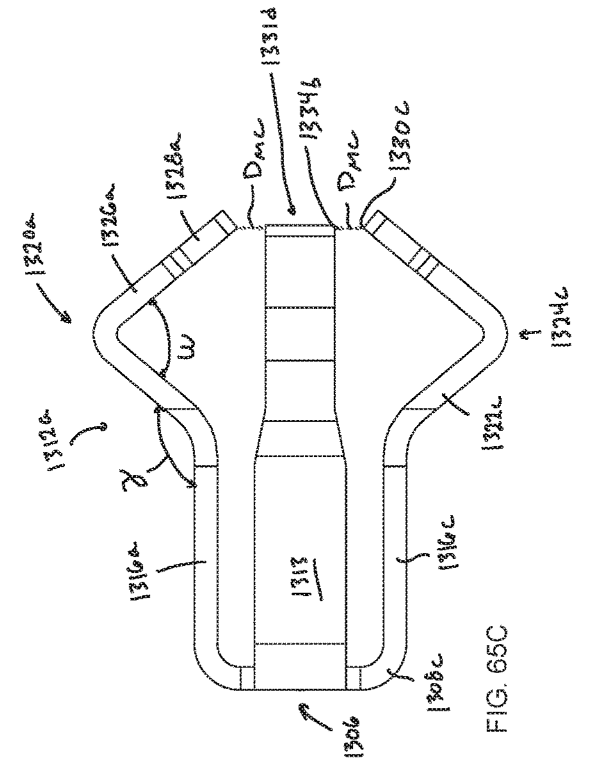
FIG. 65C is a top view of the spring member of FIG. 65A.
Figure 65A:
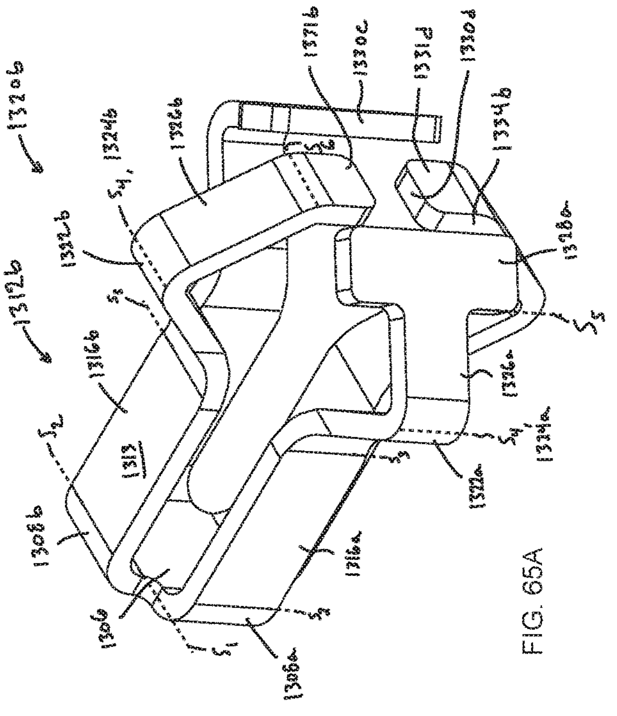
FIG. 65A is a perspective view of the spring member of the male terminal assembly of FIG. 64A.
Figure 66:
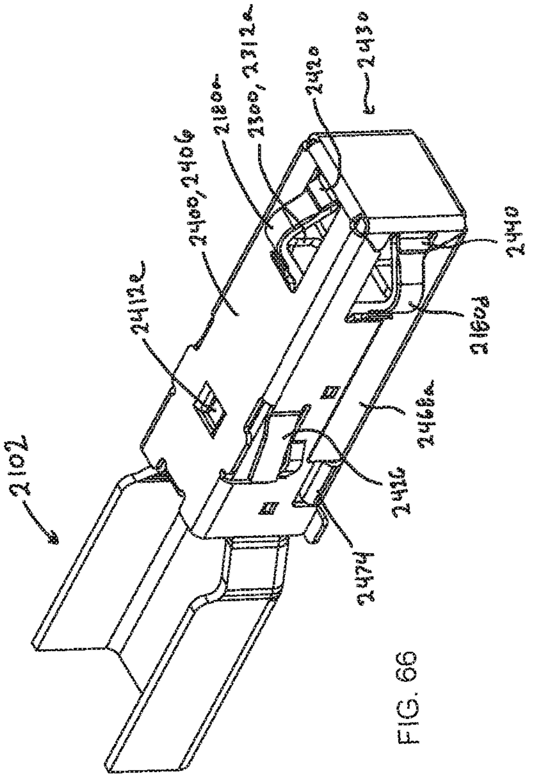
FIG. 66 is a perspective view of a third embodiment of a male terminal assembly, showing a male terminal, spring member, and a jacket in a fully assembled state, $S_{FA}$.
Figure 67:
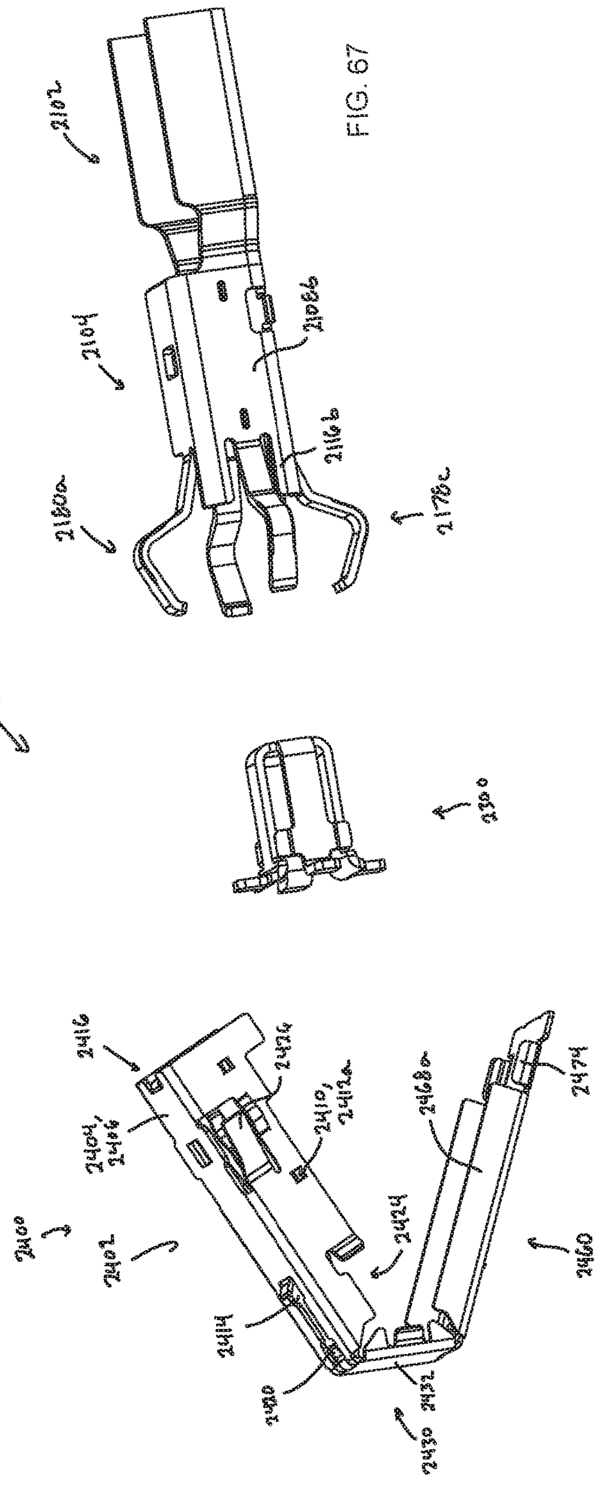
FIG. 67 is an exploded view of the male terminal assembly of FIG. 66.
Figure 68:
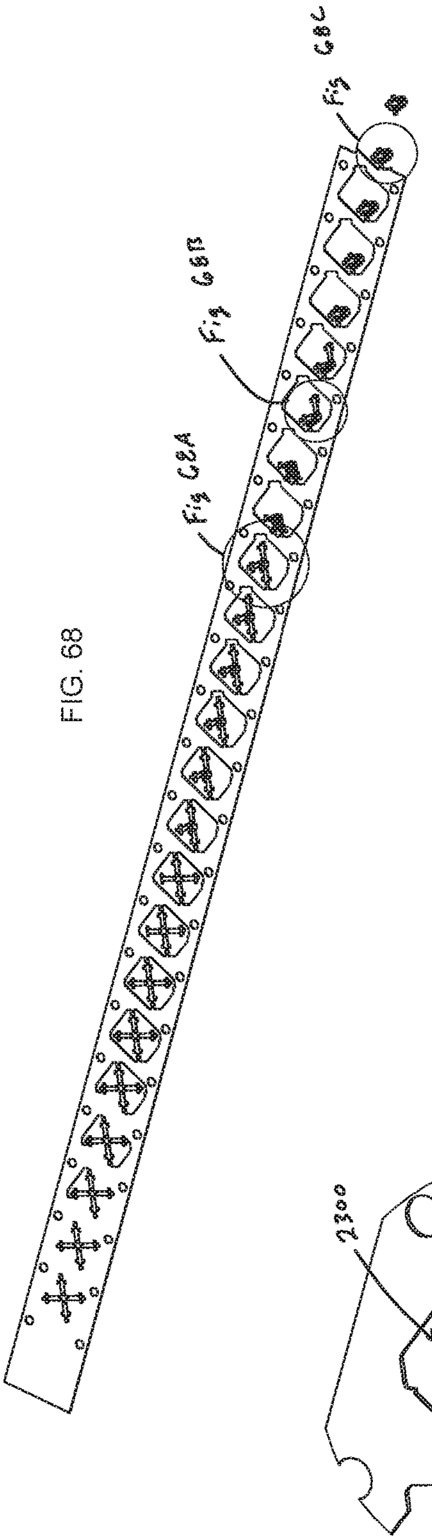
FIG. 68 is a perspective view of the steps in the process of forming the spring member of FIG. 67.
Figure 69C:
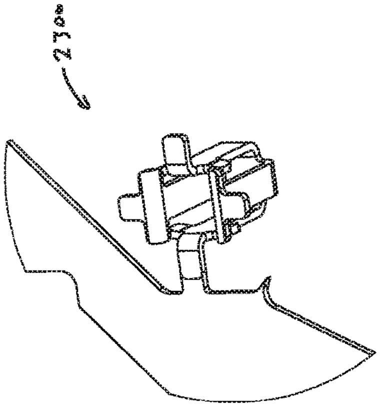
FIG. 69A-69C are zoomed-in views of the steps in the process of forming the spring member shown in FIG. 68.
Figure 69B:
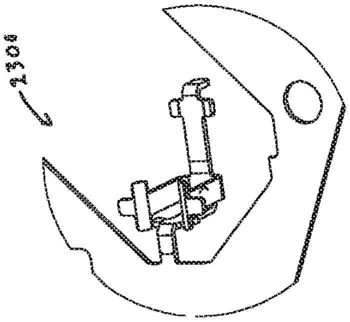
Figure 69A:
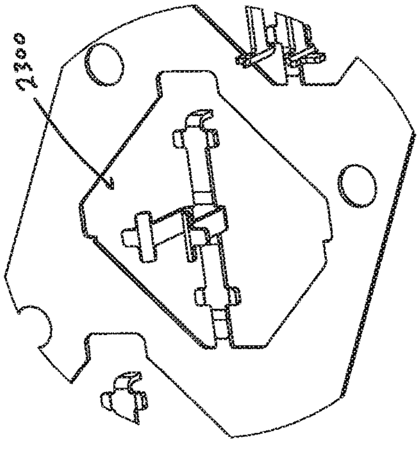
Figure 71B:
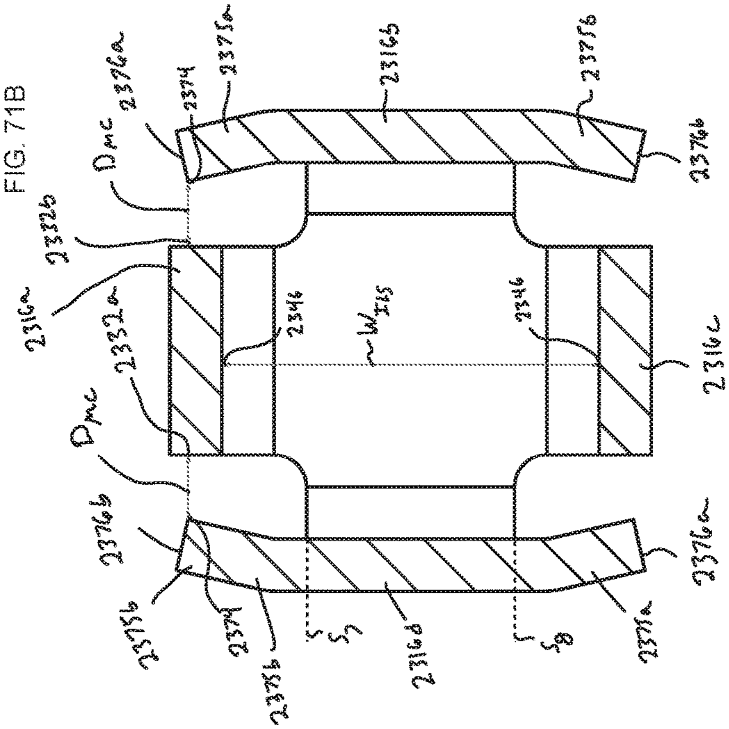
FIG. 71B is a cross-sectional view of the spring member taken along line 71B-71B of FIG. 70C.
Figure 71A:
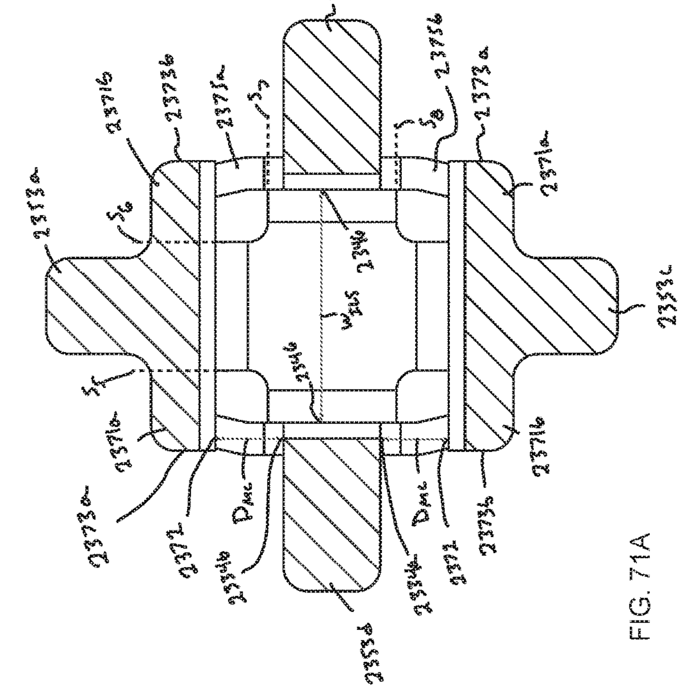
FIG. 71A is a cross-sectional view of the spring member taken along line 71A-71A of FIG. 70C.
Figure 72A:
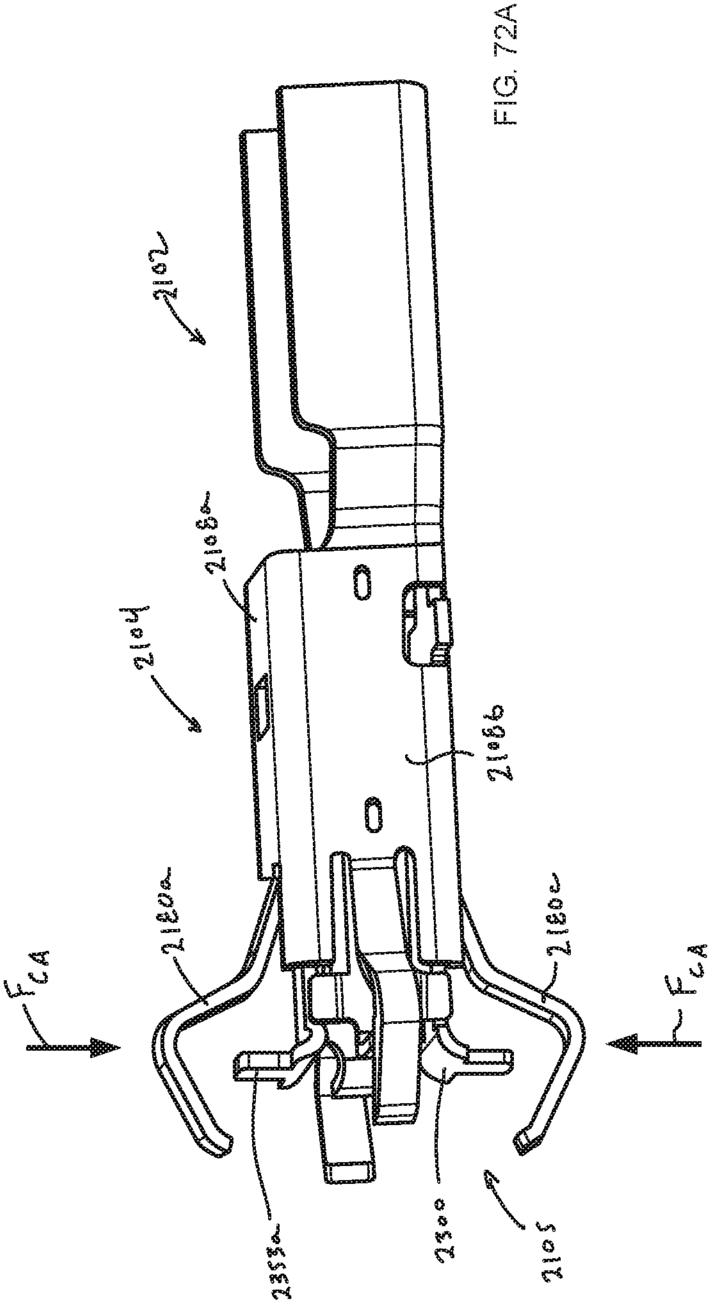
FIG. 72A is a perspective view of the spring member and the male terminal of FIG. 67 in a first partially assembled state, $S_{1PA}$.
Figure 72B:
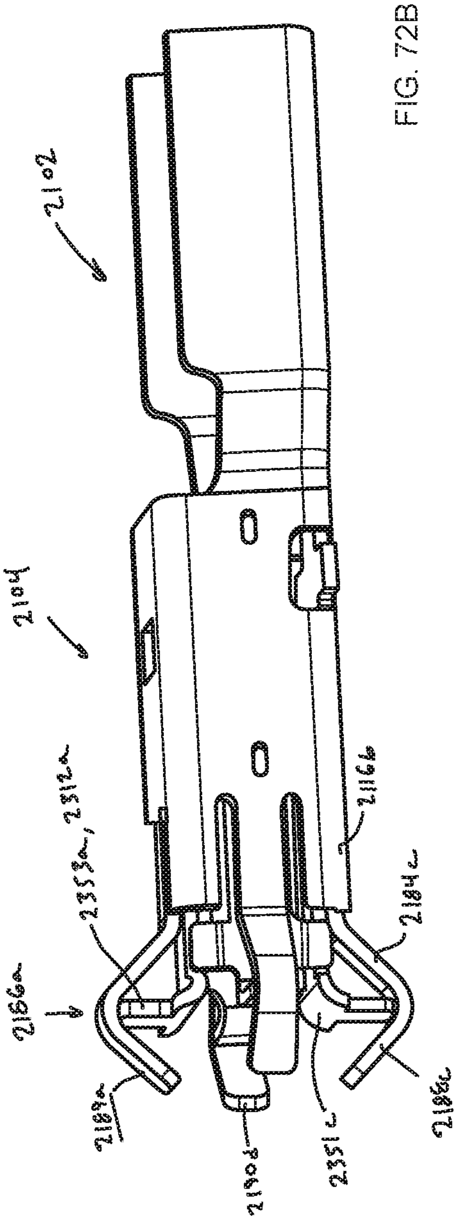
FIG. 72B is a perspective view of the spring member and the male terminal of FIG. 67 in a second partially assembled state, $S_{2PA}$.
Figure 74:
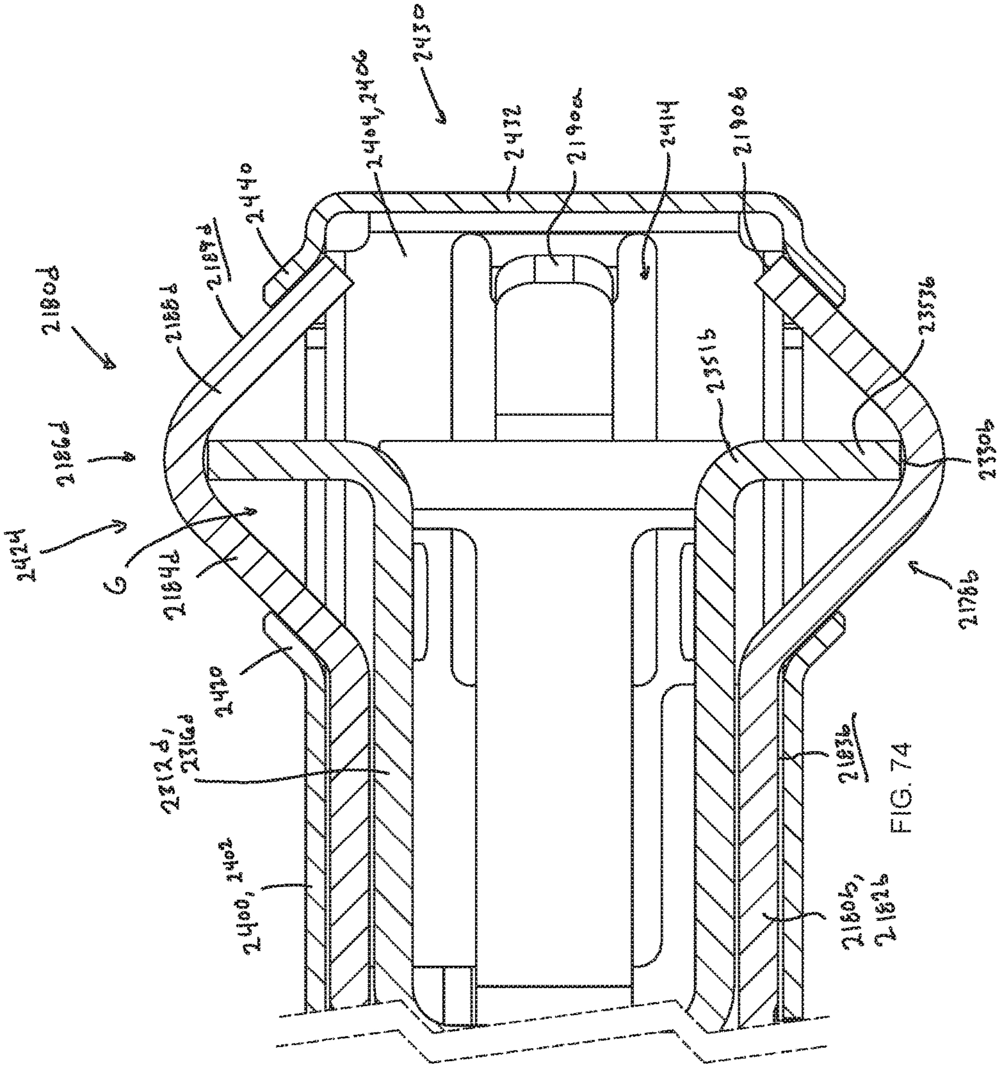
FIG. 74 is a cross-sectional view of the male terminal assembly taken along line 74-74 of FIG. 73.
Figure 73:
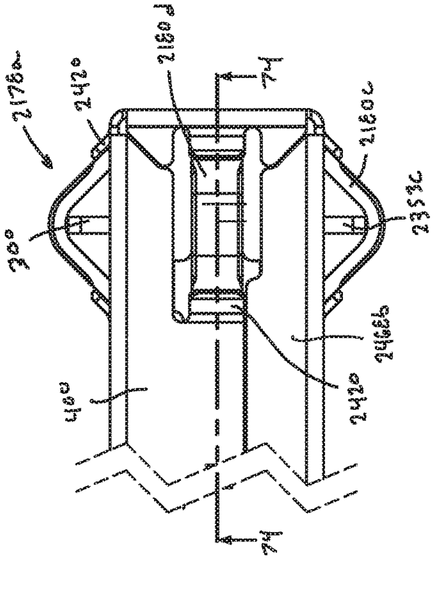
FIG. 73 is a side view of the male terminal assembly of FIG. 66 shown in the fully assembled state, $S_{FA}$.
Figure 75B:
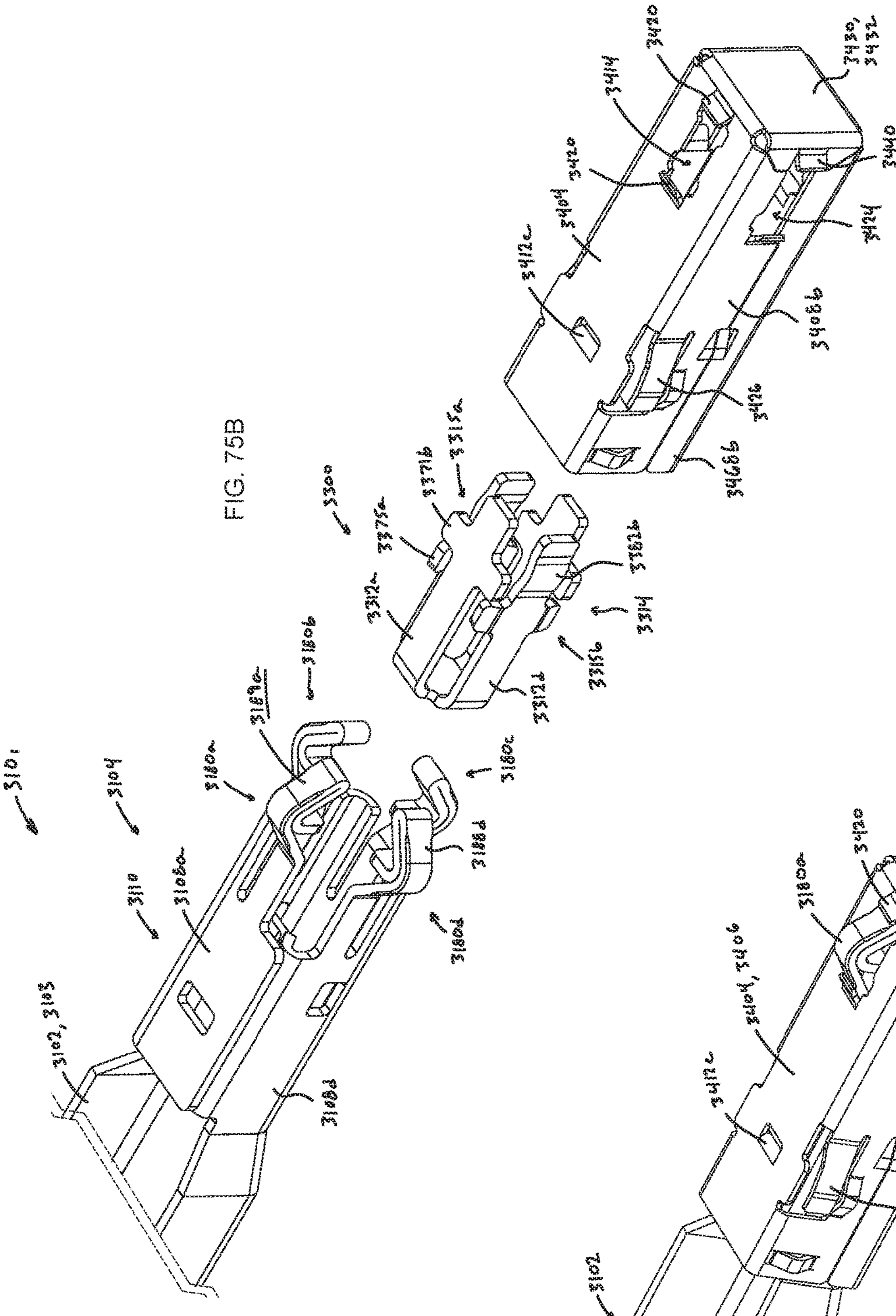
FIG. 75B is an exploded view of the male terminal assembly of FIG. 75A, showing a male terminal, spring member, and a jacket.
Figure 75A:
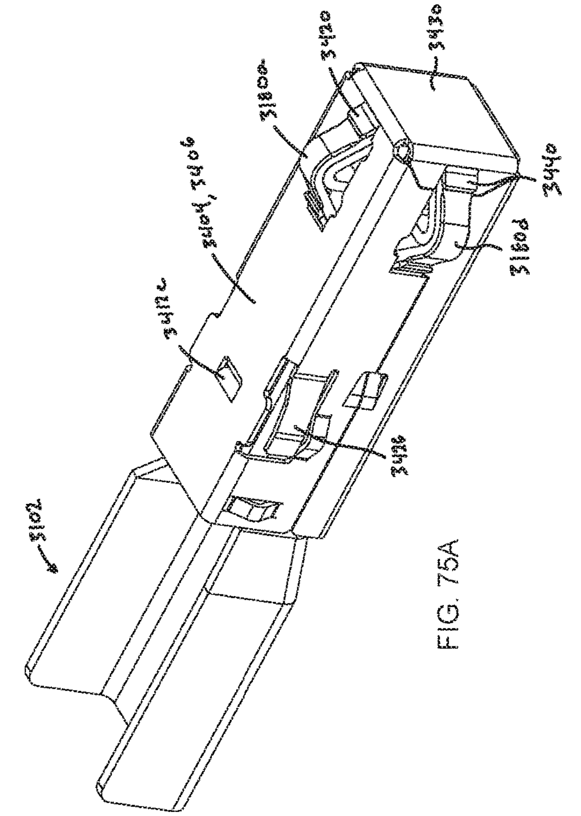
FIG. 75A is a perspective view of a fourth embodiment of a male terminal assembly in a fully assembled state, $S_{FA}$.

FIG. 61 depicts a cross-section of the male connector assembly 50 coupled to the female connector assembly 650 in the connected state $S_C$. While the below disclosure is discussed in connection with the first embodiment of the system 10, it should be understood that this disclosure applies in equal force to all embodiments of the system 1010, 2010, 3010, 4010, 5010, 6010. As discussed above, the outermost extent or diameter of the contact arms 180*a*-180*d* are slightly larger than the inner diameter of the female terminal body 710. As such, when these components are mated with one another, the spring member 300 is compressed. This compression of the spring member 300 creates a wedging effect or outwardly directed biasing force $F_{SB}$ against the contact arms 180*a*-180*d* and away from the interior of the spring member 300.

The male terminal body 104, including the contact arms 180*a*-180*d*, may be formed from a first material such as copper, a highly-conductive copper alloy (e.g., C151 or C110), aluminum and/or another suitable electrically conductive material. The first material preferably has an electrical conductivity of more than 80% of IACS (International Annealed Copper Standard, i.e., the empirically derived standard value for the electrical conductivity of commercially available copper). For example, C151 typically has 95% of the conductivity of standard, pure copper compliant with IACS. Likewise, C110 has a conductivity of 101% of IACS. In certain operating environments or technical applications, it may be preferable to select C151 because it has anti-corrosive properties desirable for high-stress and/or harsh weather applications. The first material for the male terminal body 104 is C151 and is reported, per ASTM B747 standard, to have a modulus of elasticity (Young's modulus) of approximately 115-125 gigapascals (GPa) at room temperature and a coefficient of terminal expansion (CTE) of 17.6 ppm/degree Celsius (from 20-300 degrees Celsius) and 17.0 ppm/degree Celsius (from 20-200 degrees Celsius).

The spring member 300 may be formed from a second material such as spring steel, stainless steel (e.g., 301SS, ¼ hard), and/or another suitable material having greater stiffness (e.g., as measured by Young's modulus) and resilience than the first material of the male terminal body 104. The second material preferably has an electrical conductivity that is less than the electrical conductivity of the first material. The second material also has a Young's modulus that may be approximately 193 GPa at room temperature and a coefficient of terminal expansion (CTE) of 17.8 ppm/degree Celsius (from 0-315 degrees Celsius) and 16.9 ppm/degree Celsius (from 0-100 degrees Celsius). In contemplated high-voltage applications, the cross-sectional area of copper alloy forming the first connector is balanced with the conductivity of the selected copper alloy. For example, when a copper alloy having lower conductivity is selected, the contact arms 180*a*-180*d* formed therefrom have a greater cross-sectional area so as to adequately conduct electricity. Likewise, selection of a first material having a higher conductivity may allow for contact arms 180*a*-180*d* having a relatively smaller cross-sectional area while still meeting conductivity specifications.

In an example embodiment, the CTE of the second material may be greater than the CTE of the first material, i.e., the CTE of the spring member 300 is greater than the CTE of the male terminal body 104. Therefore, when the assembly of the male terminal body 104 and the spring member 300 is subjected to the high-voltage and high-temperature environment typical for use of the electrical connector described in the present disclosure, the spring member 300 expands relatively more than the male terminal body 104. Accordingly, the outward force $F_{SB}$ produced by the spring member 300 on the contact arms 180*a*-180*d* of the male terminal body 104 is increased in accordance with the increased temperature, which is reference to below as a thermal spring force $F_{ST}$.

An example application of the present disclosure, such as for use in a charge coupler, is suitable for deployment in a class 5 automotive environment, such as that found in passenger and commercial vehicles. Class 5 environments are often found under the hood of a vehicle, e.g., alternator, and present 150° Celsius ambient temperatures and routinely reach 200° Celsius. When copper and/or highly conductive copper alloys are subjected to temperatures above approximately 150° Celsius said alloys become malleable and lose mechanical resilience, i.e., the copper material softens. However, the steel forming the spring member 300 retains hardness and mechanical properties when subjected to similar conditions. Therefore, when the male terminal body 104 and spring member 300 are both subjected to high-temperature, the first material of the male terminal body 104 softens and the structural integrity of the spring member 300, formed from the second material, is retained, such that the force applied to the softened contact arms 180*a*-180*d* by the spring member 300 more effectively displaces the softened contact arms 180*a*-180*d* outward relative the interior of the male terminal body 104, in the fully connected position $S_{FC}$.

The male terminal body 104, spring member 300, and female terminal body 710, are configured to maintain conductive and mechanical engagement while withstanding elevated temperatures and thermal cycling. Further, the male terminal body 104 and female terminal body 710 may undergo thermal expansion as a result of the elevated temperatures and thermal cycling, which increases the outwardly directed force $F_{SB}$ applied by the male terminal body 104 on the female terminal body 710. The configuration of the male terminal body 104, spring member 300, and the female terminal body 710 increase the outwardly directed connective force therebetween while the connector system 10 withstands thermal expansion resulting from thermal cycling in the connected position $P_C$.

Based on the above exemplary embodiment, the Young's modulus and the CTE of the spring member 300 is greater than the Young's modulus and the CTE of the male terminal body 104. Thus, when the male terminal body 104 is used in a high power application that subjects the connector system 10 to repeated thermal cycling with elevated temperatures (e.g., approximately 150° Celsius) then: (i) the male terminal body 104 become malleable and loses some mechanical resilience, i.e., the copper material in the male terminal body 104 softens and (ii) the spring member 300 does not become as malleable or loses as much mechanical stiffness in comparison to the male terminal body 104.

Thus, when utilizing a spring member 300 that is mechanically cold forced into shape (e.g., utilizing a die forming process) and the spring member 300 is subjected to elevated temperatures, the spring member 300 will attempt to at least return to its uncompressed state, which occurs prior to insertion of the male terminal assembly 100 within the female terminal assembly 700, and preferably to its original flat state, which occurs prior to the formation of the spring member 300. In doing so, the spring member 300 will apply a generally outward directed thermal spring force $F_{ST}$, (as depicted by the arrows labeled "$F_{ST}$" in FIG. 61) along the entire length of the contact arm 180*a*-180*d* (not just at a discrete point(s)). This thermal spring force $F_{ST}$, is dependent upon local temperature conditions, including high and/or low temperatures, in the environment where the system 10 is installed. Accordingly, the combination of the spring biasing force $F_{SB}$, and the thermal spring force $F_{ST}$, provides a resultant biasing force $F_{RSB}$, that ensures that the outer or contact surface 189*a*-189*d* of the contact arms 180*a*-180*d* are forced into contact with the inner surface 704 of the female terminal body 710 when the female terminal assembly 700 is inserted into the female terminal 700 and during operation of the system 10 to ensure an electrical and mechanical connection. Additionally, with repeated thermal cycling events, the male terminal assembly 100 will maintain and/or increase in the outwardly directed resultant spring forces, $S_{RBF}$, that are applied to the female terminal assembly 700 during repeated operation of the system 10.

Further illustrated in FIG. 61, in the connected state $S_C$, the male terminal assembly 100 provides 360° compliance with the female terminal assembly 700 to ensure that a sufficient amount of outwardly directed biasing force $F_{SB}$ is applied by the male terminal assembly 100 to the female terminal assembly 700 for electrical and mechanical connectivity in all four primarily directions. This attribute allows for omission of a keying feature and/or another feature designed to ensure a desired orientation of the components during connection. The 360° compliance attribute of the system 10 also aids in maintaining mechanical and electrical connection under strenuous mechanical conditions, e.g., vibration. In a traditional blade or fork-shaped connector with 180° compliance, i.e., connection on only two opposing sides, vibration may develop a harmonic resonance that causes the 180° compliant connector to oscillate with greater amplitude at specific frequencies. For example, subjecting a fork-shaped connector to harmonic resonance may cause the fork-shaped connector to open.

Opening of the fork-shaped connector during electrical conduction is undesirable because momentary mechanical separation of the fork-shaped connector from an associated terminal may result in electrical arcing. Arcing may have significant negative effects on the 180° compliant terminal as well as the entire electrical system of which the 180° compliant terminal is a component. However, the 360° compliance feature of the present disclosure may prevent the possible catastrophic failures caused by strong vibration and electrical arcing.

5) Alternate Embodiments of the Male Connector Assembly

FIGS. 64A-65C show a second embodiment of the spring member 1300 that may be used instead of the spring assembly 300 shown and described above. Because a substantial majority of the structures contacted in this embodiment of the system 1010 are similar to the structures contacted the first embodiment of the system 10, it should be understood that reference numbers that are shown in the figures may be omitted from the specification for sake of brevity as like structures have like numbers. For example, the disclosure in connection with male terminal 101 is not repeated herein, but it applies to male terminal 1101, as if it were repeated herein. In other words, omitting reference numbers from the specification or specific disclosure of the functionality of that structure should not limit the disclosure of this application. Instead, one shall refer to the disclosure of similar structures that may be discussed within another section of this application or other applications incorporated herein by reference.

In this second embodiment of the system 1010, an extent of the means for limiting compression 314 from the first embodiment of the system 10 was replaced with an alternative extent of the means for limiting compression 1314. In particular, the second combination of limiting structures 315*b* (i.e., jacket extents 329*b*, 329*d* of the spring member 300 and the spring arm openings 434*a*, 434*b* formed in the jacket 400) was replaced with an alternative combination of structures 1315*b* (i.e., contact extensions 1331*b*, 1331*d*). Here, the contact extensions 1331*b*, 1331*d* disclosed in this embodiment 1010 replace the jacket extents 329*b*, 329*d* from the first embodiment of the system 10. In this embodiment, the application of an external force $F_E$ on the contact arms 1180*b*, 1180*d* can only deform the contact arms 1180*b*, 1180*d*, the alternative max compression distance $D_{AMC}$ because the frontal end 1330*b*, 1330*d* contact one another. Limiting the extent the contact arms 1180*b*, 1180*d* be deforming or depressing to the alternative max compression distance $D_{AMC}$ prevents the contact arms 1180*b*, 1180*d*, spring arms 1312*b*, 1312*d*, and a combination thereof from being overly deformed or depressed (e.g., a distance that is greater than the alternative max compression distance $D_{AMC}$) toward the center of the connector 1050. The alternative max compression distance $D_{AMC}$ in this embodiment is twice as large as the max compression distance $D_{MC}$, but is still small enough to reduce system 1010 failures due to over compression by the external force $F_E$. In other words, the compression distance that the system 1010 fails at larger than the alternative max compression distance $D_{AMC}$, which is larger than the max compression distance $D_{MC}$, which is larger than the normal or operational deformation distance the system 1010 experiences when the system 1010 is in the connected state $S_{CN}$. The design of this terminal assembly 1100 may be more desirable over the first embodiment of the terminal assembly 100 because the means for limiting compression 1314 is completely contained in a single structure (i.e., the spring member 1300), which in turn may increase the durability and longevity of the system 1010.

FIGS. 66-74 show a third embodiment of the spring member 2300 that may be used instead of the spring assembly 300 shown and described above. Because a substantial majority of the structures contacted in this embodiment of the system 2010 are similar to the structures contacted the first embodiment of the system 10, it should be understood that reference numbers that are shown in the figures may be omitted from the specification for sake of brevity as like structures have like numbers. For example, the disclosure in connection with male terminal 101 is not repeated herein, but it applies to male terminal 2101, as if it were repeated herein. In other words, omitting reference numbers from the specification or specific disclosure of the functionality of that structure should not limit the disclosure of this application. Instead, one shall refer to the disclosure of similar structures that may be discussed within another section of this application or other applications incorporated herein by reference. In this embodiment, the geometric bent or creased portions 320*a*-320*d* and the means for limiting compression 314 from the first embodiment of the system 10 has been replaced by contact arm supports 2350 and compression tabs 2370. In particular, the contact arm supports 2350 include: (i) a forward curvilinear extent 2351*a*-2351*d* that extends between the linear extents 2316*b*, 2316*d* (line $S_3$) of the spring member 300 and a vertical extent 2353*a*-2353*d* (line $S_4$), and (ii) the vertical extent 2353*a*-2353*d* extends forward from the forward curvilinear extent 2351*a*-2351*d* (line $S_4$) and terminates at the free end 2330*a*-2330*d*.

Unlike the first two embodiments of the male terminal assembly 100, 1100 disclosed herein, the spring arm 2312*a*-2312*d* does not have a geometry that substantially matches the geometry of the associated contact arm 2180*a*-2180*d*. As such, the spring arm 2312*a*-2312*d* does not have an outer surface 2313*a*-2313*d* that underlie and abuts a majority of an inner surface of the associated contact arm 2180*a*-2180*d*. Instead, the free end 2330*a*-2330*d* of the spring arms 2312*a*-2312*d* are positioned under the apex 2186*a*-2186*d* of the bent or creased portion 178*a*-178*d* of the contact arms 180*a*-180*d*. This configuration forms a gap G (which has a right triangular shape) between the upwardly sloping extent 233*a*, the vertical extent 2353*a*-2353*d* of the spring arms 2312*a*-2312*d*, and the linear extent 2316*a*-2316*d* of the spring arms 2312*a*-2312*d*. Like the first two embodiments of the system 10, 1100, the free ends 2190*a*-2190*d* of the contact arms 2180*a*-2180*d* do not abut a planar outer surface 2313*a*-2313*d* of the spring arms 2312*a*2-312*d*. Other structures, functions, or positional relationships may be obvious to one of skill in the art based on FIGS. 66-74.

The spring member 2300 disclosed in this embodiment replaces prior versions of the means for limiting compression 314, 1314 with structures that are fully integrated into the spring member 2300. Here, said means for limiting compression 2314 is formed from a combination of the compression tabs 2370 and edges 2332*a*-2332*b*, 2334*a*-2334*b* of adjacent spring arms 2312*a*-2312*d*. Said compression tabs 2370 include: (i) lateral projections 2371*a*-2371*b* that extend outward from forward curvilinear extent 2351*a*, 2351*c* (line $S_5$, $S_6$) and terminate at external surfaces 2373*a*-2373*b*, and (ii) substantially vertical wings 2375*a*-2375*b* that extend outward from linear extents 2316*b*, 2316*d* (line $S_7$, $S_8$) and terminate at external surfaces 2376*a*-2376*b*. In other words, the means for limiting compression 2314 in this embodiment includes: (i) a first combination of limiting structures 2315*a*, namely-lateral projections 2371*a*-2371*b* and edges 2334*a*-2334*b* of the adjacent side spring arms 2312*b*, 2312*d*, and (ii) a second combination of limiting structures 2315*b*, namely-substantially vertical wings 2375*a*-2375*b* and edges 2332*a*-2332*b* of the adjacent side spring arms 2312*a*, 2312*c*.

The external surfaces 2373*a*-2373*b* of the lateral projections 2371*a*-2371*b* are positioned outside of or beyond the inner surfaces 2346 of opposed linear extents 2316*b*, 2316*d*. In other words, the length between the external surfaces 2373*a*-2373*b* of the lateral projections 2371*a*-2371*b* is greater than the inner linear surface width $W_{ILS}$, which extends between the inner surfaces 2346 of opposed linear extents 2316*b*, 2316*d*. The application of an external force $F_E$ on the contact arms 2180*a*, 2180*c* can only deform the contact arms 2180*a*, 2180*c*, the max compression distance $D_{MC}$ because an inner surface 2372 of the lateral projections 2371*a*-2371*b* contacts the forward spring arm edges 2334*a*, 2334*b* of the side spring arms 2312*b*, 2312*d* (specifically, the edges of the forward curvilinear extent 2351*b*, 2351*d* of the side spring arms 2312*b*, 2312*d*). In this embodiment the max compression distance $D_{MC}$ is less than 1.25 mm, preferably less than 1.0 mm, and most preferably 0.85 mm. Limiting the extent the contact arms 2180*a*, 2180*c* can be deformed or depressed to the max compression distance $D_{MC}$ prevents the contact arms 2180*a*, 2180*c*, spring arms 2312*a*, 2312*c*, and a combination thereof helps prevent said arms 2180*a*, 2180*c* from being overly deformed or depressed (e.g., a distance that is greater than the max compression distance $D_{MC}$) toward the center of the connector 2050.

The external surfaces 2376*a*-2376*b* of the substantially vertical wings 2375*a*-2375*b* are positioned outside of or beyond the inner surfaces 2346 of opposed linear extents 2316*a*, 2316*c*. In other words, the length between the external surfaces 2376*a*-2376*b* of the substantially vertical wings 2375*a*-2375*b* is greater than the inner linear surface width $W_{ILS}$, which extends between the inner surfaces 2346 of opposed linear extents 2316*a*, 2316*c*. The application of an external force $F_E$ on the contact arms 2180*b*, 2180*d* can only deform the contact arms 2180*b*, 2180*d*, the max compression distance $D_{MC}$ because an inner surface 2374 of the substantially vertical wings 2375*a*-2375*b* contacts the linear extent edges 2332*a*, 2332*b* of the top and bottom spring arms 2312*a*, 2312*c* (specifically, the edges of the linear extents 2316*a*, 2316*b* of the side spring arms 2312*b*, 2312*d*). In this embodiment the max compression distance $D_{MC}$ is less than 1.25 mm, preferably less than 1.0 mm, and most preferably 0.85 mm. Limiting the extent the contact arms 2180*b*, 2180*d* can be deformed or depressed to the max compression distance $D_{MC}$ prevents the contact arms 2180*b*, 2180*d*, spring arms 2312*b*, 2312*d*, and a combination thereof helps prevent said arms 2180*b*, 2180*d* from being overly deformed or depressed (e.g., a distance that is greater than the max compression distance $D_{MC}$) toward the center of the connector 2050.

Fourth Embodiment

1) Male Connector Assembly

FIGS. 75A-100 show a fourth embodiment of the male terminal assembly 3100 that includes a male terminal 3101 and a spring member 3300 that may be used instead of the male terminal 101 and a spring member 300 shown and described above. Because a substantial majority of the structures contacted in this embodiment of the system 3010 are similar to the first embodiment of the system 10, it should be understood that reference numbers that are shown in the figures may be omitted from the specification for sake of brevity as like structures have like numbers. For example, the disclosure in connection with jacket 400 is not repeated herein, but it applies to jacket 3400, as if it were repeated herein. In other words, omitting reference numbers from the specification or specific disclosure of the functionality of that structure should not limit the disclosure of this application. Instead, one shall refer to the disclosure of similar structures that may be discussed within another section of this application or other applications incorporated herein by reference. Like the first embodiment, this fourth embodiment of the male connector assembly 3050 includes multiple components designed to be coupled to a separate device or component (e.g., charge coupler 2, radiator fan, heated seat, power distribution component, or another current drawing component). The male connector assembly 3050 is primarily composed of: (i) a male housing assembly 3070, and (ii) a male terminal assembly 3100 with a male terminal 3101, a spring member 3300, and a jacket 3400, wherein during operation of the connector system 10 at least a substantial extent of the male terminal assembly 3100 resides within the male housing assembly.

a. Male Terminal Assembly

FIGS. 75A-100 provide various views of the male terminal assembly 3100. While a majority of the structures contained in the fourth embodiment of the male terminal body 3104 are similar to the first embodiment of the male terminal body 104, substantial changes have been made to between the configuration of the contact arms 180*a*-180*d*, 3180*a*-3180*d*. As such, the following disclosure will focus on this alternative configuration of the contact arms 3180*a*-3180*d*. Said contact arms 3180*a*-3180*d* have an initial or rear extent 3182*a*-3182*d* that extends from the base or intermediate portion 3110 (line $C_1$) and a bent or creased portion 3178*a*-3178*d*. Said bent or creased portion 3178*a*-3178*d* include a first layer of the contact arm 3180*a-d* that directly overlaps a second layer of the contact arm 3180*a-d* where: (i) a second or upwardly sloping extent 3184*a*-3184*d* that extends between the initial extent 3182*a*-3182*d* (line $C_2$) and an exterior apex 3186*a*-3186*d* (line $C_3$) of the contact arm 3180*a*-3180*d*, (ii) a third or downwardly sloping extent 3188*a*-3188*d* that extends downward from an external apex 3186*a*-3186*d* (line $C_3$) to a forward-most extent that provides a frontal end or nose 3190*a*-3190*d* (line $C_4$) with a rounded or curvilinear end configuration, (iii) a fourth or rearwardly extending extent 3192*a*-3192*d* that extends rearward and upward from the forward-most extent 3190*a*-3190*d* (line $C_4$) to an interior apex 3193*a*-3193*d* (line $C_5$), and (iv) a fifth or vertical extent 3194*a*-3194*d* that extends inwardly from the interior apex 3193*a*-3193*d* (line $C_5$), preferably substantially perpendicular to a midpoint of the interior apex 3193*a-d*. These extents and apexes provide the contact arms 3180*a*-3180*d* with a bent or creased configuration whereby the third extent 3188*a-d* overlaps the fourth extent 3192*a-d* and the external apex 3186*a* overlaps the internal apex 3193*a-d*. Further, the pleated configuration of the contact arms 3180*a-d* forms: (i) a frontal spring contact segment 3196*a*-3196*d* positioned near the forward-most frontal end or nose 3190*a*-3190*d* and within the fourth or rearwardly extending extent 3192*a*-3192*d*, and (ii) an intermediate spring contact segment 3198*a*-3198*d* being a part of the fifth or vertical extent 3194*a*-3194*d*.

The bent or creased configuration of the contact arms 3180*a*-3180*d* provides the connector system 3010 with several advantages over previous designs. For example, this design includes a vertical extent 3194*a*-3194*d* that supports the external apex 3186*a*-3186*d* of said contact arm 3180*a*-3180*d*. This added support increases the durability of the contact arm 3180*a*-3180*d* over the contact arm 3180*a*-3180*d* designs shown in PCT/US2019/036010—namely, the designs shown in FIGS. 69-86—which is beneficial due to the small size of the contact arms 3180*a*-3180*d*. Additionally, having the frontal spring contact segment 3196*a*-3196*d* and the intermediate spring contact segment 3198*a*-3198*d* helps distribute the compressive force $F_{COM}$ applied to the spring arms 3312*a*-3312*d*, when the male terminal assembly 3100 is inserted into the female terminal assembly 700. Further, the configuration of the third or downward sloping extent 3188*a*-3188*d* is beneficial over contact arm designs shown in FIGS. 69-96 of PCT/US2019/036010 because its design helps reduce: (i) insertion forces due to the ramped contact arm design (in contrast to the circular contact arm design), and (ii) potential bending or stubbing of contact arms 3180*a*-3180*d*, when the insertion of the male terminal assembly 3100 is not directly in line with the female terminal assembly 700.

Figure 77:
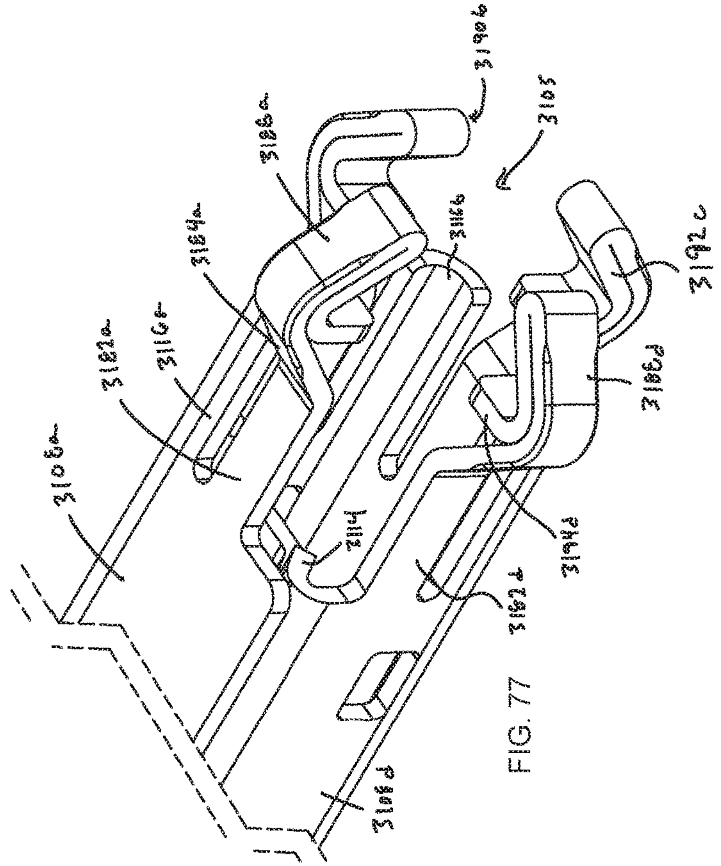
FIG. 77 is a perspective view of the male terminal of FIG. 76.
Figure 76:
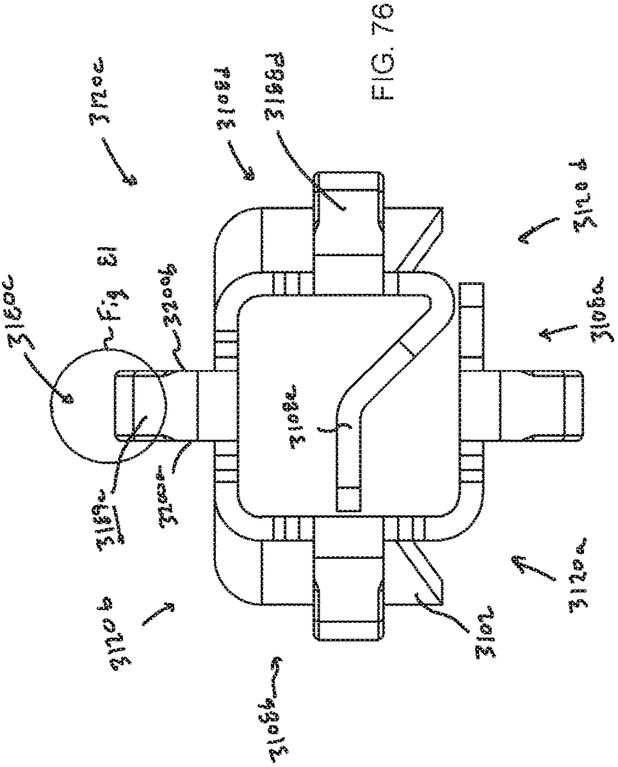
FIG. 76 is a front view of the male terminal of FIG. 75B, showing a male terminal body with a plurality of contact arms.
Figure 79:
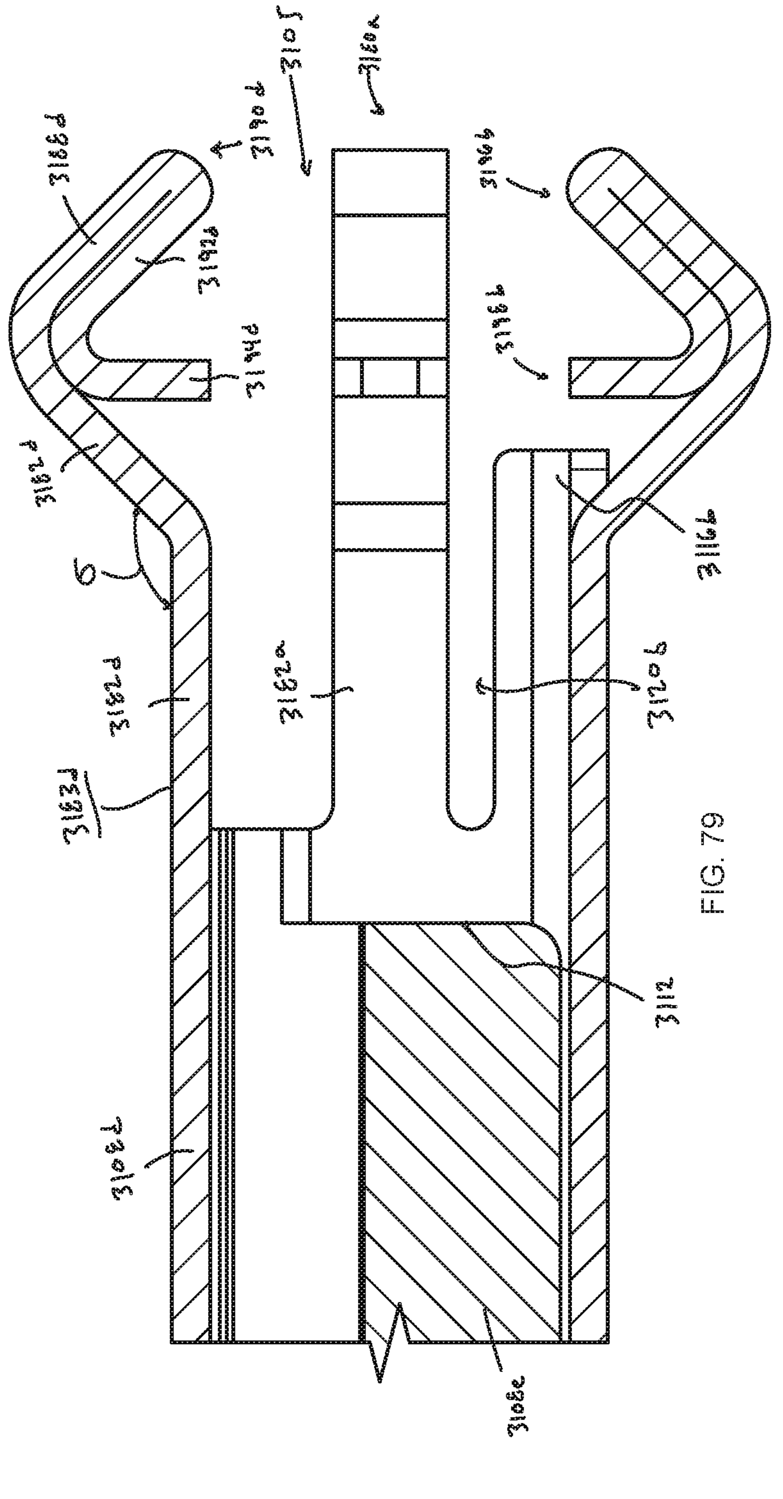
FIG. 79 is a cross-sectional view of a portion of the male terminal taken along line 79-79 of FIG. 78.
Figure 78:
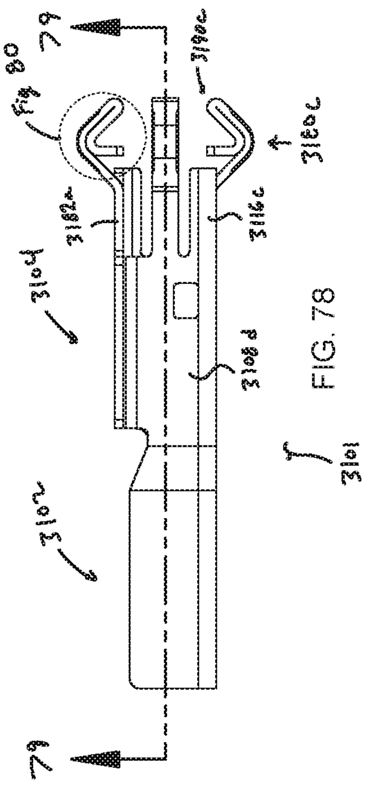
FIG. 78 is a side view of the male terminal of FIG. 76, showing the male terminal body.

Referring to FIGS. 77-79, unlike conventional connectors, the disclosed contact arms 3180*a*-3180*d* have an elongated initial or rear extent 3182*a*-3182*d* that does not extend away from the base portion 3110 at a uniform outward sloping angle or substantially uniform outward sloping angle. In other words and as best shown in FIG. 79, an outer surface 3183*a*-3183*d* of the initial or rear extent 3182*a*-3182*d* of each contact arm 3180*a*-3180*d* are: (i) substantially parallel with one another, and (ii) substantially aligned with the outer surface 3111 of the corresponding extent of the base portion 3110. Compared to conventional connectors that lack this elongated initial or rear extent 3182*a*-3182*d*, less force is required to deform or displace the contact arm 3180*a*-3180*d* inward or toward the center of the male terminal 3101. This reduced force allows for an increase in the force required to inwardly displace an extent of the spring member 3300. Shifting the structure that resists the inward displacement from the contact arm 3180*a*-3180*d* to the spring arm 3312*a*-3312*d* is beneficial because changes to the insertion force $F_1$ can be easily made by changing the design and/or material composition of the spring member 3300 and not redesigning the terminal body 3104. For example, the designer can insert a stiffer spring member 3300 in order to maintain/maximize the current carrying capacity of the system 3010. Or if there are specific customer requirements setting forth a target insertion force $F_1$, the designer can select a spring member 3300 that meets these requirements without having to undertake a costly and time-consuming redesign of the male terminal body 3104. This modularity and flexibility of the connector system 3010 is a substantial improvement over the prior art, as reduce the number of product SKUs, increases the ability to meet customer requirements without retooling or redesigning the connector, and/or limits testing and other steps that would be required to utilize new/different connectors. It should be understood that the length of the initial or rear extent 3182*a*-3182*d* will substantially alter the insertion force $F_1$ required to insert the male terminal assembly 3100 into the female terminal assembly 3700. Also, in other embodiments, the contact arms 3180*a*-3180*d* may extend away from the base 3110 at a uniform inwardly angle or substantially uniform inwardly sloping angle. Said inwardly sloping angle allows the male terminal assembly 3100 to have an inwardly tapered design or configuration. In this alternative embodiment, the inwardly tapered design or configuration may be configured such that the outer diameter at line $C_2$ may be between 0.01% and 5% less than the outer diameter at line $C_1$.

Figure 80:
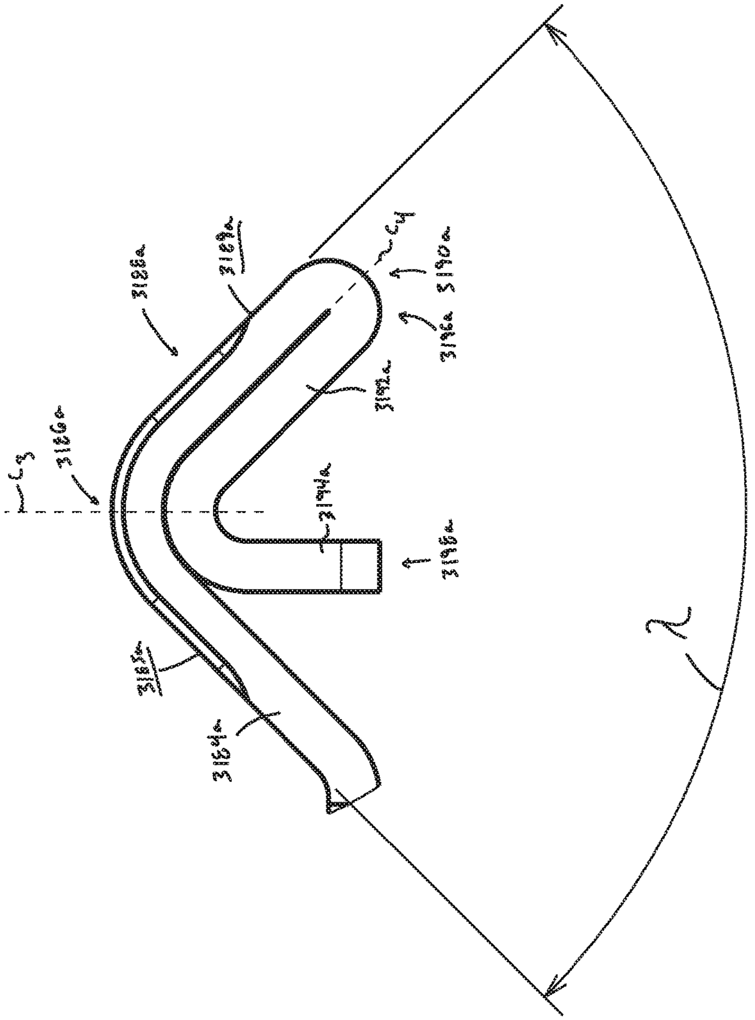
FIG. 80 is a zoomed-in side view of the contact arm of the male terminal of FIG. 78.

As shown in FIGS. 80, forward of the lateral initial or rear extent 3182*a*-3182*d*, the second or upwardly sloping extent 3184*a*-3184*d* is positioned at an outward angle sigma σ that is defined between an outer surface 3183*a*-3183*d* of the initial or rear extent 3182*a*-3182*d* of the contact arm 3180*a*-3180*d* and an outer surface 3185*a*-3185*d* of the second or upwardly sloping extent 3184*a*-3184*d* of the contact arm. The outward angle sigma σ is between 115 and 170 degrees, and preferably between 125 and 145 degrees. Forward of the second or upwardly sloping extent 3184*a*-3184*d*, the contact arm 3180*a*-3180*d* has a third or downwardly sloping extent 3188*a*-3188*d* that extends downward from the exterior apex 3186*a*-3186*d* to the forward-most frontal end or nose 3190*a*-3190*d*. An exterior angle lamda % is defined between the outer surface 3185*a*-3185*d* of the second or upwardly sloping extent 3184*a*-3184*d* and the outer or contact surface 3189*a*-3189*d* of the third or downwardly sloping extent 3188*a*-3188*d*. The exterior angle lamda λ is between 240 and 300 degrees, and preferably between 255 and 285 degrees. Similar to the prior discussion, the other terminals, whose disclosure is incorporated herein, lack this configuration of the sharp upwardly angled segment and the sharp downwardly angled segment and the numerous resulting apexes.

As discussed in greater detail below, the third or downwardly sloping extent 3188*a*-3188*d*, and specifically the contact surface 3189*a*-3189*d*, is configured to contact an extent of the female connector assembly 650 when the male terminal assembly 3100 is inserted into the female terminal assembly 700. This interaction between these components causes the contact arms 3180*a*-3180*d* to be deflected or displaced inward and towards the center of the male terminal assembly 3100 and the spring member 700. This inward deflection of the contact arms 3180*a*-3180*d* causes the spring member 700 to act as a wedge to help ensure that a proper mechanical and electrical connection is created between the contact arms 3180*a*-3180*d* and the female receptacle 702.

Figure 91:
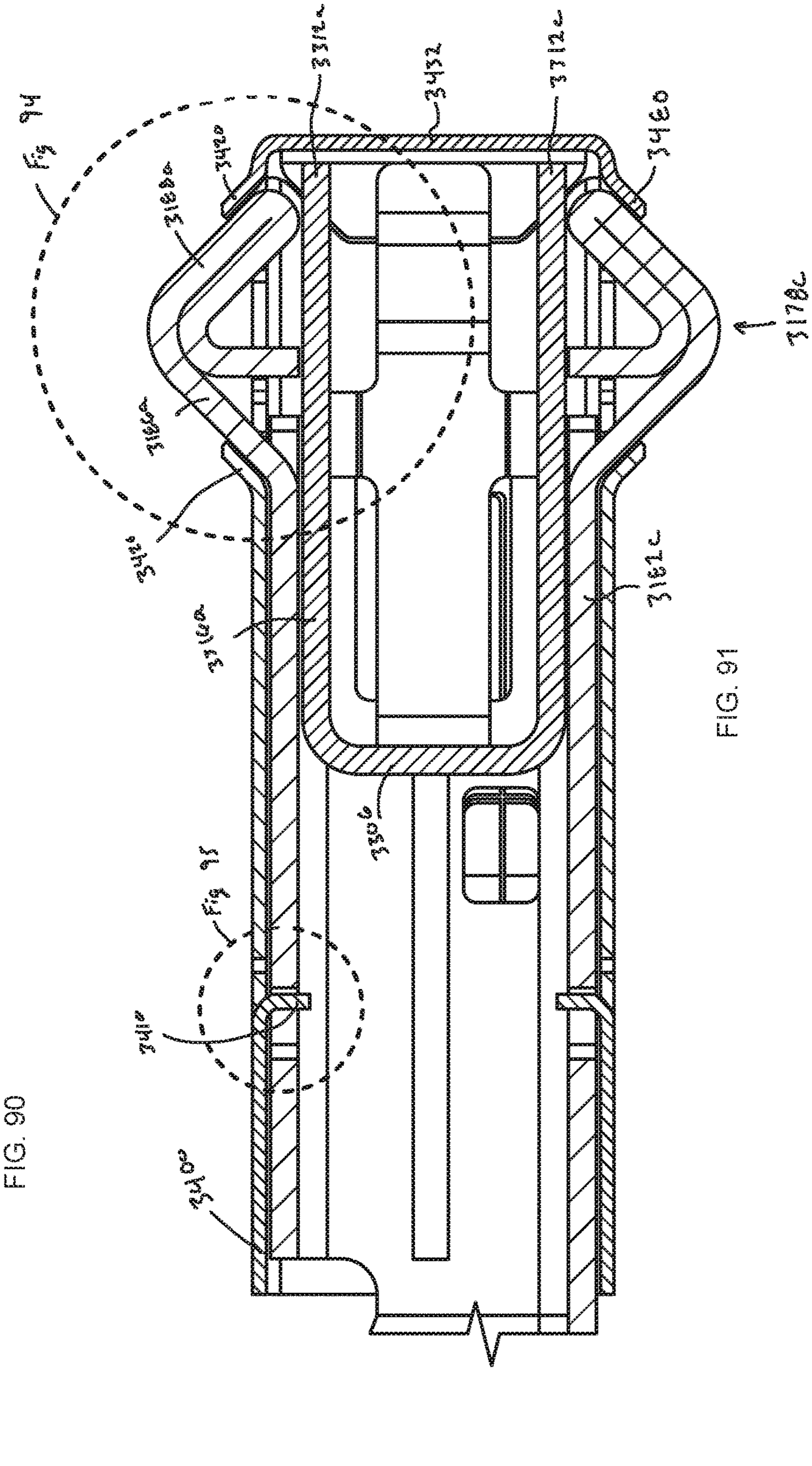
FIG. 91 is a cross-sectional view of the male terminal assembly taken along line 91-91 of FIG. 90.
Figure 93:
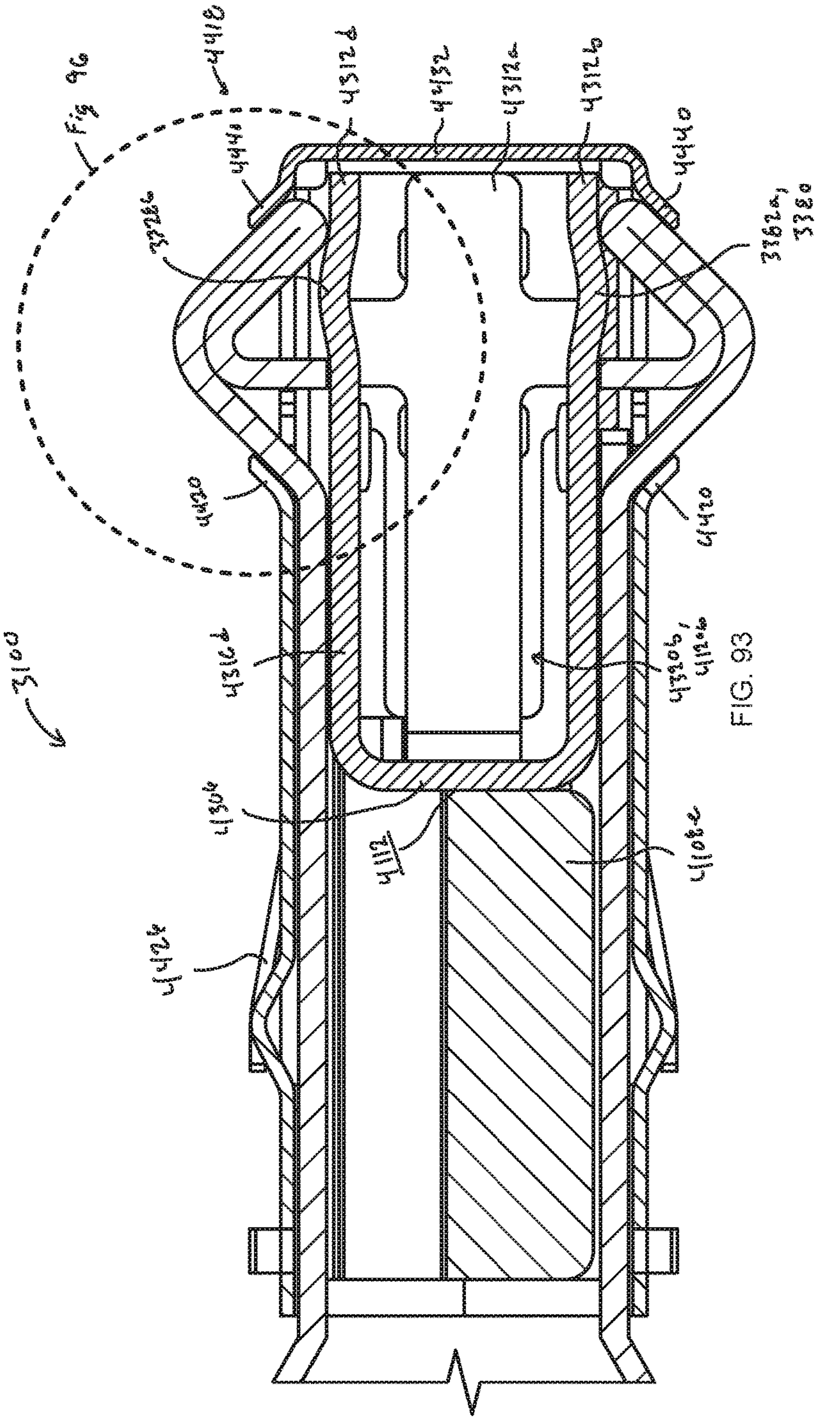
FIG. 93 is a cross-sectional view of the male terminal assembly taken along line 93-93 of FIG. 92.
Figure 92:
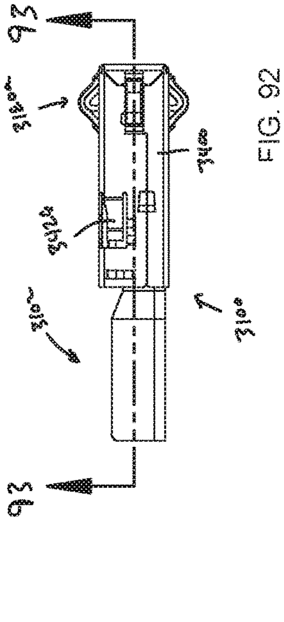
FIG. 92 is a side view of the male terminal assembly of FIG. 75B in a fully assembled state, $S_{FA}$.
Figure 95:
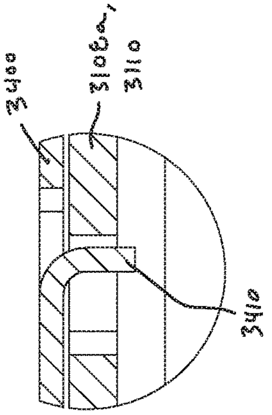
FIG. 95 is a zoomed-in view of a first portion of a jacket coupling means of the male terminal assembly shown in FIG. 91.
Figure 96:
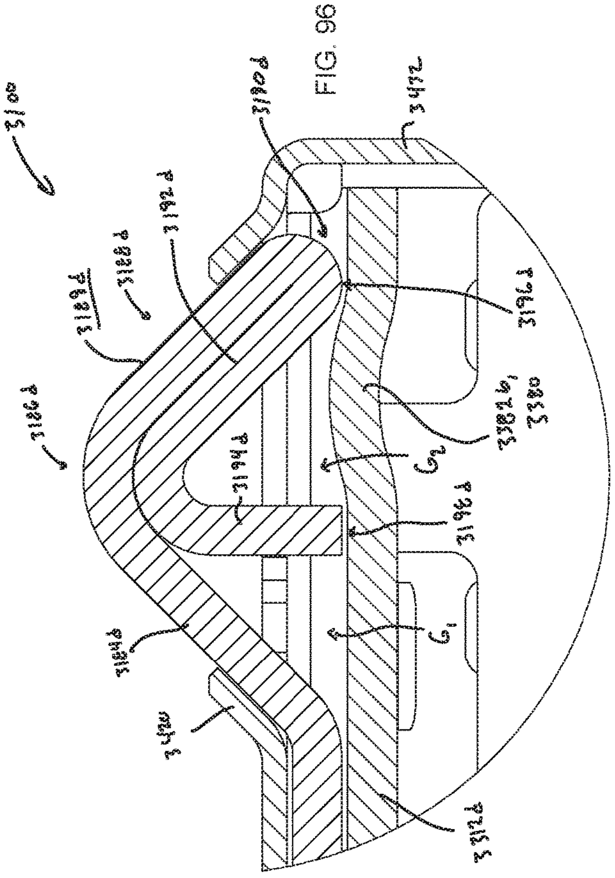
FIG. 96 is a zoomed-in view of the male terminal assembly shown in FIG. 93.
Figure 94:
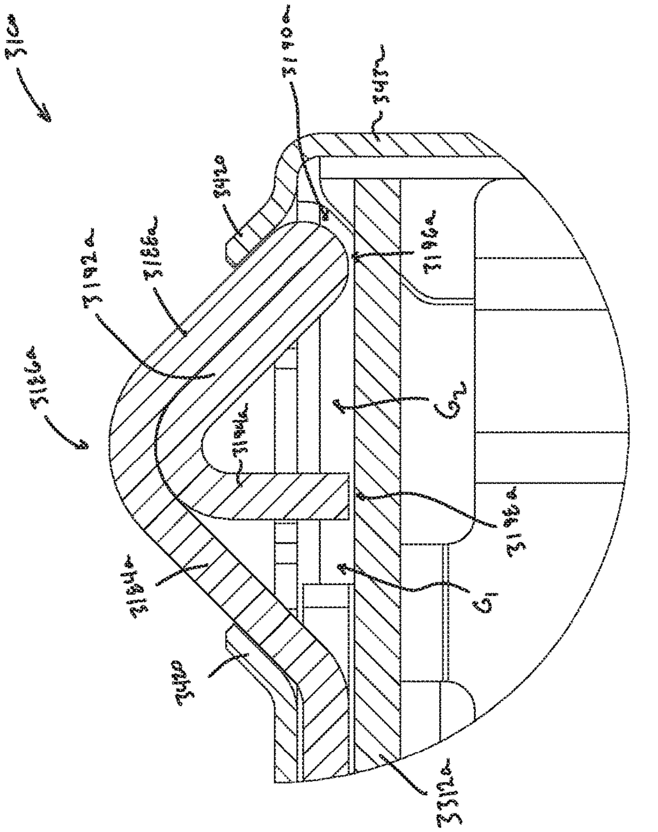
FIG. 94 is a zoomed-in view of the male terminal assembly shown in FIG. 91.
Figure 98:
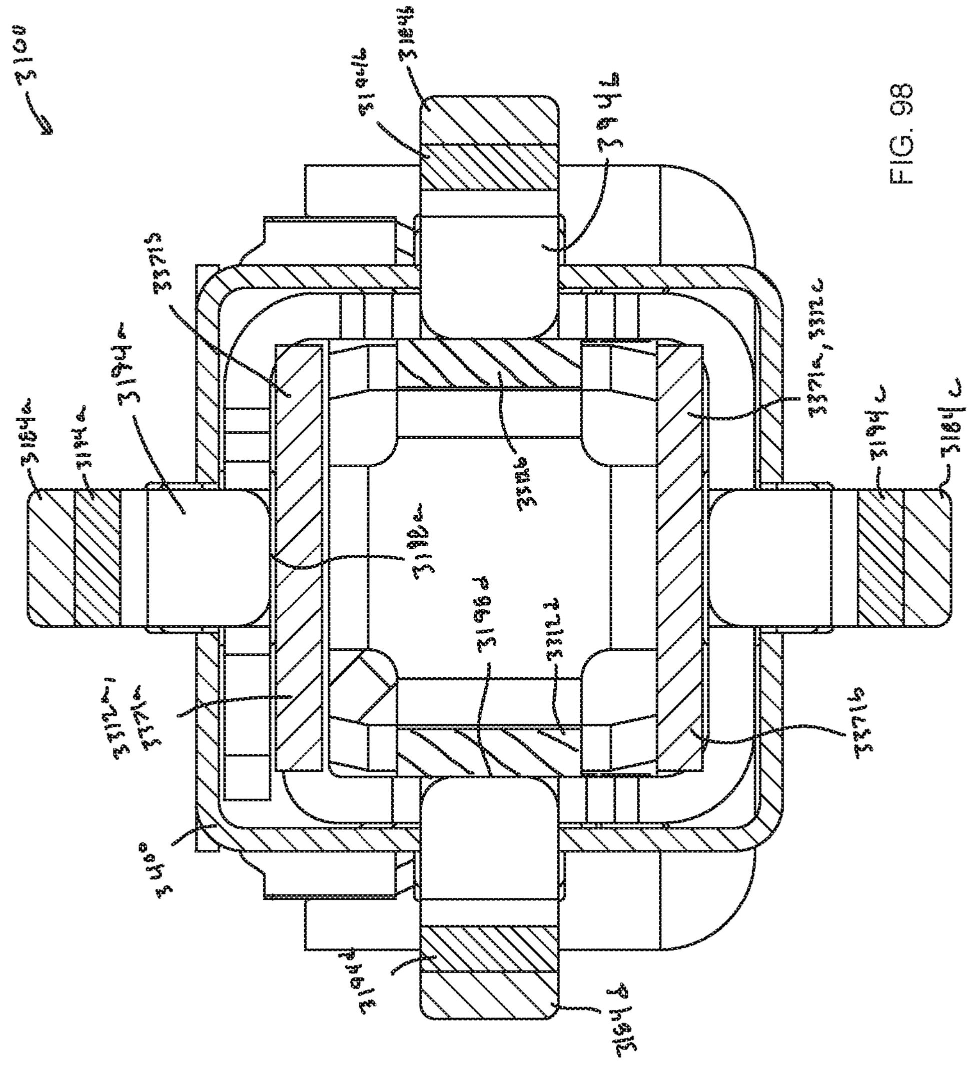
FIG. 98 is a cross-sectional view of the male terminal assembly taken along line 98-98 of FIG. 97.
Figure 97:
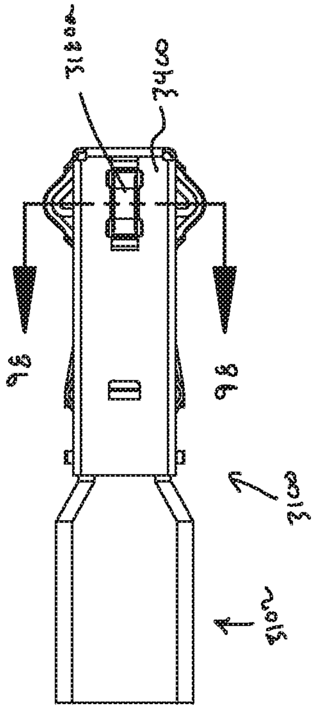
FIG. 97 is a top view of the male terminal assembly shown in FIG. 90.
Figure 100:
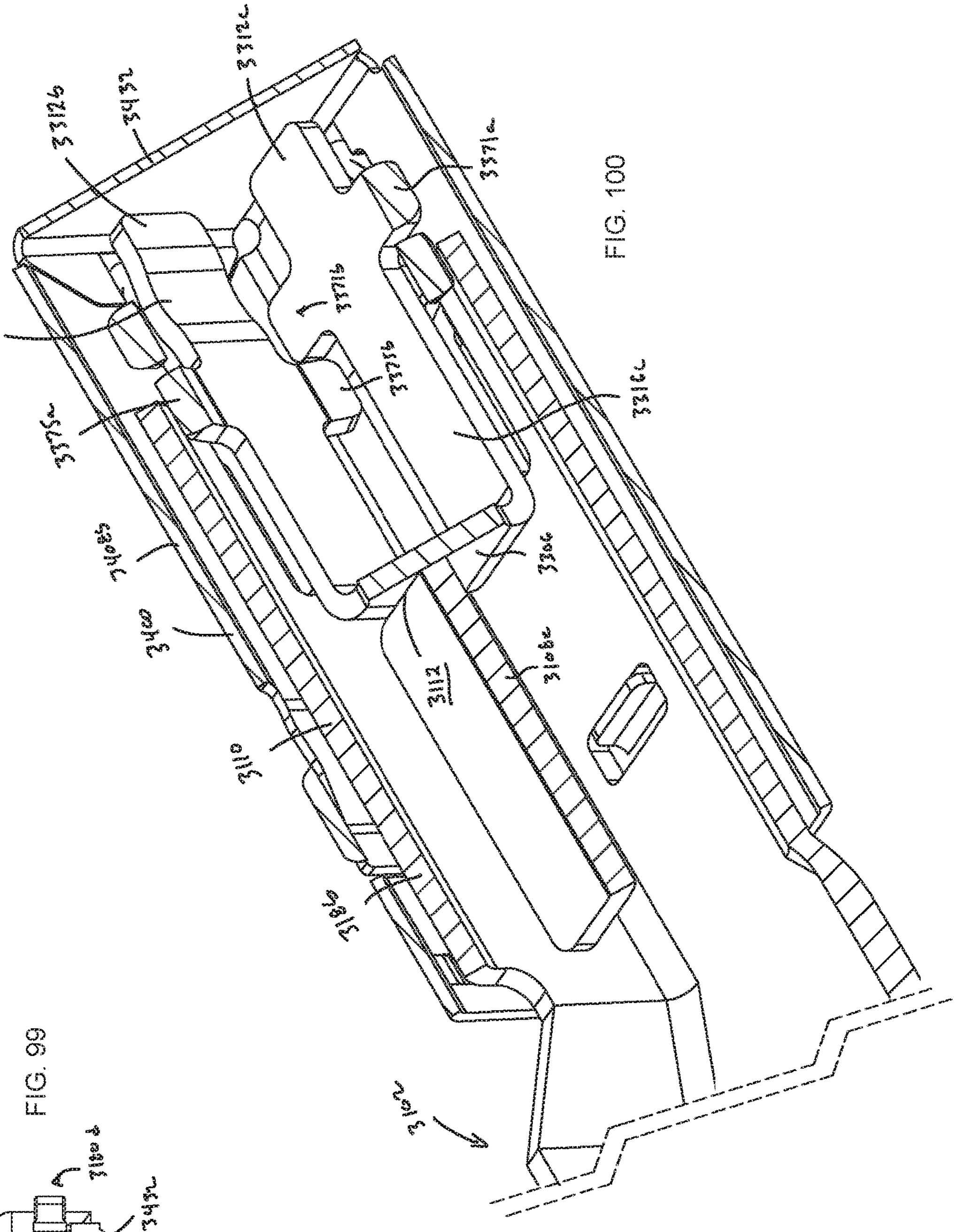
FIG. 100 is a cross-sectional view the male terminal assembly taken along line 100-100 of FIG. 99.
Figure 99:
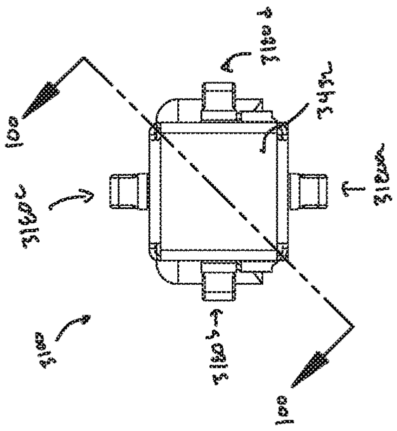
FIG. 99 is a front view of the male terminal assembly shown in FIG. 90.
Figure 101:
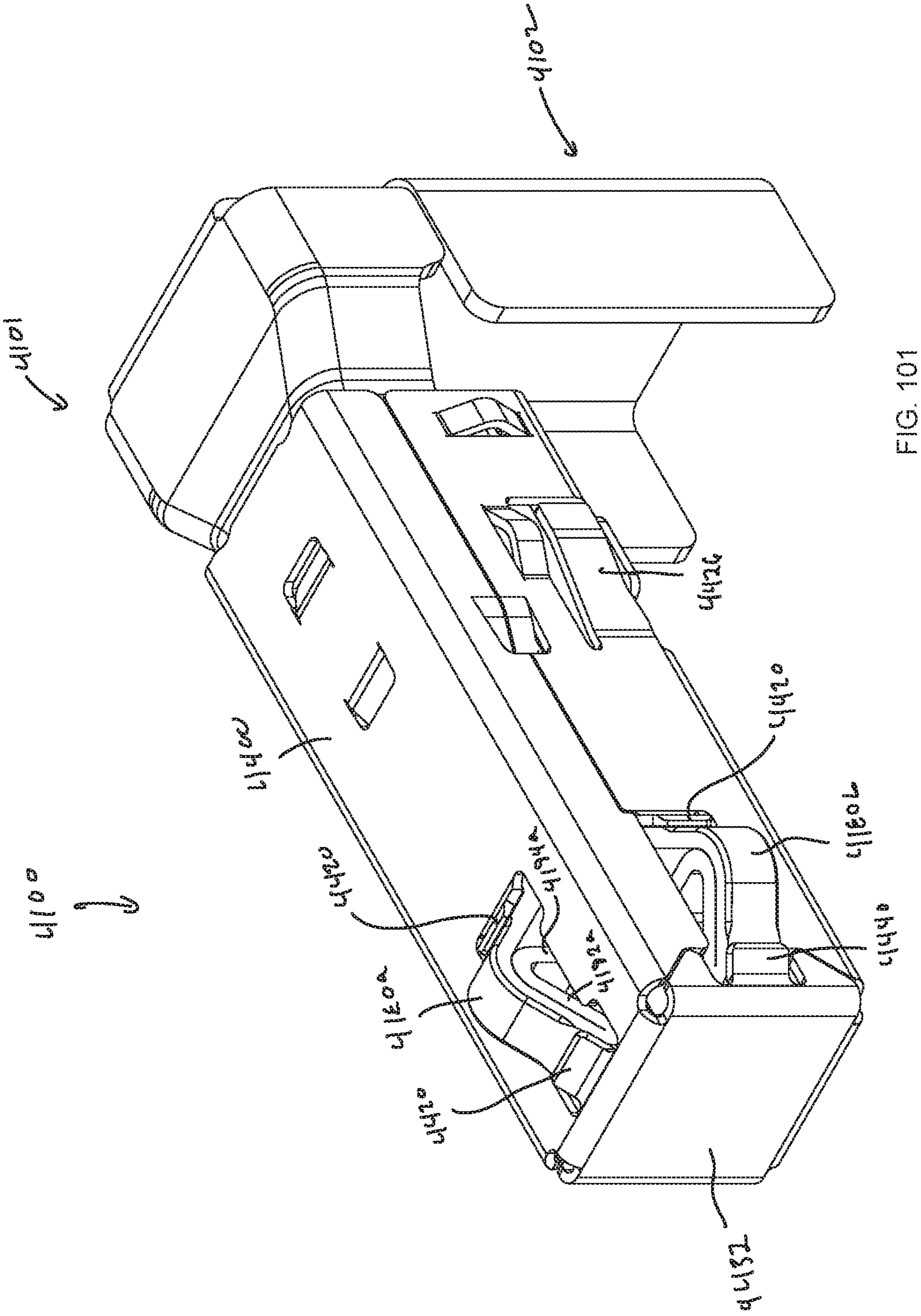
FIG. 101 is a perspective view of a fifth embodiment of a male terminal assembly, showing a male terminal, spring member, and a jacket in a fully assembled state, $S_{FA}$.
Figure 103:
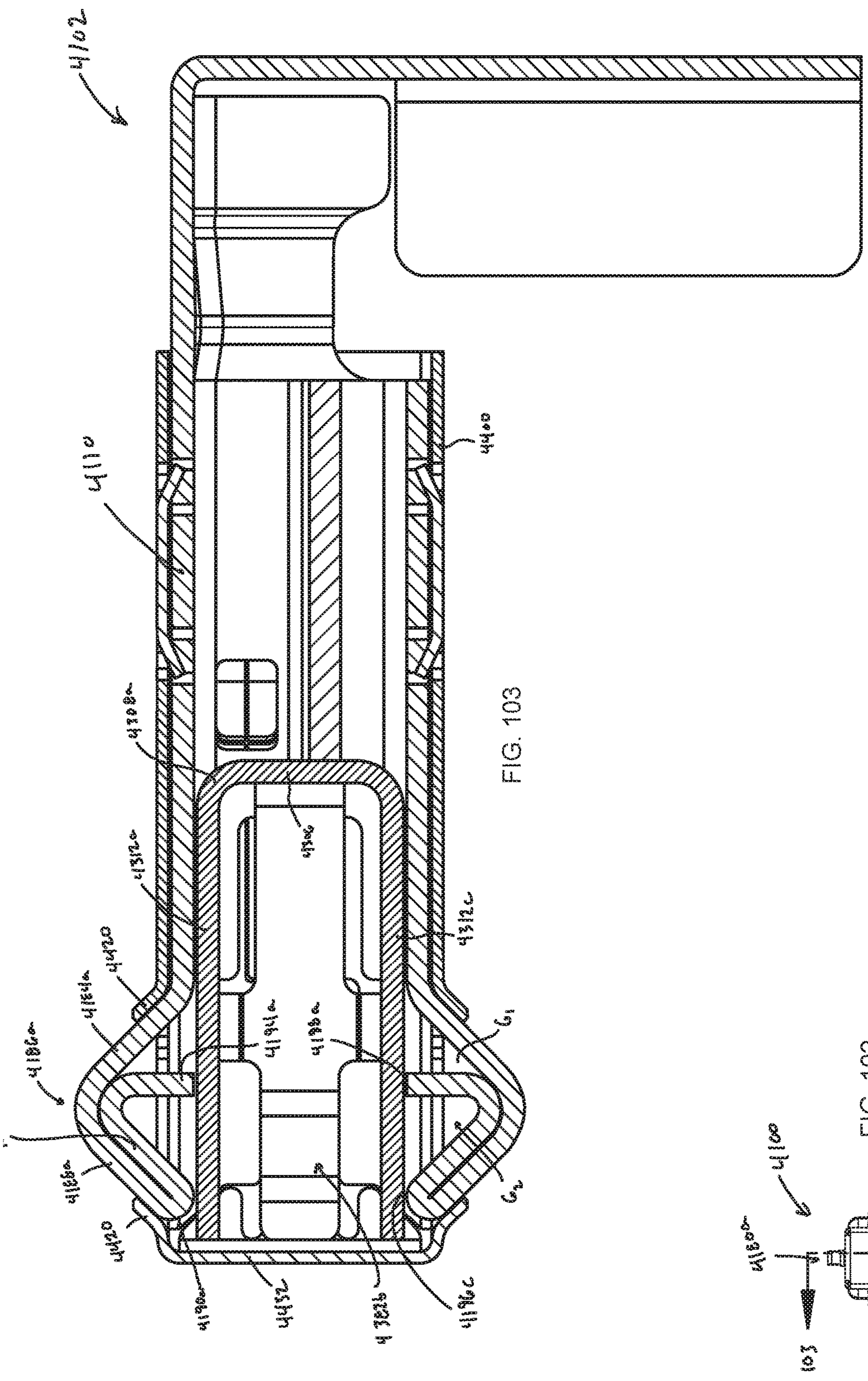
FIG. 103 is a cross-sectional view the male terminal assembly taken along line 103-103 of FIG. 102.
Figure 102:
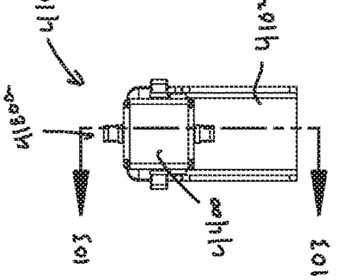
FIG. 102 is a front view of the male terminal assembly of FIG. 101.
Figure 104:
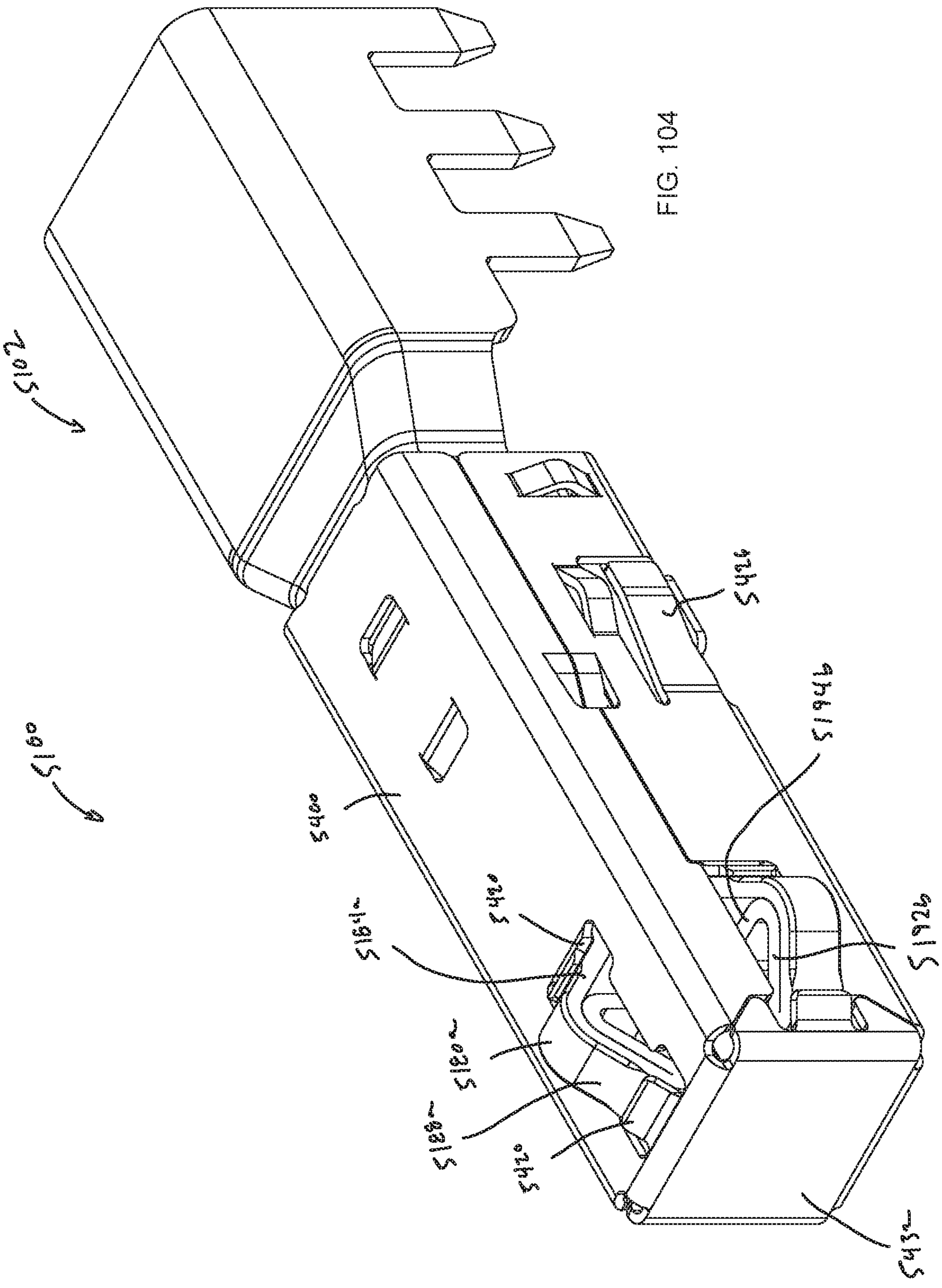
FIG. 104 is a perspective view of a sixth embodiment of a male terminal assembly, showing a male terminal, spring member, and a jacket in a fully assembled state, $S_{FA}$.
Figure 105:
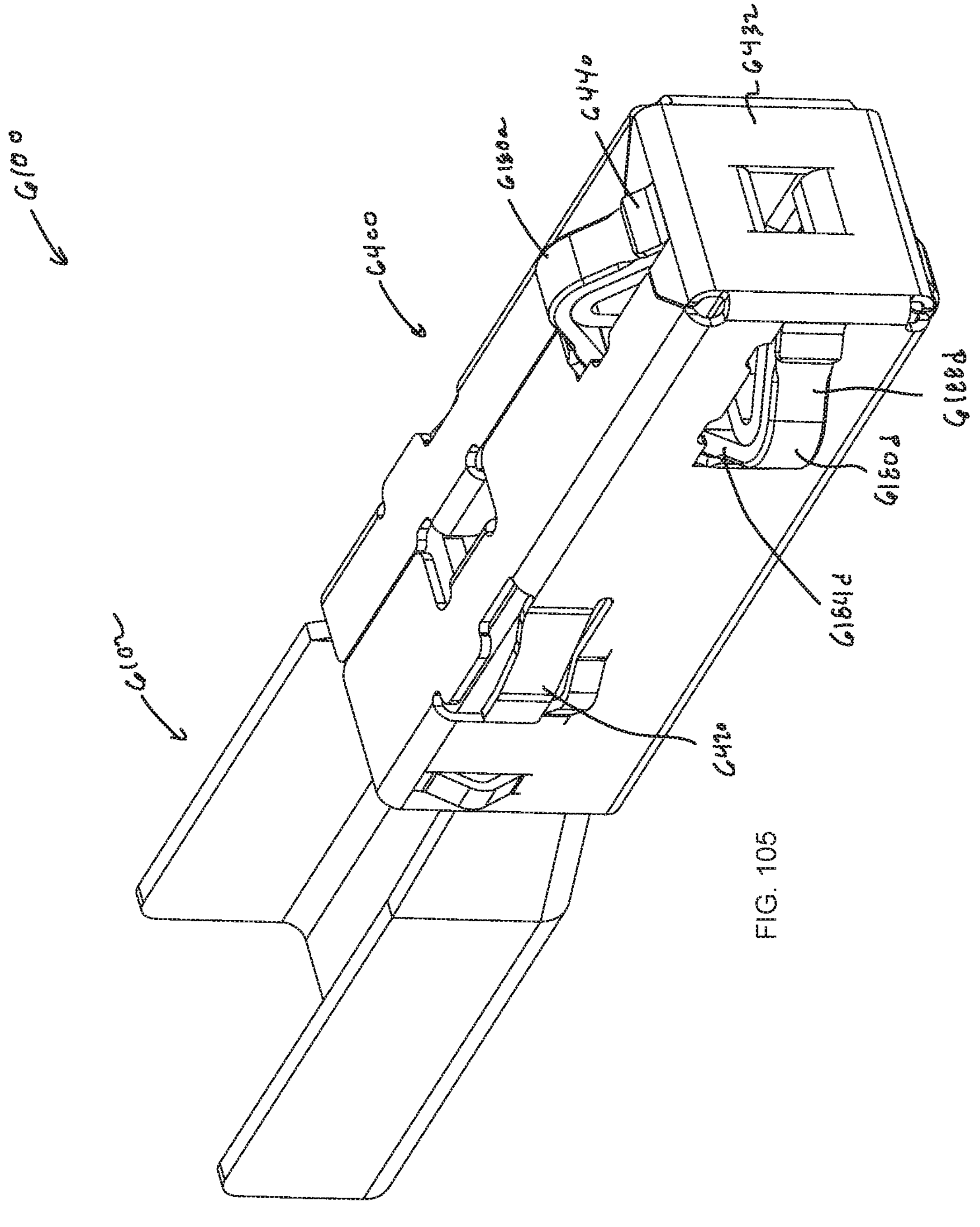
Figure 106:
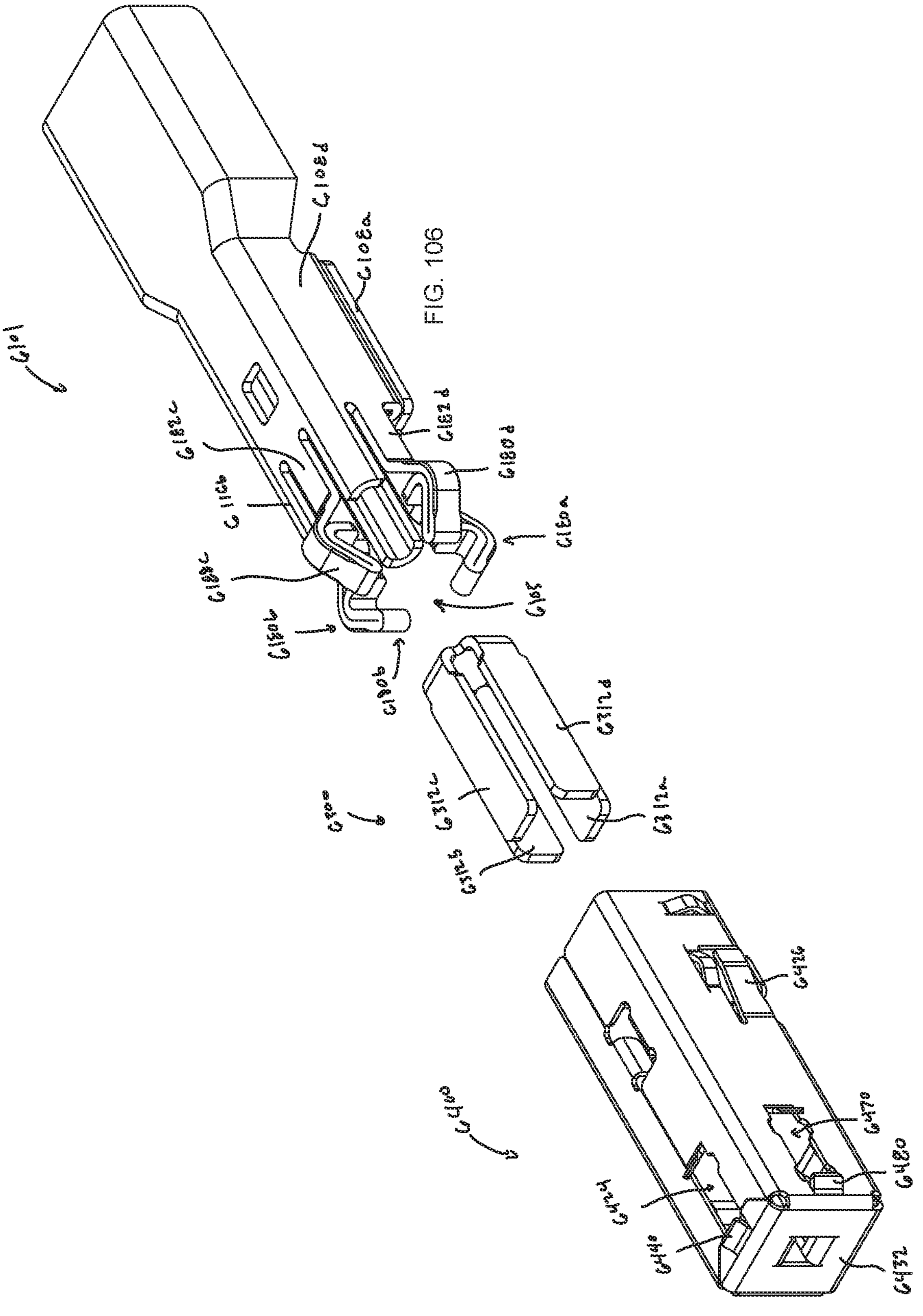

As shown in FIGS. 91 and 94, the frontal spring contact segment 3196*a*-3196*d* and the intermediate spring contact segment 3198*a*-3198*d* of the contact arms 3180*a*-3180*d* are positioned nearly parallel with an inner surface 3181*a*-3181*d* of the initial or rear extent 3182*a*-3182*d* of the contact arm 3180*a*-3180*d*. Referring to FIGS. 94, this configuration provides for (i) a first gap G1 (that is substantially triangular when viewed from the side) to be formed between both the inner surface of the contact arms 3180*a*-3180*d* and the spring member 3300 and between the vertical extent 3194*a* and the rear extent 3182*a* of the contact arm 180*a*, and (ii) a second gap G2 (that is substantially triangular when viewed from the side) to be formed between both the inner surface of the contact arms 3180*a*-3180*d* and the spring member 3300 and between the vertical extent 3194*a* and the fourth extent 3192*a* of the contact arm 3180*a* or the frontal spring contact segment 3196*a*-3196*d*. In this manner, the vertical extent 3194*a* engages the outer spring arm surface 3313*a* at a substantially perpendicular angle, preferably at a perpendicular angle. This configuration is beneficial over the configuration shown in FIGS. 3-8 in PCT/US2018/019787 because the assembler of the male terminal assembly 3100 does not have to apply a significant force in order to deform a majority of the contact arms 3180*a*-3180*d* outward to accept the spring member 3300. This required deformation can best be shown in FIG. 6 of PCT/US2018/019787 based on the configuration of the spring arm 31 and the contact arm 11. The configuration disclosed herein is beneficial because the connector systems 3010 performance does not change over time due to material creep. Or stated another way, the connector system 3010 does not have a limited shelf life because the spring member 3300 is not under constant tension before usage of the system 3010.

Figure 81:
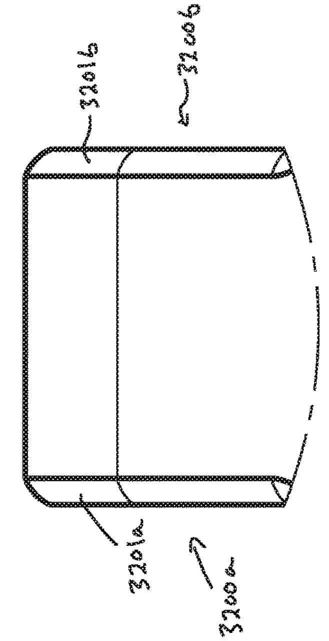
FIG. 81 is a zoomed-in front view of the contact arm of the male terminal of FIG. 76.
Figure 83:
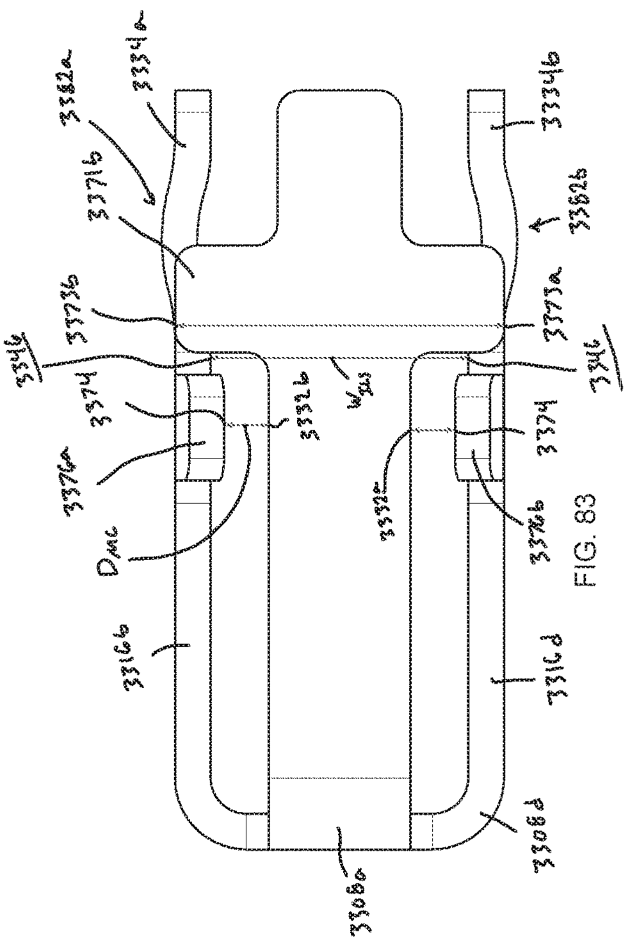
FIG. 83 is a top view of the spring member of FIG. 82.
Figure 82:
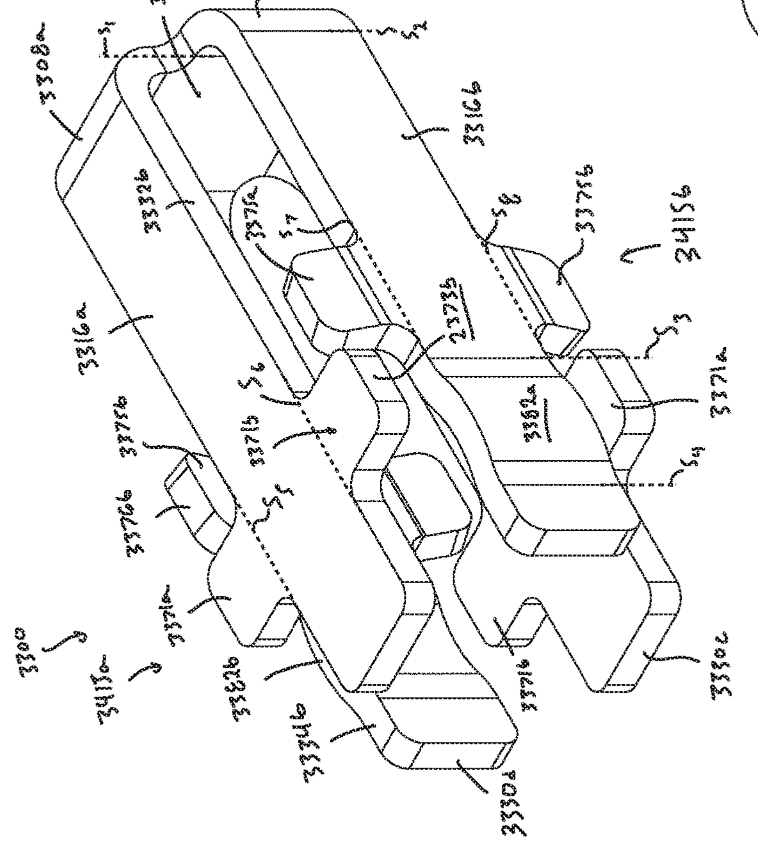
FIG. 82 is a perspective view of the spring member of the male terminal assembly of FIG. 75B.
Figure 84:
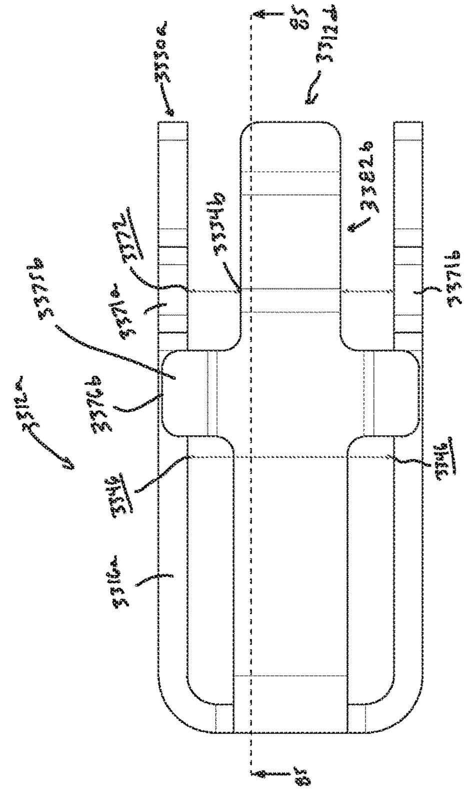
FIG. 84 is a side view of the spring member of FIG. 82.
Figure 85:
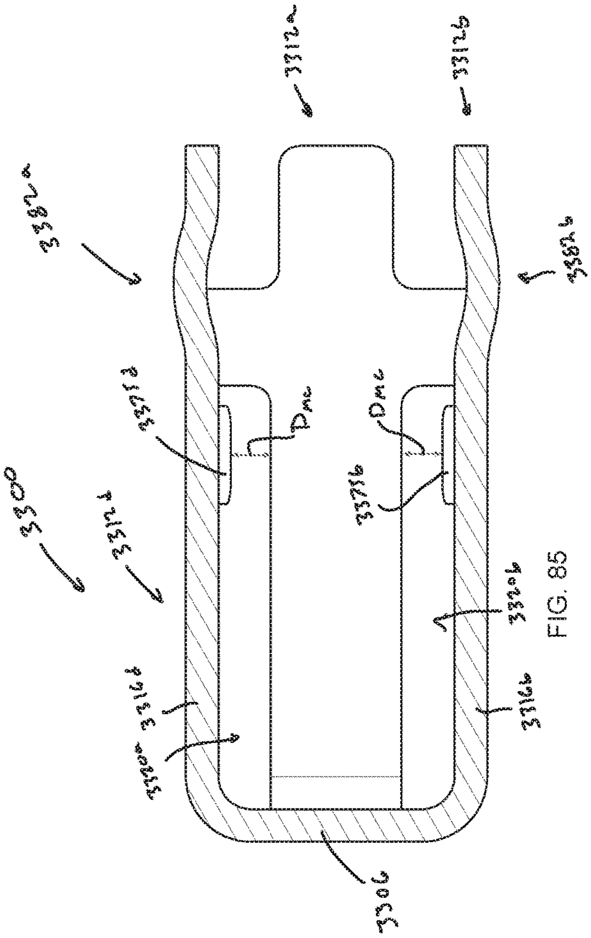
FIG. 85 is a cross-sectional view of the spring member taken along line 85-85 of FIG. 84.
Figure 86:
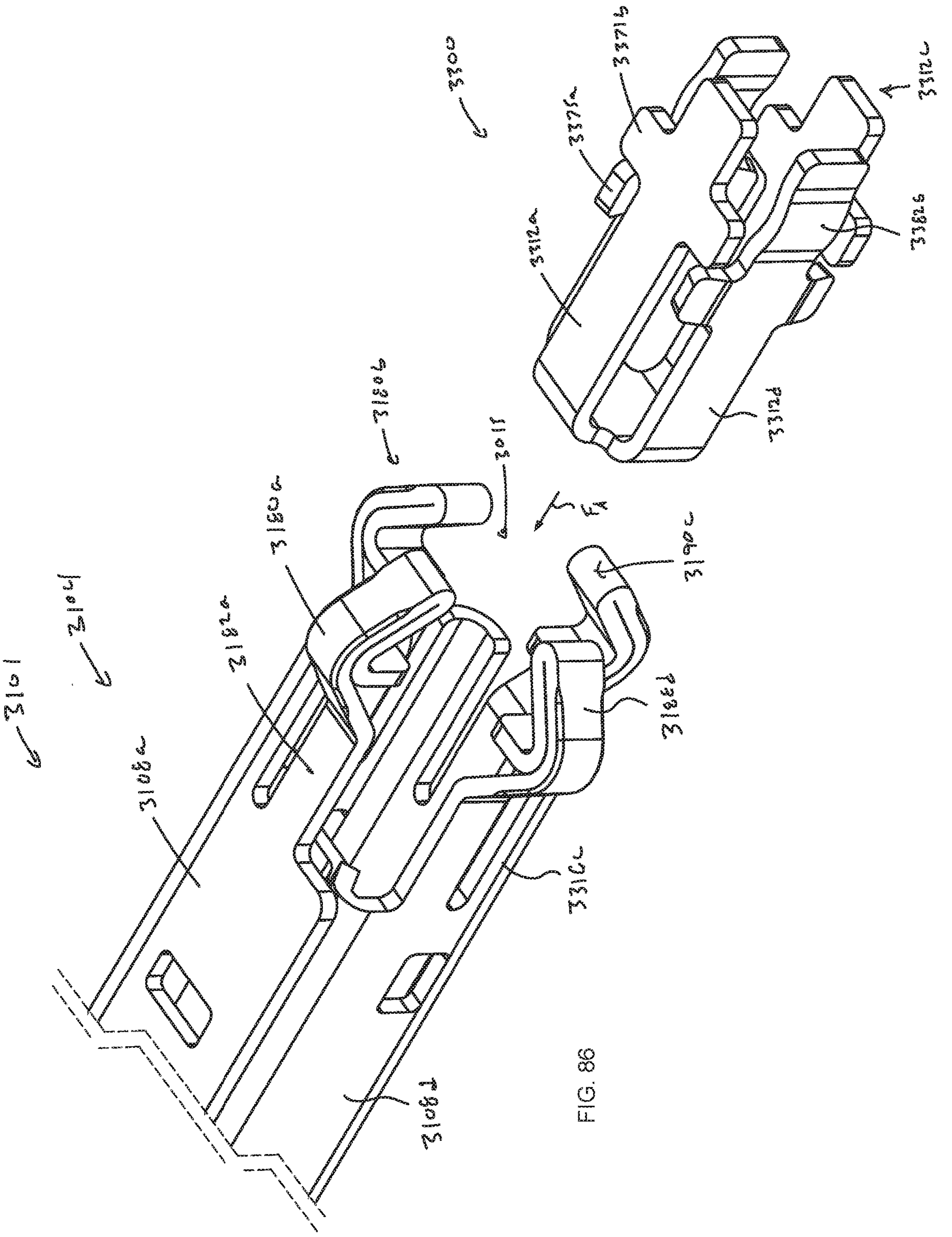
FIG. 86 is a perspective view of the spring member and the male terminal of FIG. 75B in a disassembled state, $S_{DA}$.
Figure 88:
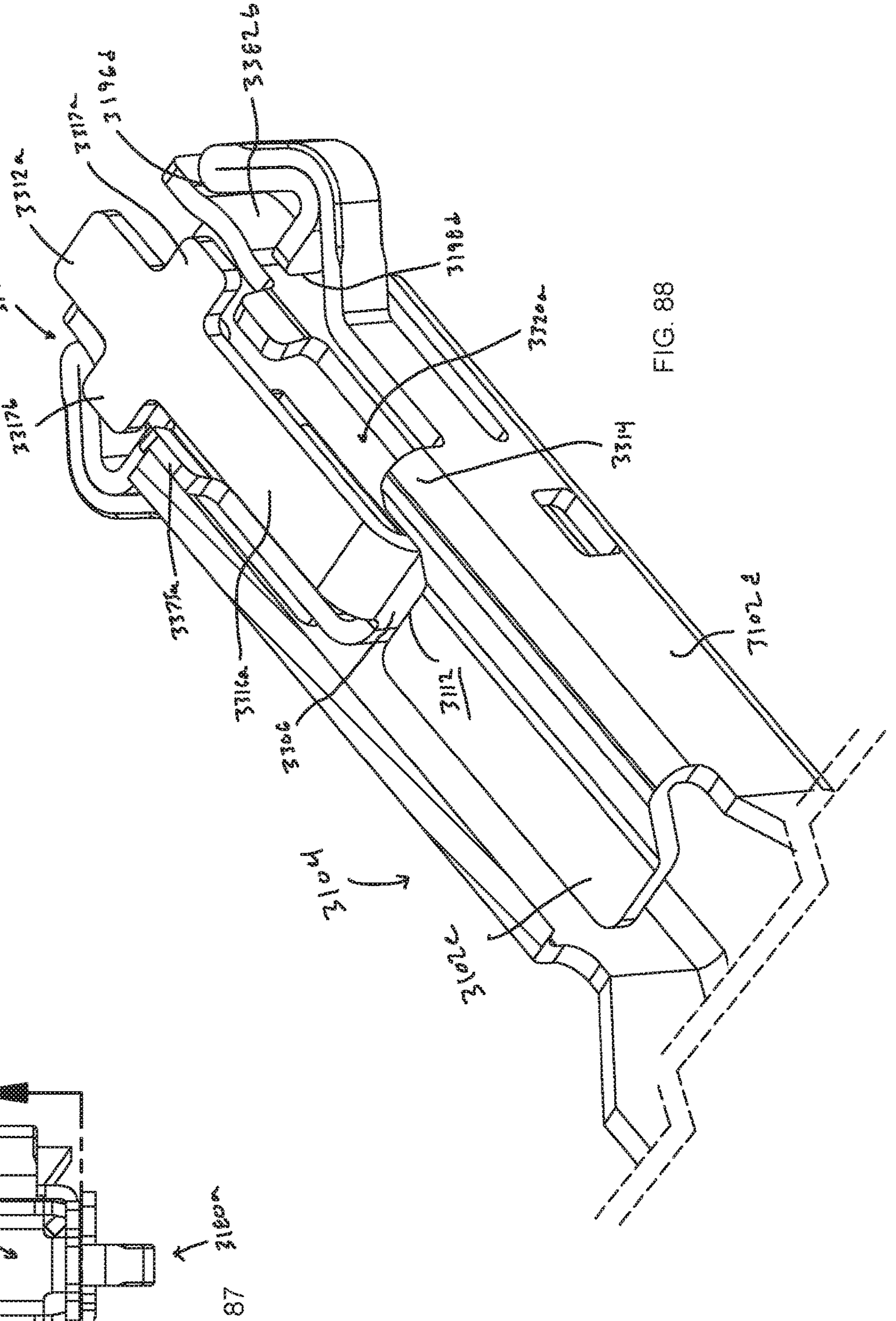
FIG. 88 is a cross-sectional view of the spring member and the male terminal taken along line 88-88 of FIG. 87.
Figure 87:
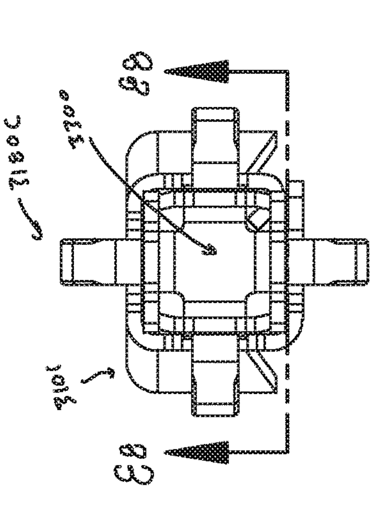
FIG. 87 is a front view of the spring member and the male terminal of FIG. 75B in a first partially assembled state, $S_{1PA}$.
Figure 89:
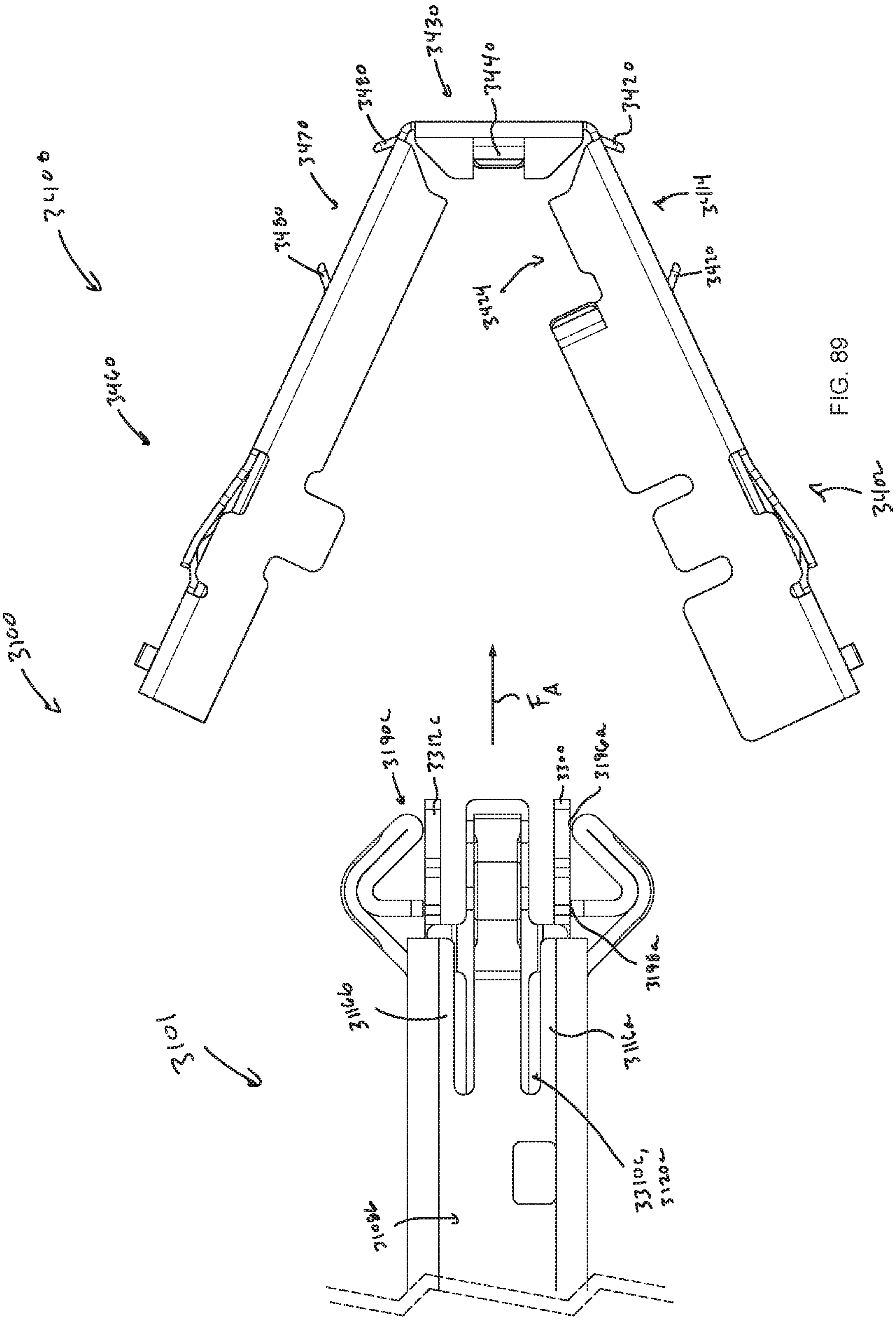
FIG. 89 is a perspective view of the male terminal assembly of FIG. 75B in a second partially assembled state, $S_{2PA}$.
Figure 90:
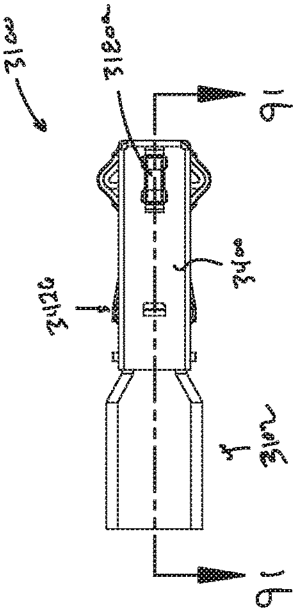
FIG. 90 is a top view of the male terminal assembly of FIG. 75B in a fully assembled state, $S_{FA}$.

As shown in FIG. 81, at least a portion of the outer edges or shoulder regions 3200*a*, 3200*b* of the contact arms 3180*a*-3180*d* are coined, beveled, or rounded. Rounding off the outer edges 3200*a*, 3200*b* causes the outer surface of the contact arms 3180*a*-3180*d*, at least the apex 3186*a*-3186*d*, to match the curvature of the inner surface 704 of the female terminal assembly 700. The coined, beveled or rounded outer edges 3200*a*-3200*b* may: (i) extend along the entire length of the contact arm 3180*a*-3180*d*, (ii) extend along the entire length of the second and third extends 3184*a*-3184*d*, 3188*a*-3188*d* of the contact arms 3180*a*-3180*d*, (iii) extend along a portion (e.g., half of the length) of the second extent 3184*a*-3184*d* of the contact arms 3180*a*-3180*d* and a portion (e.g., half of the length) of the third extent 3188*a*-3188*d* of the contact arms 3180*a*-3180*d*. Without coining, beveling, or rounding the portion of the outer edges 3200*a*, 3200*b* of the contact arms 3180*a*-3180*d*, the edges 3200*a*, 3200*b* of the contact arms 3180*a*-3180*d* will make contact with the inner surface 704 of the female terminal assembly 700 and will prevent the center of the contact arm 3180*a*-3180*d* from making sufficient contact with said female terminal assembly 700 due to the linear vs. curvilinear configurations of the contact arms 3180*a*-3180*d* and female terminal assembly 700. Preventing the center of the contact arm 3180*a*-3180*d* from making proper contact with said female terminal assembly 700 will undesirably reduce the current carrying capacity of the system 3010. Additionally, omission of the coining, beveling, or rounding will likely leave sharp edges on the contact arms 3180*a*-3180*d*, which may cause the contact arms 3180*a*-3180*d* to score or mark the inner surface 704 of the female terminal assembly 700. Said scoring can lead to a reduction of the number of mating cycles the system 10 can achieve without failure because the scoring can scrape off or damage the internal plating and/or surface 704 of the female terminal assembly 700, which may lead to arcing or significant electrical degradation of the system 3010. In other embodiments, the outer edges or shoulder regions 3200*a*, 3200*b* of the contact arms 3180*a*-3180*d* may not be coined, beveled, or rounded; instead, the contact arms 3180*a*-3180*d* may be bent or material may be deposited on said contact arms 3180*a*-3180*d* to allow the outer surface of said contact arms 3180*a*-3180*d* to substantially match the curvature of the inner surface 704 of the female terminal assembly 700.

As shown in FIGS. 76-79 and 88, the contact arms 3180*a*-3180*d* are not connected to any structure other than extending from the base portion 3110. This free-end configuration of the contact arms 3180*a*-3180*d* allows for omnidirectional expansion of said contact arms 3180*a*-3180*d*. Because there is a contact arm opening or void 3280*a*-3280*d* interspersed between each pair of contact arms 3180*a*-3180*d*, there is no supporting wall that surrounds the contact arms 3180*a*-3180*d*. This configuration of the male terminal assembly 3100 is substantially different than the configuration disclosed in connection with the male terminal assembly of PCT/US2019/36010. As discussed in PCT/US2019/36010, the removal of the side wall arrangement that surrounds the contact arms 3180*a*-3180*d* could increase the failure rate of the male terminal assembly 3100 because the side wall arrangement protects said contact arms 3180*a*-3180*d*. However, this increased failure rate is mitigated because the jacket 3400 has been configured to replace the functionality of the supporting wall. The configuration disclosed herein is beneficial because it replaces expensive copper structures with less expensive and more robust structures.

The male terminal 3101 is typically formed from a single piece of material (e.g., metal); thus, the male terminal 3101 is a one-piece male terminal 3101 and has integrally formed features. To integrally form these features, the male terminal 3101 is typically formed using a die-cutting process. However, it should be understood that other types of forming the male terminal 3101 may be utilized, such as casting or using an additive manufacturing process (e.g., 3D printing). In other embodiments, the features of the male terminal 3101 may not be formed from a one-piece or be integrally formed, but instead formed from separate pieces that are welded together. In forming the male terminal 3101, it should be understood that any number (e.g., between 1 and 100) of contact arms 3180*a*-3180*d* may be formed within the male terminal 3101. The male terminal 3101, male terminal body 104, the contact arms 3180*a*-3180*d*, or an extent of the contact arms 3180*a*-3180*d* may be plated or coated with a secondary material (e.g., nickel) to help reduce corrosion, reduce insertion forces, or improve conductivity. Additionally, the contact arms 3180*a*-3180*d* or a portion of the contact arms 3180*a*-3180*d* may have rounded or beveled edges.

b. Spring Member

As best shown in FIGS. 82-86, 88, 93, 98, the spring member 3300 includes an arrangement of spring member side walls 3304*a*-3304*d* and a rear spring wall 3306. Each spring member side wall 3304*a*-3304*d* is comprised of: (i) a first or curvilinear spring section 3308*a*-3308*d*, and (iii) a second section or spring arm 3312*a*-3312*d*. The curvilinear spring section 3308*a*-3308*d* extend between the rear spring wall 3306 and the spring arm 3312*a*-3312*d* and position the spring arm 3312*a*-3312*d* substantially perpendicular to the rear spring wall 3306. In other words, a substantial extent, if not the entity, of the outer surface of the spring arm 3312*a*-3312*d* is substantially perpendicular to the outer surface of the rear spring wall 3306. As shown in FIGS. 12-15, the spring arms 3312*a*-3312*d* extend from the first or curvilinear spring section 3308*a*-3308*d* of the spring member 3300, away from the rear spring wall 3306, and terminate at a free end 3330*a*-*d*. The spring arms 3312*a*-3312*d* are not connected and thus spring arm slits 3310*a*-3310*d* are formed between the spring arms 3312*a*-3312*d* of the spring member 3300. The spring arm slits 3310*a*-3310*d* aid in omnidirectional expansion of the spring arms 3312*a*-3312*d*, facilitating the mechanical coupling between the male terminal assembly 3100 and the female terminal assembly 4100.

Figure 36:
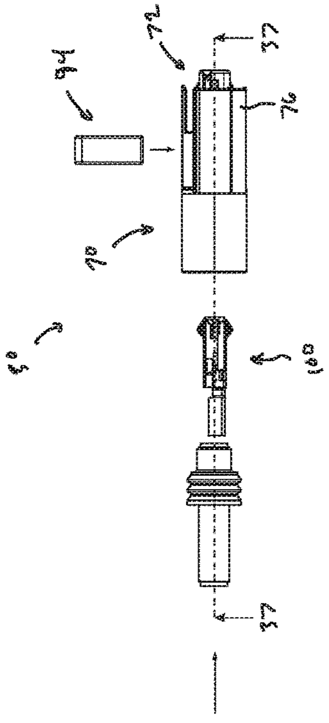
FIG. 36 is a side view of the male connector assembly of FIG. 2 shown in a decoupled state, $S_{DC}$.
Figure 38:
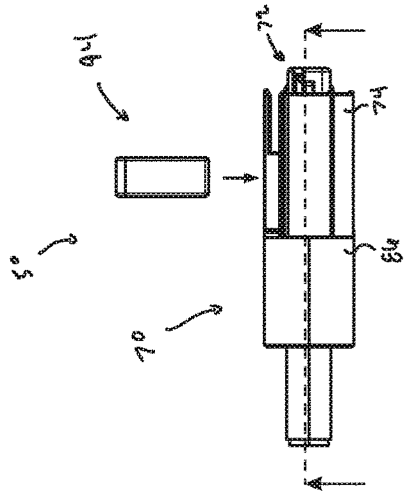
FIG. 38 is a side view of the male connector assembly of FIG. 2 shown in a partially coupled state, $S_{PC}$.
Figure 40:
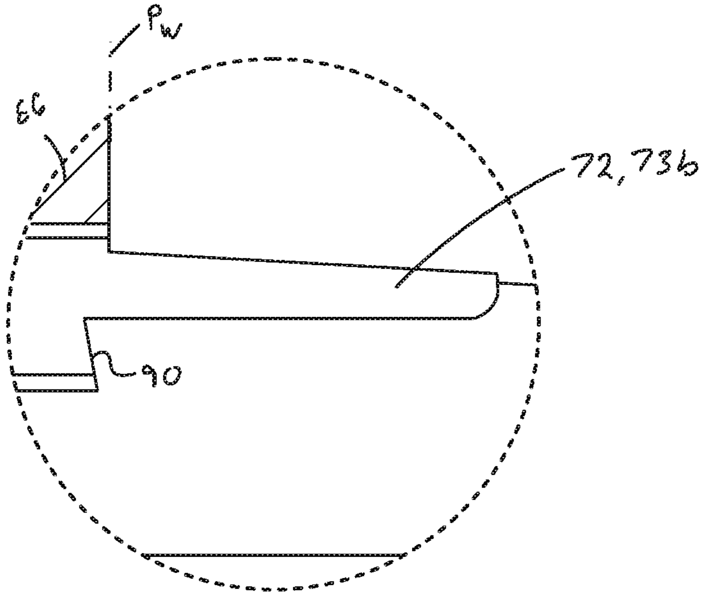
FIG. 40 is a zoomed in view of the male connector assembly shown in the decoupled state $S_{DC}$ of FIG. 37.
Figure 41:
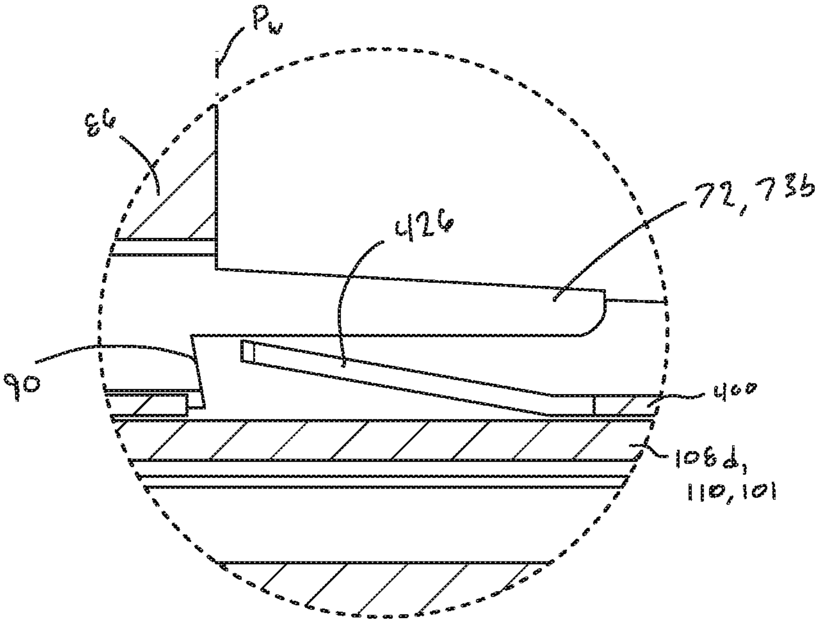
FIG. 41 is a zoomed in view of the male connector assembly shown in the partially coupled state $S_{PC}$ of FIG. 39.
Figure 44:
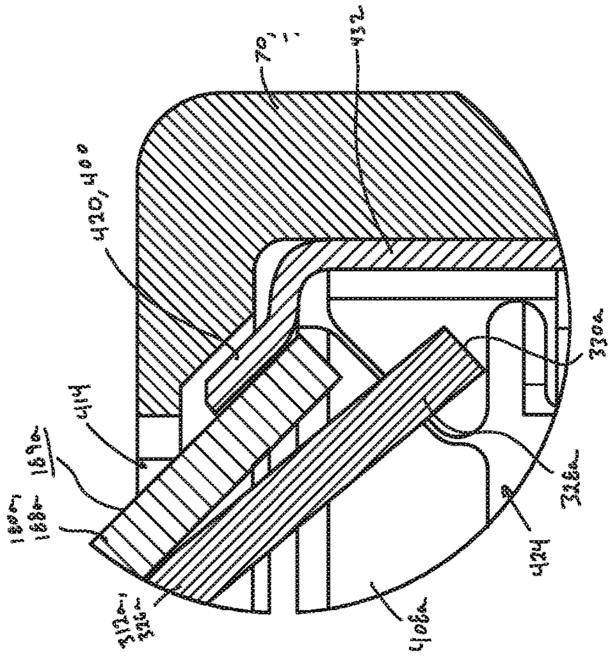
FIG. 44 is a zoomed in view of the male connector assembly shown in FIG. 43.
Figure 42:
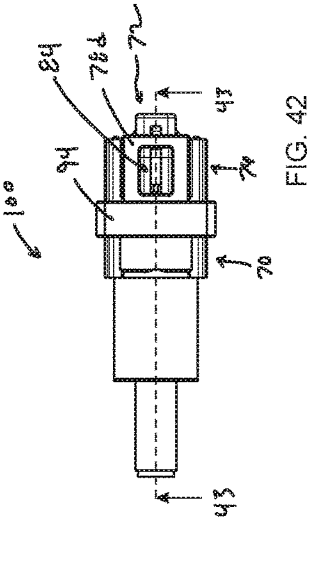
FIG. 42 is a top view of the male connector assembly of FIG. 2 shown in a fully coupled state, $S_{FC}$.
Figure 43:
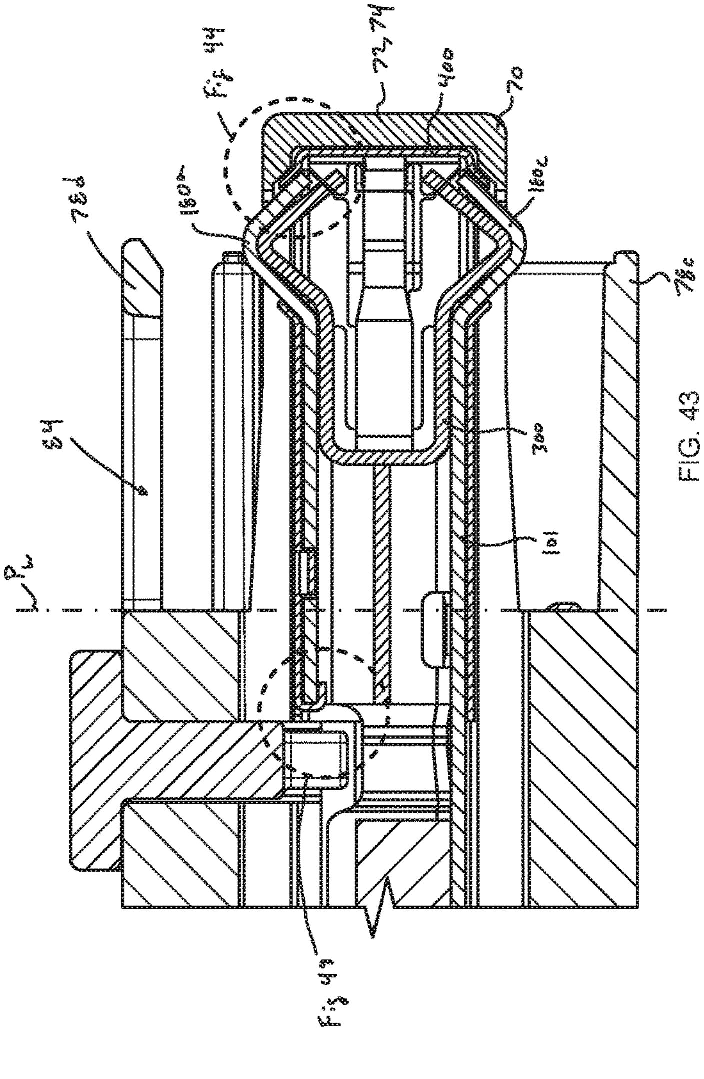
FIG. 43 is a cross-sectional view of the male connector assembly taken along line 43-43 of FIG. 42.
Figure 45:
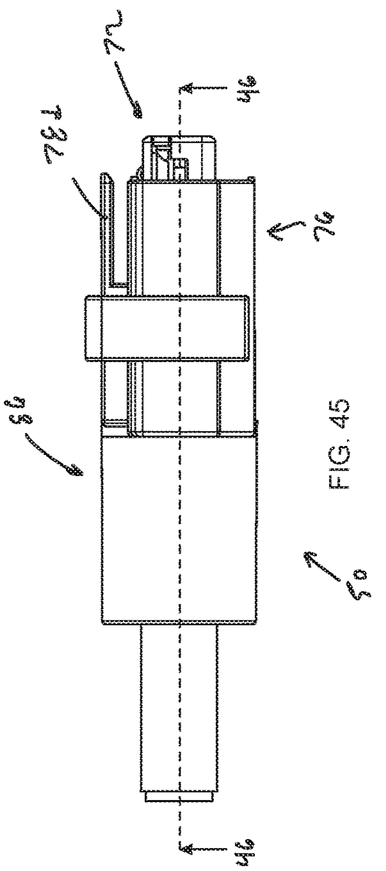
FIG. 45 is a side view of the male connector assembly in the fully coupled state $S_{FC}$ of FIG. 42.
Figure 46:
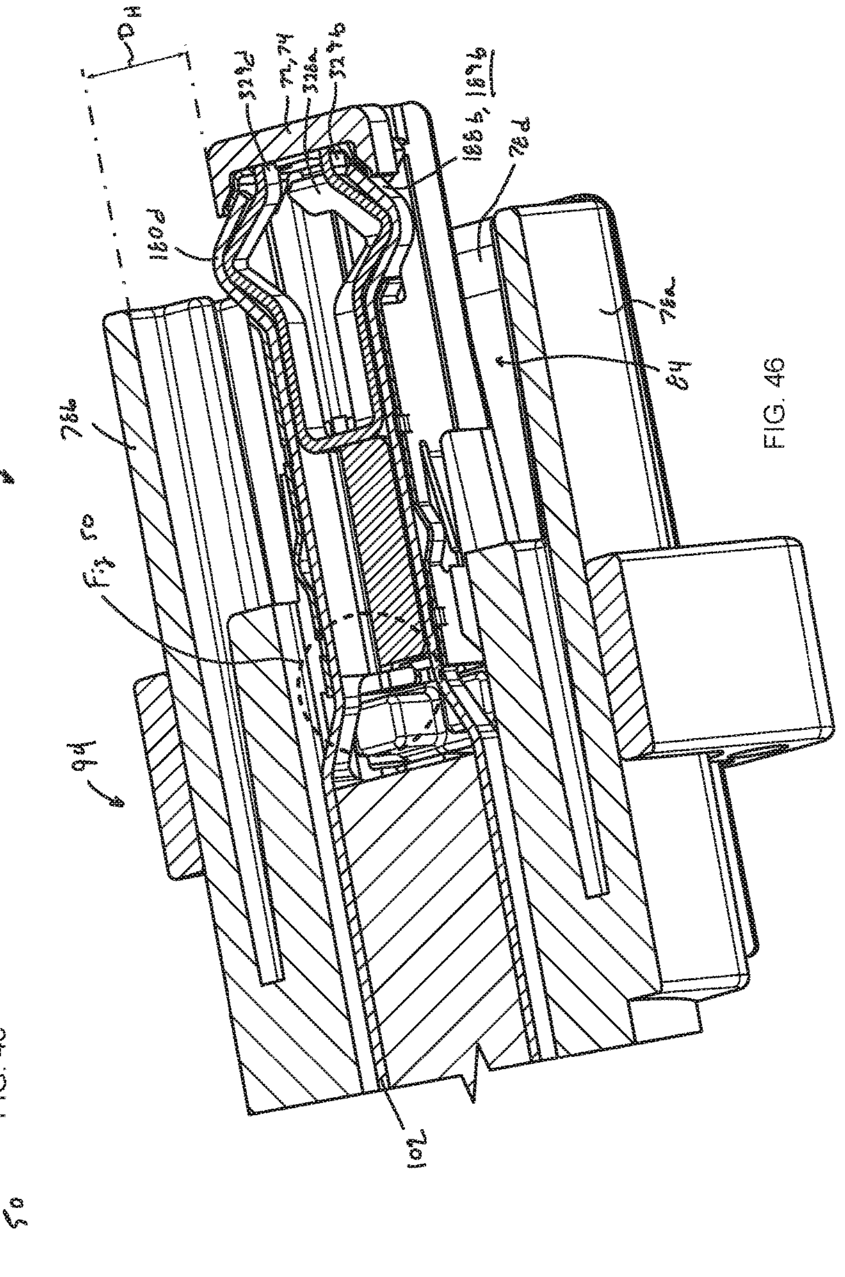
FIG. 46 is a cross-sectional view of the male connector assembly taken along line 46-46 of FIG. 45.
Figure 48:
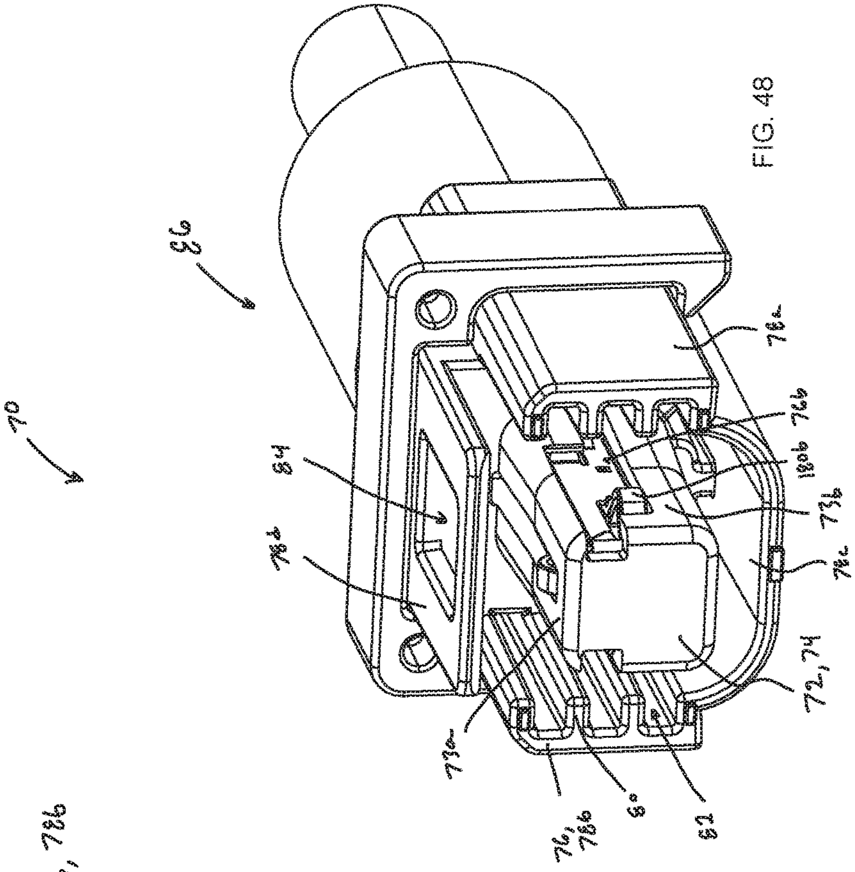
FIG. 48 is a perspective view of the male connector assembly of FIG. 42.
Figure 47:
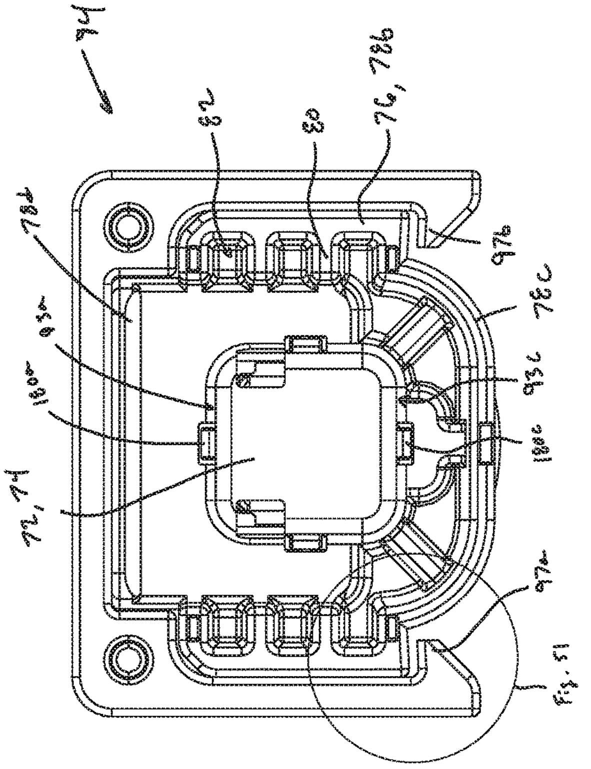
FIG. 47 is a front view of the male connector assembly in the fully coupled state $S_{FC}$ of FIG. 42.
Figure 50:
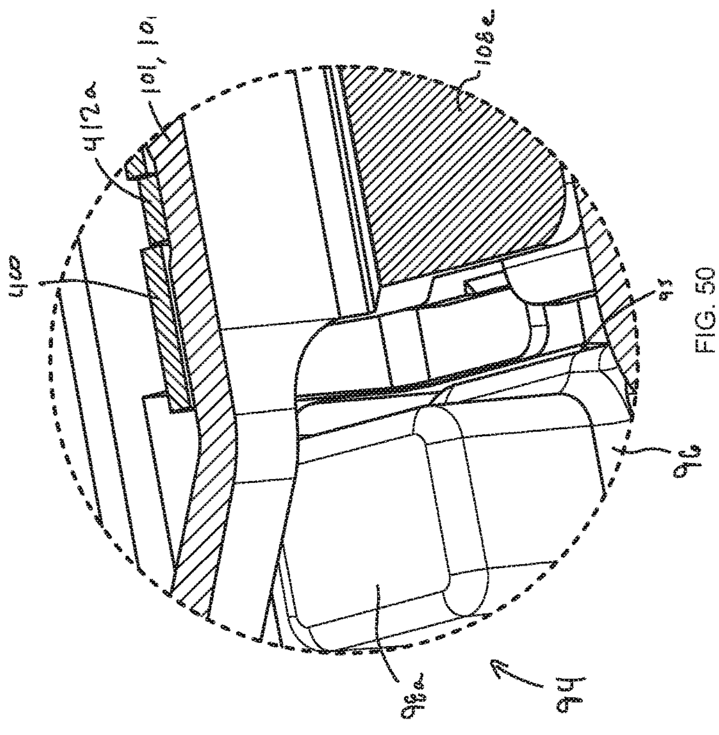
FIG. 50 is a zoomed in view of the first portion of the male terminal retaining means of FIG. 49.
Figure 51:
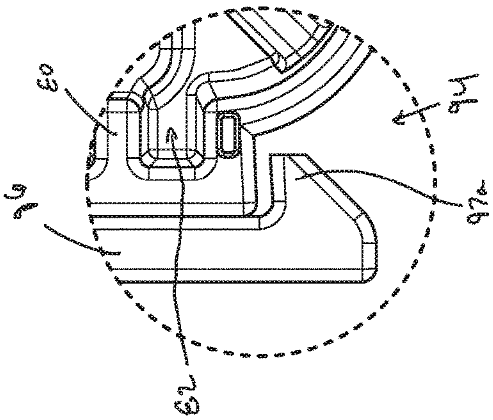
FIG. 51 is a zoomed in view of a second portion of the male terminal retaining means of FIG. 49.
Figure 49:
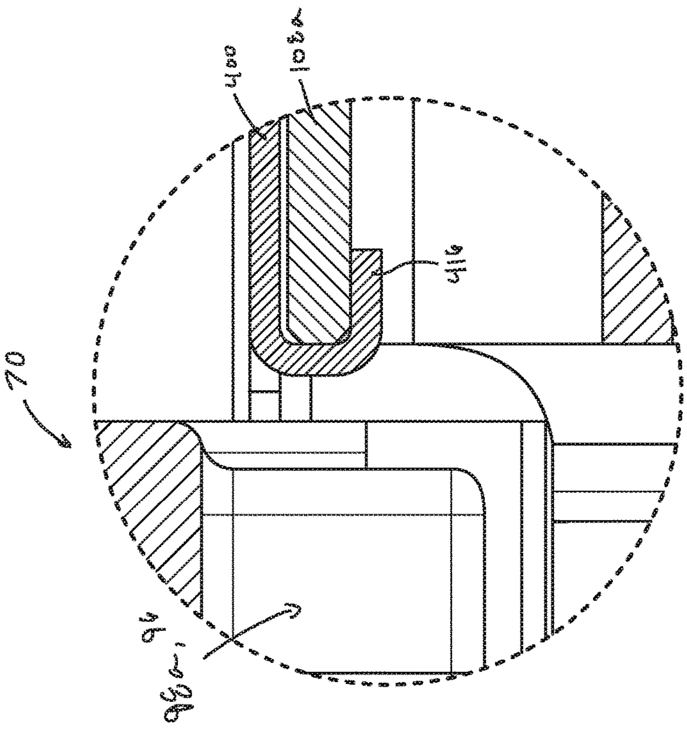
FIG. 49 is a zoomed in view of the first portion of the jacket coupling means and a first portion of a male terminal retaining means in the fully coupled state $S_{FC}$ of FIG. 43.
Figure 53:
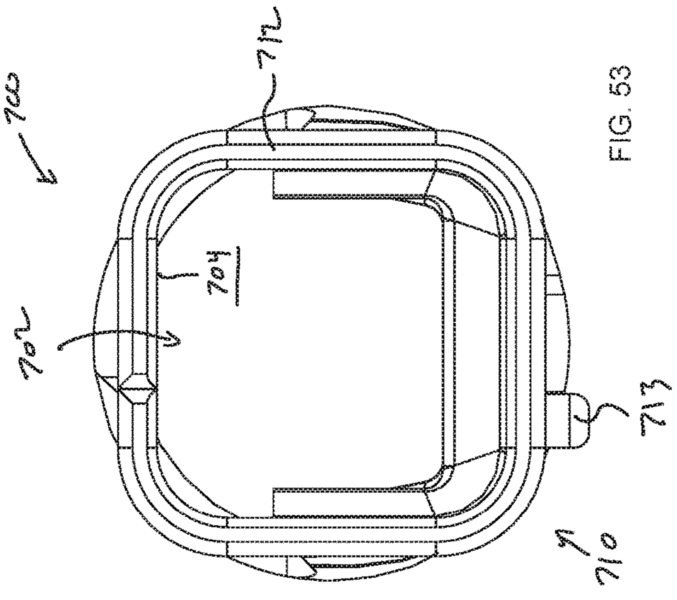
FIG. 53 is a front view of the female terminal assembly of FIG. 52.
Figure 52:
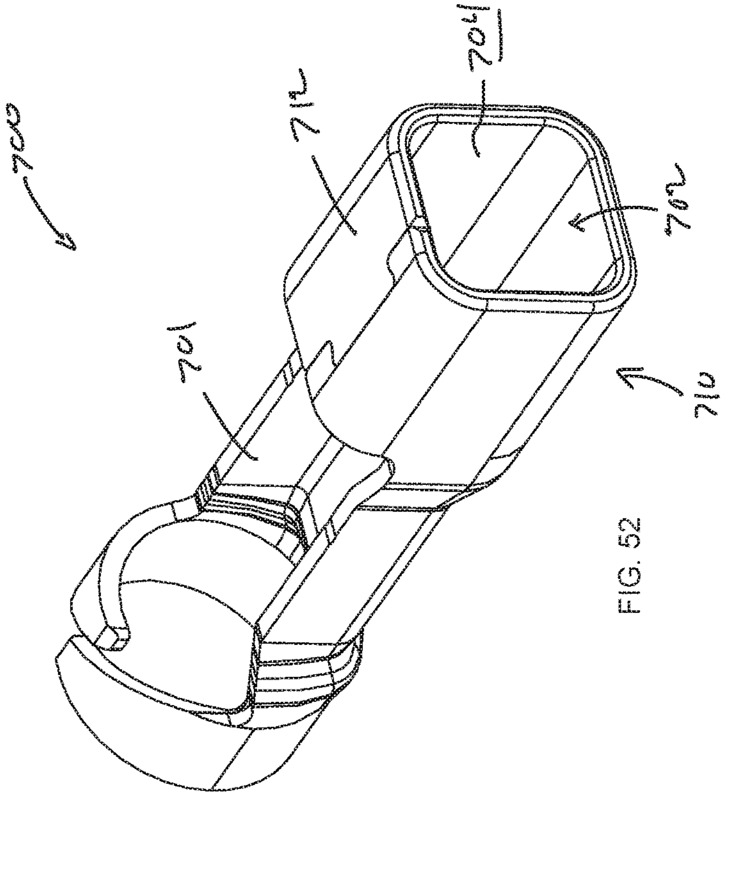
FIG. 52 is a perspective view of the female terminal assembly of FIG. 2.
Figure 54:
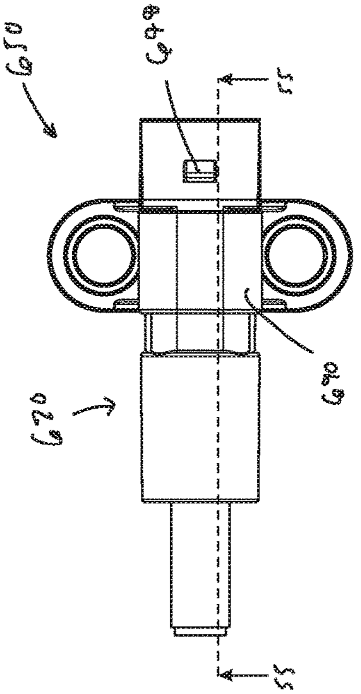
FIG. 54 is a top view of the female connector assembly of FIG. 1B.
Figure 55:
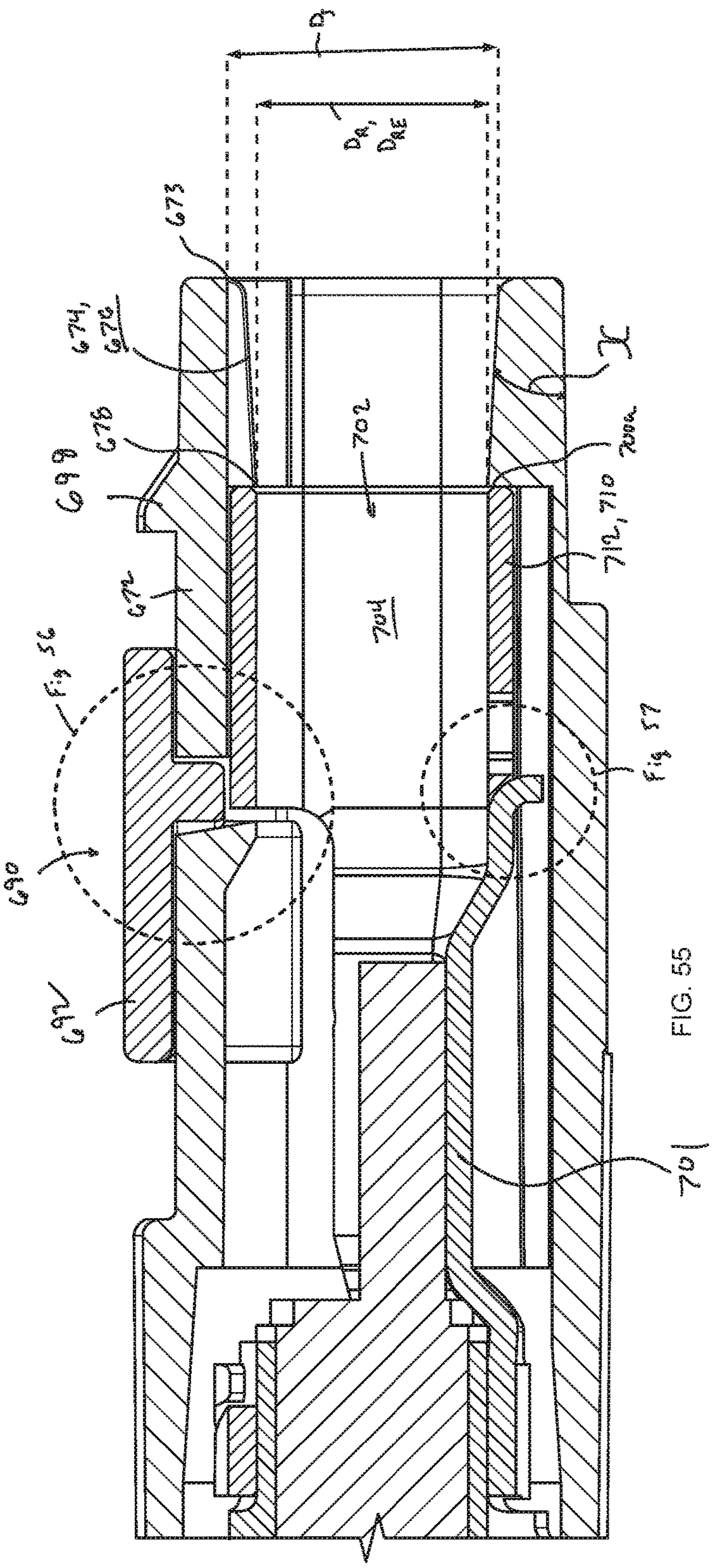
FIG. 55 is a cross-sectional view of the female connector assembly taken along line 55-55 of FIG. 54.
Figure 59:
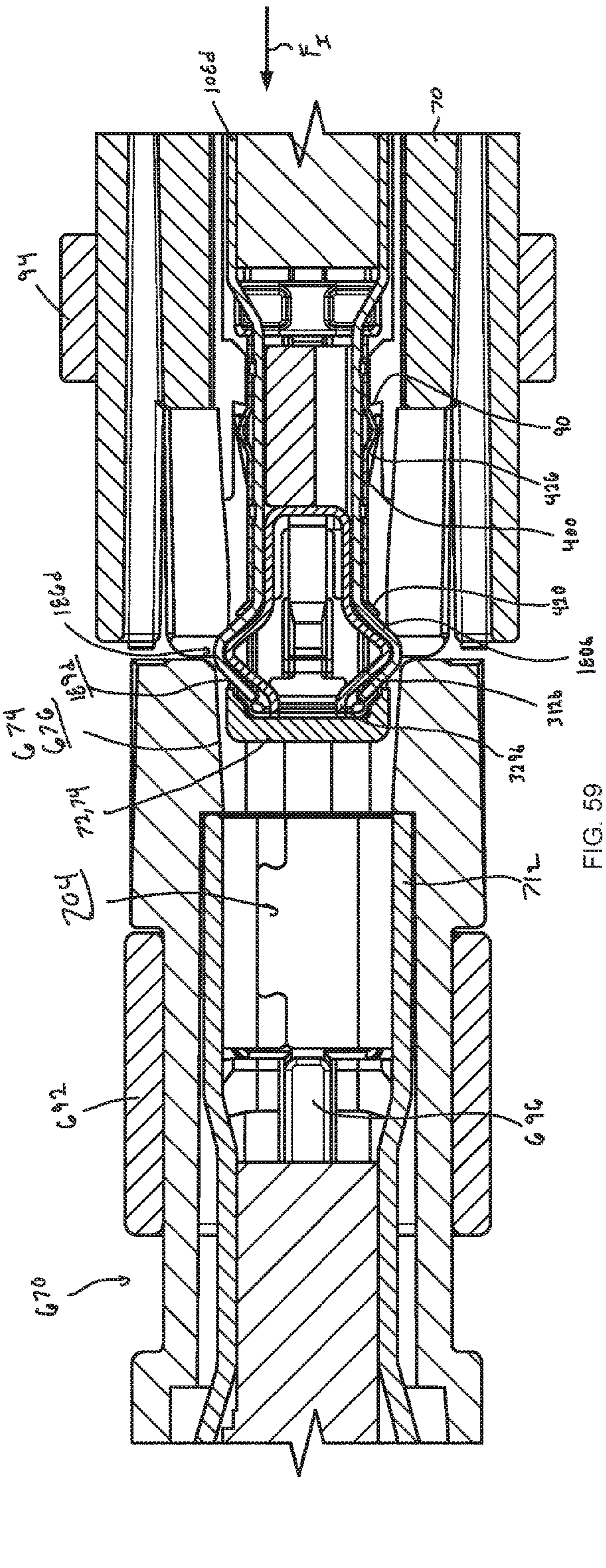
FIG. 59 is a cross-sectional view of the connector system taken along line 59-59 of FIG. 58.
Figure 58:
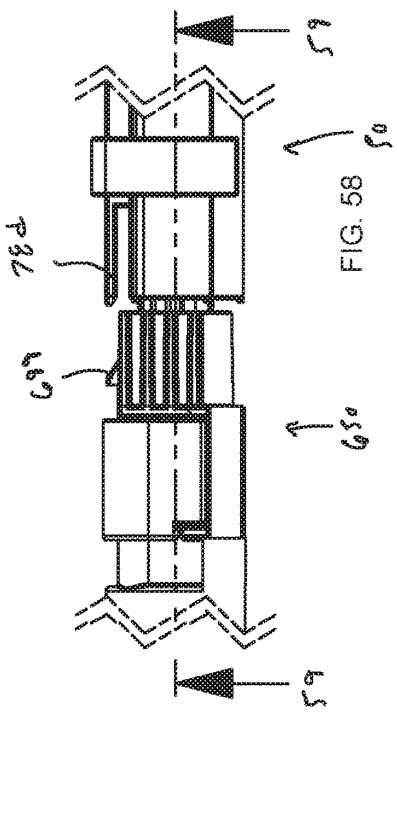
FIG. 58 is a side view of the connector system of FIGS. 1A and 1B shown in a partially connected state $S_{PC}$.
Figure 60:
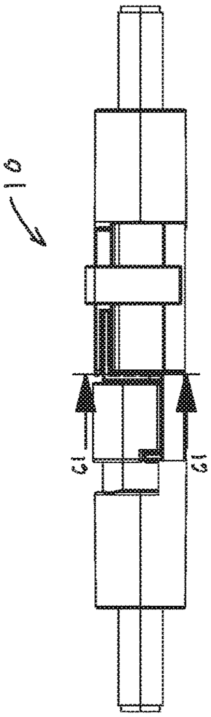
FIG. 60 is a side view of the connector system of FIGS. 1A and 1B shown in a connected state $S_C$.

The spring member 3300 disclosed in this embodiment includes a centering means 3380. Said disclosed centering means 3380 does not rely on outwardly extending lateral projection, but; instead, relies on corrugations 3382*a*-3382*b* formed in at least one and preferable two opposed spring arms 3312*b*, 3312*d*. As best shown in FIG. 36, the corrugations 3382*a*-3382*b* are positioned near the free end 3330*b*, 3330*d* and extends between line $S_3$ and line $S_4$. Said corrugations 3382*a*-3382*b* are designed to fit between the frontal spring contact segment 3196*b*, 3196*d* and the intermediate spring contact segment 3198*a*-3198*d* of the contact arms 3180*b*, 3180*d*. By positioning the corrugations 3382*a*-3382*b* between the contact end segments 3196*a*-3196*d*, 3198*a*-3198*d*, movement of the spring member 3300 is reduced. Reducing said movement of the spring member 3300 is desired because it helps ensure consistent and reliable performance of the system 3010.

The spring member 3300 disclosed in this embodiment replaces prior versions of the means for limiting compression 314, 1314, 2134 with structures that are fully integrated into the spring member 3300. Said means for limiting compression 3314 can best be seen in FIGS. 82-86, Here, said means for limiting compression 3314 is formed from a combination of the compression tabs 3370 and edges 3332*a*-2332*b*, 3334*a*-3334*b* of adjacent spring arms 3312*a*-3312*d*. Said compression tabs 3370 include: (i) lateral projections 3371*a*-3371*b* that extend outward from the linear extents 3316*b*, 3316*d* (line $S_5$, $S_6$) and terminate at external surfaces 3373*a*-3373*b*, and (ii) substantially vertical wings 3375*a*-3375*b* that extend outward from the linear extents 3316*b*, 3316*d* (line $S_7$, $S_8$) and terminate at external surfaces 3376*a*-3376*b*. Here, the lateral projections 3371*a*-3371*b* are: (i) positioned forward of the substantially vertical wings 3375*a*-3375*b*, and (ii) positioned above/below an extent of the centering means 3380 (e.g., corrugations 3382*a*-3382*b*). In other words, the means for limiting compression 3314 in this embodiment includes: (i) a first combination of limiting structures 3315*a*, namely—lateral projections 3371*a*-3371*b* and edges 3334*a*-3334*b* of the adjacent side spring arms 3312*b*, 3312*d*, and (ii) a second combination of limiting structures 3315*b*, namely—substantially vertical wings 3375*a*-3375*b* and edges 3332*a*-3332*b* of the adjacent side spring arms 3312*a*, 3312*c*.

The external surfaces 3373*a*-3373*b* of the lateral projections 3371*a*-3371*b* are positioned outside of or beyond the inner surfaces 3346 of opposed corrugations 3382*a*-3382*b*. In other words, the length between the external surfaces 3373*a*-3373*b* of the lateral projections 3371*a*-3371*b* is greater than the inner linear surface width $W_{ILS}$, which extends between the inner surfaces 3346 of opposed corrugations 3382*a*-3382*b*. The application of an external force $F_E$ on the contact arms 3180*a*, 3180*c* can only deform the contact arms 3180*a*, 3180*c*, the max compression distance $D_{MC}$ because an inner surface 3372 of the lateral projections 3371*a*-3371*b* contacts the forward spring arm edges 3334*a*, 3334*b* of the side spring arms 3312*b*, 3312*d*. In this embodiment the max compression distance $D_{MC}$ is less than 1.25 mm, preferably less than 1.0 mm, and most preferably 0.85 mm. Limiting the extent the contact arms 3180*a*, 3180*c* can be deformed or depressed to the max compression distance $D_{MC}$ prevents the contact arms 3180*a*, 3180*c*, spring arms 3312*a*, 3312*c*, and a combination thereof helps prevent said arms 3180*a*, 3180*c* from being overly deformed or depressed (e.g., a distance that is greater than the max compression distance $D_{MC}$) toward the center of the connector 3050.

The external surfaces 3376*a*-3376*b* of the substantially vertical wings 3375*a*-3375*b* are positioned outside of or beyond the inner surfaces 3346 of opposed linear extents 3316*a*, 3316*c*. In other words, the length between the external surfaces 3376*a*-3376*b* of the substantially vertical wings 3375*a*-3375*b* is greater than the inner linear surface width $W_{ILS}$, which extends between the inner surfaces 3346 of opposed linear extents 3316*a*, 3316*c*. The application of an external force $F_E$ on the contact arms 3180*b*, 3180*d* can only deform the contact arms 3180*b*, 3180*d*, the max compression distance $D_{MC}$ because an inner surface 3374 of the substantially vertical wings 3375*a*-3375*b* contacts the linear extent edges 3332*a*, 3332*b* of the top and bottom spring arms 3312*a*, 3312*c* (specifically, the edges of the linear extents 3316*a*, 3316*b* of the side spring arms 3312*b*, 3312*d*). In this embodiment the max compression distance $D_{MC}$ is less than 1.25 mm, preferably less than 1.0 mm, and most preferably 0.85 mm. Limiting the extent the contact arms 3180*b*, 3180*d* can be deformed or depressed to the max compression distance $D_{MC}$ prevents the contact arms 3180*b*, 3180*d*, spring arms 3312*b*, 3312*d*, and a combination thereof helps prevent said arms 3180*b*, 3180*d* from being overly deformed or depressed (e.g., a distance that is greater than the max compression distance $D_{MC}$) toward the center of the connector 3050.

The spring arms 3312*a*-3312*d* are generally planar and are positioned substantially perpendicular to the outer surface of the rear wall 3306. This configuration is beneficial over the previously disclosed spring arms that extend outward at an angle because insertion force calculations are simplified, size of the terminal assembly 3100 is reduced, centering of the spring member is more reliable, and other benefits that may be obvious to one of skill in the art based on this disclosure. Unlike the spring arm 31 that is disclosed within FIGS. 4-8 of PCT/US2018/019787, the free end 3330*a*-3330*d* of the spring arms 3312*a*-3312*d* do not have a curvilinear end component. But for the small corrugations 3382*a*-3382*b*, the spring arms 3312*a*-3312*d* have a substantially planar outer surface. This configuration is beneficial because it ensures that the forces associated with the spring 3300 are applied substantially perpendicular to the ends of the male terminal body 3104. In contrast, the curvilinear components of the spring arm 31 disclosed within FIGS. 4-8 of PCT/US2018/019787 do not apply a force in this manner.

In an alternative embodiment that is not shown, the spring member 3300 may include recesses and associated strengthening ribs. As discussed in PCT/US2019/036010, these changes to the configuration of the spring member 3300 alter the forces that are associated with the spring 3300. In particular, the spring biasing force SBF is the amount of force applied by the spring member 3300 to resist the inward deflection of the free end of the spring member 3300 when the male terminal assembly 3100 is inserted within the female terminal assembly 700. Specifically, this inward deflection occurs during the insertion of the male terminal assembly 3100 because an extent of the outer surface of the male terminal body 3104 is slightly larger than the interior of the female receptacle 704. Thus, when the male terminal assembly 3100 is inserted into the female terminal assembly 2430, the extent of the outer surface is forced towards the center of the male terminal 3101. This inward force on the outer surface displaces the free end 3330*a*-3330*d* of the spring member 3300 inward (i.e., towards the center). The spring member 3300 resists this inward displacement by providing a wedging effect or spring biasing force SF. In other embodiments, the spring arms 3312*a*-3312*d* may be coupled to other structures to restrict their omnidirectional expansion or compression. The number and width of individual spring arms 3312*a*-3312*d* and openings may vary. In addition, the width of the individual spring arms 3312*a*-3312*d* is typically equal to one another; however, in other embodiments, one of the spring arms 3312*a*-3312*d* may be wider than other spring arms.

2) Alternate Embodiments of the Male Connector Assembly

FIGS. 101-104 show third and fourth embodiments of the male terminal connection member 4102, 5102 that may be used instead of the male terminal connection members 102, 1102, 2102, 3102, or 6102 shown and described herein. Because a substantial majority of the structures contacted in these embodiments of the system 4010, 5010 are similar to the structures contacted the fourth embodiment of the system 3010, it should be understood that reference numbers that are shown in the figures may be omitted from the specification for sake of brevity as like structures have like numbers. For example, the disclosure in connection with male terminal 3101 is not repeated herein, but it applies to male terminal 4101, 5101, as if it were repeated herein. In other words, omitting reference numbers from the specification or specific disclosure of the functionality of that structure should not limit the disclosure of this application. Instead, one shall refer to the disclosure of similar structures that may be discussed within another section of this application or other applications incorporated herein by reference. In this embodiment, the male terminal connection member 3102 was replaced with the male terminal connection members 4102, 5102.

Seventh Embodiment

FIGS. 106-112 show a seventh embodiment of the male terminal assembly 6100 that includes a racket 6400 and a spring member 6300 that may be used instead of the jacket 3101 and a spring member 3300 shown and described above. Because a substantial majority of the structures contacted in this embodiment of the system 6010 are similar to the fourth embodiment of the system 3010, it should be understood that reference numbers that are shown in the figures may be omitted from the specification for sake of brevity as like structures have like numbers. For example, the disclosure in connection with male terminal 101 is not repeated herein, but it applies to male terminal 6101, as if it were repeated herein. In other words, omitting reference numbers from the specification or specific disclosure of the functionality of that structure should not limit the disclosure of this application. Instead, one shall refer to the disclosure of similar structures that may be discussed within another section of this application or other applications incorporated herein by reference. Like the fourth embodiment, this seventh embodiment of the male connector assembly 6050 includes multiple components designed to be coupled to a separate device or component (e.g., charge coupler 2, radiator fan, heated seat, power distribution component, or another current drawing component). The male connector assembly 6050 is primarily composed of: (i) a male housing assembly 6070, and (ii) a male terminal assembly 6100 with a male terminal 6101, a spring member 6300, and a jacket 6400, wherein during operation of the connector system 6010 at least a substantial extent of the male terminal assembly 6100 resides within the male housing assembly.

1) Spring Member

Figure 108:
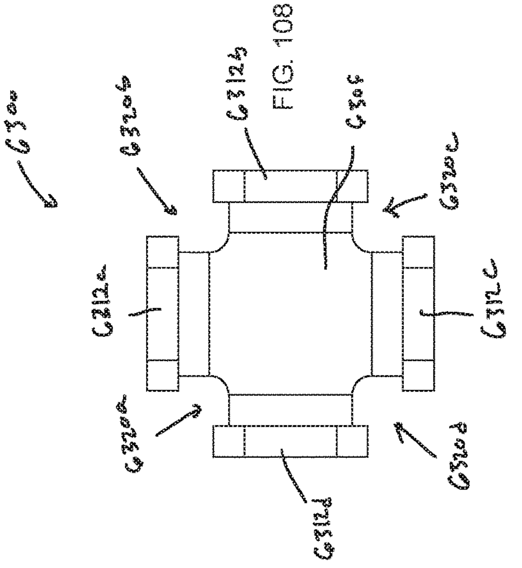
Figure 109:
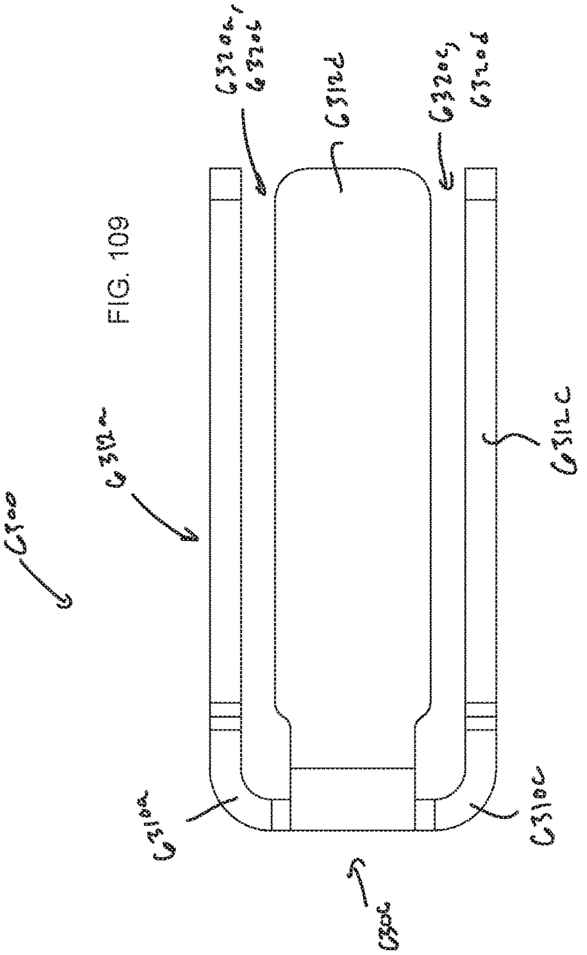
Figure 107:
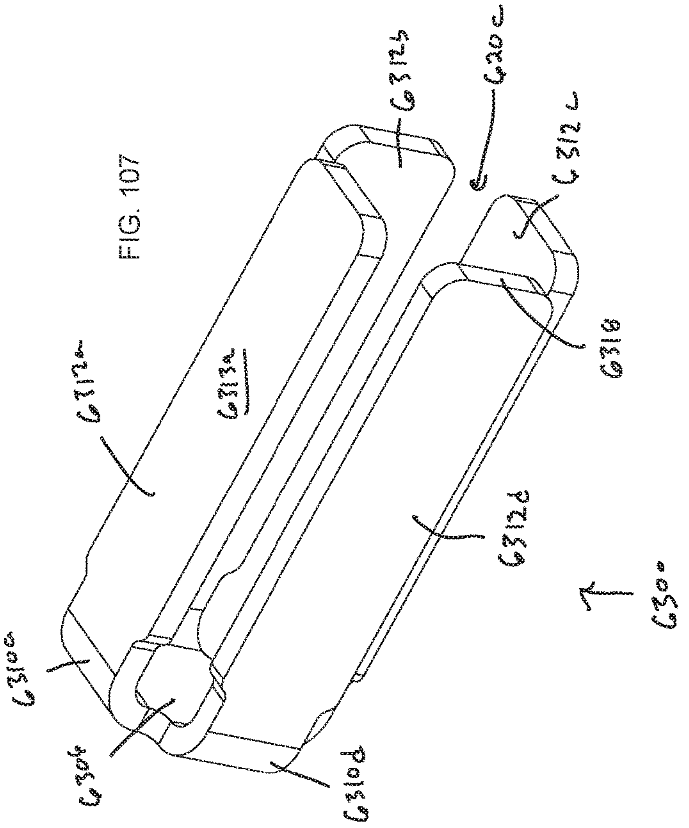

Referring to FIGS. 107-109, the spring member 6300 includes an arrangement of spring member side walls 6304*a*-6304*d* and a rear spring wall 6306. Each spring member side wall 6304*a*-6304*d* is comprised of: (i) a first or curvilinear spring section 6310*a*-6310*d*, and (iii) a second section or spring arm 6312*a*-6312*d*. The curvilinear spring section 6310*a*-6310*d* extends between the rear spring wall 6306 and the spring arm 6312*a*-6312*d* and positions the spring arm 6312*a*-6312*d* substantially perpendicular to the rear spring wall 306. In other words, the outer surface 6313*a*-6313*d* of the spring arm 6312*a*-6312*d* is substantially perpendicular to the outer surface of the rear spring wall 6306. As shown in FIGS. 107 and 109, the spring arms 6312*a*-6312*d* extend from the first or curvilinear spring section 6310*a*-6310*d* of the spring member 6300, away from the rear spring wall 6306, and terminate at a free end 6318. The spring arms 6312*a*-6312*d* are not connected to one another and thus spring arm gaps 6320*a*-6320*d* are formed between the spring arms 6312*a*-6312*d* of the spring member 6300. The spring arm gaps 6320*a*-6320*d* aid in omnidirectional expansion of the spring arms 6312*a*-6312*d*, which facilitates the mechanical coupling between the male terminal 6101 and the female terminal assembly 700.

The spring arms 6312*a*-6312*d* are generally planar and are positioned such that the outer surface 6313*a*-6313*d* of the spring arms 6312*a*-6312*d* is substantially perpendicular to the outer surface of the rear wall 6306. Unlike the spring arm 31 that is disclosed within FIGS. 4-8 of PCT/US2018/019787, the free end 6318 of the spring arms 6312*a*-6312*d* do not have a curvilinear component. Instead, the spring arms 6312*a*-6312*d* have a substantially planar outer surface 6313*a*-6313*d*. This configuration is beneficial because it ensures that the forces associated with the spring member 6300 are applied to the frontal spring contact segment 6196*a*-6196*d* and the intermediate spring contact segment 6198*a*-6198*d* of the contact arms 6180*a*-6180*d*. In contrast, the curvilinear components of the spring arm 31 that are disclosed within FIGS. 4-8 of PCT/US2018/019787 do not apply a force in this manner.

In an alternative embodiment that is not shown, the spring member 6300 may include recesses and associated strengthening ribs. As discussed in PCT/US2019/036010, these changes to the configuration of the spring member 6300 alter the forces that are generated by or applied by the spring member 6300. In particular, the spring biasing force $F_{SB}$ is the amount of force that is applied by the spring member 6300 to resist the inward deflection of the free end 6318 of the spring member 6300 when the male terminal assembly 6100 is inserted within the female terminal assembly 700. Specifically, this inward deflection occurs during the insertion of the male terminal assembly 6100 due to the fact that an extent of an outer surface of the male terminal body 6104 is slightly larger than the interior of the female receptacle 702. Thus, when the male terminal assembly 6100 is inserted into the female terminal assembly 700, the extent of the outer surface is forced towards the center of the male terminal 6101. This compression force $F_{COM}$ on the outer surface of the male terminal body 6104 displaces the free end 6318 of the spring member 6300 inward (i.e., towards the center). The spring member 6300 resists this inward displacement by providing an outwardly directed spring biasing force $F_{SB}$. In other embodiments, the spring arms 6312*a*-6312*d* may be coupled to other structures to restrict their omnidirectional expansion. The number and width of individual spring arms 6312*a*-6312*d* and openings may vary. In addition, the width of the individual spring arms 6312*a*-6312*d* is typically equal to one another; however, in other embodiments one of the spring arms 6312*a*-6312*d* may be wider than other spring arms.

2) Jacket

Figure 111:
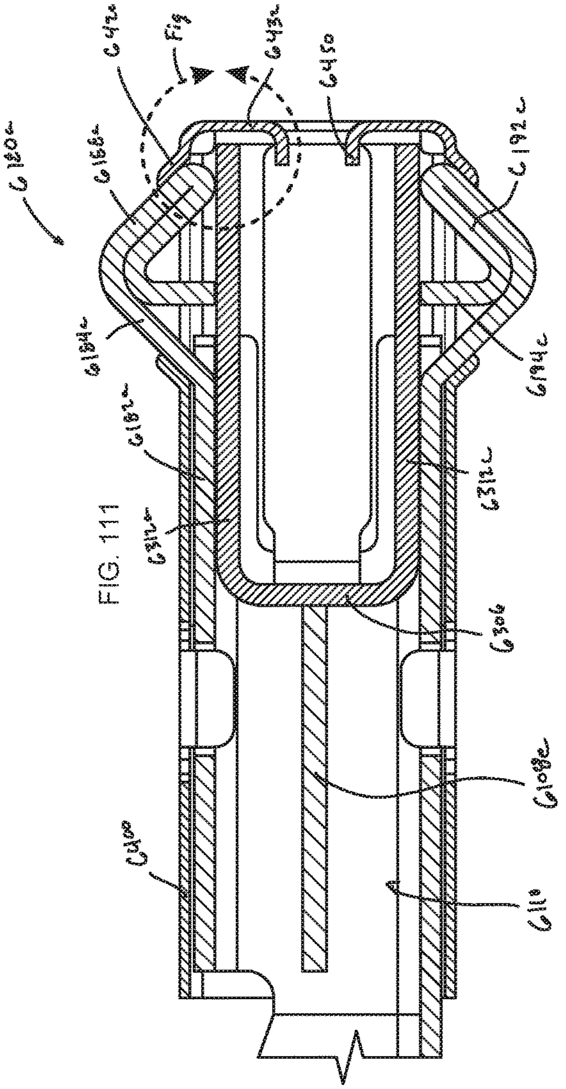
Figure 112:
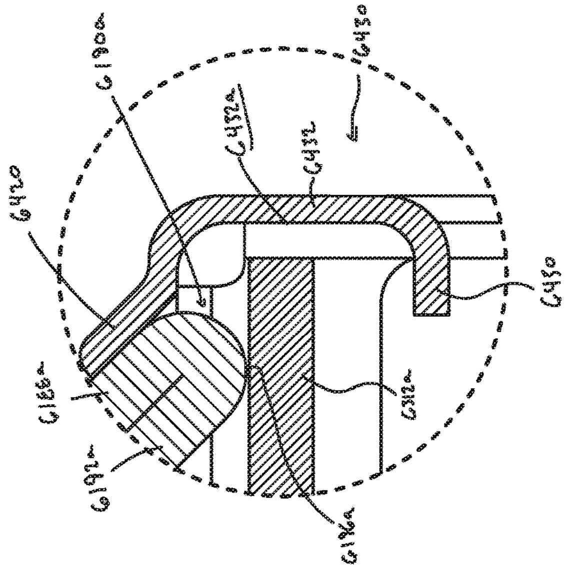
Figure 110:
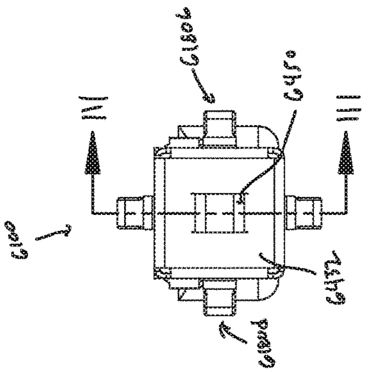

FIGS. 111-112 the jacket includes: (i) an upper segment 6402, frontal segment 6430, and a lower segment 6460. Unlike other embodiments of the jacket 400, 3400 disclosed herein, the jacket's 6400 frontal segment 6430 includes a frontal wall 6432 with spring arm limiter 6450. The spring arm limiter 6450 extends inward from an inner surface of the frontal wall 6432*a* and is designed to interact with the spring arms 6312*a*, 6312*c*. The application of an external force $F_E$ on the contact arms 6180*a*, 6180*c* can only deform the contact arms 6180*a*, 6180*c*, the max compression distance $D_{MC}$ because an inner surface of a frontal extent of the spring arms 6312*a*, 6312*c* contacts the outer surfaces 6451*a*, 6451*b* of the spring arm limiter 6450. In this embodiment the max compression distance $D_{MC}$ is less than 1.25 mm, preferably less than 1.0 mm, and most preferably 0.5 mm. Limiting the extent the contact arms 6180*a*, 6180*c* can be deformed or depressed to the max compression distance $D_{MC}$ prevents the contact arms 6180*a*, 6180*c*, spring arms 6312*a*, 6312*c*, and a combination thereof helps prevent said arms 6180*a*, 6180*c* from being overly deformed or depressed (e.g., a distance that is greater than the max compression distance $D_{MC}$) toward the center of the connector 6050.

Related Information for the Systems

The system 10, 1010, 2010, 3010, 4010, 5010, and 6010 is compliant to T4/V4/D2/M2, wherein the system 10, 1010, 2010, 3010, 4010, 5010, and 6010 meets and exceeds: (i) T4 is exposure of the system 10 to 150° C., (ii) V4 is severe vibration, (iii) D2 is 200 k mile durability, and (iv) M2 is less than 45 Newtons of force is required to connect the male terminal assembly 100, 1100, 2100, 3100, 4100, 5100, 6100 to the female terminal assembly 700, 1700, 2700, 3700, 4700, 5700, 6700. In addition to being T4/V4/D2/M2 compliant, the system 10, 1010, 2010, 3010, 4010, 5010, and 6010 is push, click, tug, scan (PCTS) compliant, wherein additional information about this standard is disclosed within PCT/US2020/049870.

It should be understood that the male terminal assemblies 100, 1100, 2100, 3100, 4100, 5100, 6100 and the female terminal assemblies 700, 1700, 2700, 3700, 4700, 5700, 6700 disclosed within this application having the following specifications regarding carrying at 55° C. rise over ambient (RoA) or 80° C. with a derating of 80%: (i) wherein the outside perimeter of the male terminal assembly 100, 1100, 2100, 3100, 4100, 5100, 6100 is 8 mm and its rated to carry 210 amps with a 16 $mm^2$ wire. Additionally, the system 10 meets the mile durability of USCAR-20, has a contact mating force that is between 10 Newtons and 30 Newtons, preferably 15 Newtons, has a unmating force that may be larger than the mating force and is between 10 Newtons and 30 Newtons, preferably 18 Newtons, meet vibration standards of 31 Gs, and is ISL/TPA compatible. These substantial increases in current carrying capacity, while meeting the USCAR specifications provides considerable advantages of the prior art connectors. The connector systems 10, 1010, 2010, 3010, 4010, 5010, and 6010 also meet applicable USCAR-38 specifications.

It should be understood that alternative configurations for means for limiting compression 314, 1314, 3314, 4314, 5314, 6314 are contemplated by this disclosure. For example, in other embodiments the means for limiting compression 3314 may be: (i) projections that extend outward from the spring arms and are received by openings in the jacket, (ii) structures that extend from one side wall of the jacket to an opposing side wall of the jacket, wherein said structure is configured to interact with the inner surface of the spring member, (iii) contact arm noses, wherein said contact arm noses are configured to interact with one another, (iv) structure that extends across the contact opening formed in the jacket and is positioned in the gap formed between the spring member and contact arm, (v) interactions between opposed spring arms or contact arms, (vi) interactions between jacket and either the spring arms or contact arms, (vii) interactions between the housing assembly and either the contact arms or spring arms, or (viii) any combination of these structures. It should also be understood that these compression tabs are not designed herein as a centering means 3380; however, said compression tabs could be extended to provide a centering means. Additionally, alternative male terminal housings are contemplated by this disclosure. For example, the housings may include any number of male terminal assemblies 100, 1100, 2100, 3100, 4100, 5100, 6100 (e.g., between 2-30, preferably between 2-8, and most preferably between 2-4) may be positioned within a housing. Additionally, alternative configurations for female terminal assemblies. For example, the housings may include any number of female terminal assemblies (e.g., between 2-30, preferably between 2-8, and most preferably between 2-4) may be positioned within a housing. Further, the female connector assembly may be reconfigured to accept these multiple male terminal assemblies into a single female terminal assembly. It should also be understood that the male terminal assemblies 100, 1100, 2100, 3100, 4100, 5100, 6100 may have any number of contact arms (e.g., between 2-100, preferably between 2-50, and most preferably between 2-8) and any number of spring arms (e.g., between 2-100, preferably between 2-50, and most preferably between 2-8). As discussed above, the number of contact arms may not equal the number of spring arms. For example, there may be more contact arms then spring arms. Alternatively, there may be less contact arms then spring arms.

Materials and Disclosure that are Incorporated by Reference

PCT Application Nos. PCT/US2022/037508, PCT/IB2022/057772, PCT/US2021/057959, PCT/US2021/047180, PCT/US2021/043788, PCT/US2021/043686, PCT/US2021/033446, PCT/US2020/050018, PCT/US2020/049870, PCT/US2020/014484, PCT/US2020/013757, PCT/US2019/036127, PCT/US2019/036070, PCT/US2019/036010, and PCT/US2018/019787, U.S. patent application Ser. No. 16/194,891 and U.S. Provisional Applications 63/286,072, and 63/286,080, each of which is fully incorporated herein by reference and made a part hereof.

SAE Specifications, including: J1742_201003 entitled, "Connections for High Voltage On-Board Vehicle Electrical Wiring Harnesses-Test Methods and General Performance Requirements," last revised in March 2010, each of which is fully incorporated herein by reference and made a part hereof.

ASTM Specifications, including: (i) D4935-18, entitled "Standard Test Method for Measuring the Electromagnetic Shielding Effectiveness of Planar Materials," and (ii) ASTM D257, entitled "Standard Test Methods for DC Resistance or Conductance of Insulating Materials," each of which are fully incorporated herein by reference and made a part hereof.

American National Standards Institute and/or EOS/ESD Association, Inc Specifications, including: ANSI/ESD STM11.11 Surface Resistance Measurements of Static Dissipative Planar Materials, each of which is fully incorporated herein by reference and made a part hereof.

DIN Specification, including Connectors for electronic equipment-Tests and measurements-Part 5-2: Current-carrying capacity tests; Test 5b: Current-temperature derating (IEC 60512 May 2:2002), each of which are fully incorporated herein by reference and made a part hereof.

USCAR Specifications, including: (i) SAE/USCAR-2, Revision 6, which was last revised in February 2013 and has ISBN: 978-0-7680-7998-2, (ii) SAE/USCAR-12, Revision 5, which was last revised in August 2017 and has ISBN: 978-0-7680-8446-7, (iii) SAE/USCAR-21, Revision 3, which was last revised in December 2014, (iv) SAE/USCAR-25, Revision 3, which was revised on March 2016 and has ISBN: 978-0-7680-8319-4, (v) SAE/USCAR-37, which was revised on August 2008 and has ISBN: 978-0-7680-2098-4, (vi) SAE/USCAR-38, Revision 1, which was revised on May 2016 and has ISBN: 978-0-7680-8350-7, each of which are fully incorporated herein by reference and made a part hereof.

Other standards, including Federal Test Standard 101C and 4046, each of which is fully incorporated herein by reference and made a part hereof. While some implementations have been illustrated and described, numerous modifications come to mind without significantly departing from the spirit of the disclosure; and the scope of protection is only limited by the scope of the accompanying claims. For example, the overall shape of the of the components described above may be changed to: a triangular prism, a pentagonal prism, a hexagonal prism, octagonal prism, sphere, a cone, a tetrahedron, a cuboid, a dodecahedron, an icosahedron, an octahedron, a ellipsoid, or any other similar shape.

It should be understood that the following terms used herein shall generally mean the following:

a. "High power" shall mean (i) voltage between 20 volts to 600 volts regardless of current or (ii) at any current greater than or equal to 80 amps regardless of voltage.
b. "High current" shall mean current greater than or equal to 80 amps regardless of voltage.
c. "High voltage" shall mean a voltage between 20 volts to 600 volts regardless of current.

Headings and subheadings, if any, are used for convenience only and are not limiting. The word exemplary is used to mean serving as an example or illustration. To the extent that the term includes, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

The invention claimed is:

1. An electrical connector assembly for use in a power distribution assembly, the connector assembly comprising:

a male connector assembly including a male housing assembly and a male terminal assembly, wherein said male terminal assembly comprises:

a male terminal body with a receptacle, a base portion and at least one contact arm extending from the base portion;

a spring member with at least one spring arm configured to underlie the contact arm, and wherein the at least one spring arm includes a frontal portion with a jacket projection extent;

an openable jacket with a spring arm opening; and wherein in a fully assembled state $S_{FA}$, (i) the spring member is positioned in the receptacle of the male terminal body and a primary spring arm of the at least one spring arm underlies the contact arm, (ii) a majority of the male terminal body and the spring member reside within the jacket, (iii) when an external force FE is applied to the contact arm, both the contact arm and the primary spring arm are inwardly displaced, and (iv) when additional external force FE is applied to the contact arm, further inward displacement of the primary spring arm is constrained by direct contact between an inner surface of the jacket projection extent of the at least one spring arm and an inner compression edge of the spring arm opening, thereby preventing over-displacement of the male terminal assembly.

2. The electrical connector assembly of claim 1, wherein the inner surface of the jacket projection extent makes direct contact with the inner compression edge of the spring arm opening to prevent the male terminal assembly from being damaged, wherein the jacket projection extent defines a forwardmost portion of the spring member.

3. The electrical connector assembly of claim 1, wherein the at least one spring arm includes a bent portion formed by an upwardly sloping extent of the primary spring arm and a downwardly sloping extent of the primary spring arm.

4. The electrical connector assembly of claim 3, wherein an interior angle of the bent portion of the primary spring arm is defined between an inner surface of the upwardly sloping extent and an inner surface of the downwardly sloping extent, and wherein said interior angle is between 60 and 120 degrees.

5. The electrical connector assembly of claim 1, wherein the primary spring arm has both a linear extent having a first width, and a creased portion having a second width, and wherein the first width is greater than the second width.

6. The electrical connector assembly of claim 1, wherein the male terminal body includes a wall arrangement with an interior spring wall with an anti-rotation projection, and wherein the anti-rotation projection is configured to be positioned in an anti-rotation recess formed in the spring member.

7. The electrical connector assembly of claim 6, wherein the anti-rotation recess is formed between a pair of spring arms of the spring member.

8. The electrical connector assembly of claim 1, wherein the receptacle of the male terminal body has a first frontal dimension when the male terminal body is in a ready to receive position $P_R$, and the receptacle has a second frontal dimension when the male terminal body is in a ready to use position $P_U$, and wherein the second frontal dimension is less than the first frontal dimension.

9. The electrical connector assembly of claim 8, wherein the at least one spring arm of the spring member includes a pair of primary spring arms each having a bent portion that defines a spring arm apex, wherein a primary exterior spring member dimension is defined between said spring arm apexes, and wherein the primary exterior spring member dimension is greater than the second frontal dimension of the receptacle of the male terminal body.

10. The electrical connector assembly of claim 8, wherein the at least one spring arm of the spring member further includes a pair of secondary spring arms each have a bent portion that defines a spring arm apex, wherein a secondary exterior spring member dimension is defined between said spring arm apexes, and wherein the secondary exterior spring member dimension is greater than the second frontal dimension of the receptacle of the male terminal body.

11. The electrical connector assembly of claim 8, wherein the at least one spring arm of the spring member further includes a pair of secondary spring arms each have a bent portion that defines a spring arm apex, wherein a secondary exterior spring member dimension is defined between said spring arm apexes, and wherein the secondary exterior spring member dimension is substantially equal to the secondary exterior spring member dimension.

12. The electrical connector assembly of claim 1, wherein the base portion of the male terminal body has an outer surface, and wherein the contact arm of the male terminal body includes a linear extent with an outer surface that is co-planar with the outer surface of the base portion.

13. The electrical connector assembly of claim 1, wherein the male terminal body includes a support rib extending from the base portion, the support rib having a length that is less than a length of the contact arm of the male terminal body.

14. The electrical connector assembly of claim 1, wherein the at least one spring arm comprises a first spring arm with said jacket projection extent and a second spring arm having a frontal portion with an over-compression extent, and wherein the first spring arm resides to the side of the second spring arm and has an upper edge that is positioned a distance from said over-compression extent.

15. The electrical connector assembly of claim 14, wherein the over-compression extent comprises opposed flanges that extend outwardly from a free end portion of the second spring arm.

16. The electrical connector assembly of claim 14, wherein said jacket projection extent of the first spring arm is located forward and beyond the over-compression extent of the second spring arm.

17. The electrical connector assembly of claim 1, wherein the male terminal body comprises a plurality of contact arms and the spring member comprises a plurality of spring arms, wherein the number of contact arms equals the number of spring arms, and wherein a single spring arm underlies a single contact arm in the fully assembled state $S_{FA}$.

18. The electrical connector assembly of claim 1, further comprising a female connector assembly including a female housing assembly and a female terminal assembly.

19. The electrical connector assembly of claim 18, wherein the male connector assembly and the female connector assembly are operably coupled together in a connected state $S_c$, wherein a frontal extent of each of the male terminal body, the spring member and the jacket are received in the female terminal assembly.

20. The electrical connector assembly of claim 1, wherein the at least one spring arm of the spring member comprises (i) a first pair of spring arms having the frontal portion with a jacket projection extent, wherein the first pair of spring arms are in an opposed positional relationship, and (ii) a second first pair of spring arms having a frontal portion with an over-compression extent, wherein the second pair of spring arms are in an opposed positional relationship; and, wherein the first pair of spring arms are angularly oriented 90 degrees from the second pair of spring arms.

* * * * *